United States Patent [19]
Kohno et al.

[11] Patent Number: 5,583,738
[45] Date of Patent: Dec. 10, 1996

[54] CAPACITOR ARRAY

[75] Inventors: Yoshiaki Kohno; Tatsuya Suzuki, both of Nagaokakyo, Japan

[73] Assignee: Murata Manufacturing Co., Ltd., Japan

[21] Appl. No.: 277,350

[22] Filed: Jul. 19, 1994

Related U.S. Application Data

[63] Continuation-in-part of Ser. No. 219,710, Mar. 29, 1994, abandoned.

[30] Foreign Application Priority Data

| Mar. 29, 1993 | [JP] | Japan | 5-070067 |
| Apr. 28, 1993 | [JP] | Japan | 5-102634 |
| Apr. 28, 1993 | [JP] | Japan | 5-102635 |
| Jul. 20, 1993 | [JP] | Japan | 5-179145 |
| Jul. 20, 1993 | [JP] | Japan | 5-179146 |

[51] Int. Cl.$^6$ .................................... H01G 4/38
[52] U.S. Cl. .................. 361/312; 361/321.2; 361/328; 361/329
[58] Field of Search ............... 361/301.4, 304, 361/306.3, 320, 321.1, 321.2, 321.3, 321.4, 328, 329, 330, 312, 313; 29/25.42

[56] References Cited

U.S. PATENT DOCUMENTS

| 3,379,943 | 4/1968 | Breedlove | 361/321.2 |
| 3,444,436 | 5/1969 | Coda | 361/306.3 |
| 4,313,157 | 1/1982 | Fink | 361/328 |
| 4,470,099 | 9/1984 | Sawari | 361/328 |
| 4,630,171 | 12/1986 | Dubuisson et al. | 361/321.1 |
| 4,882,650 | 11/1989 | Maher et al. | 361/321.4 |
| 5,295,289 | 3/1994 | Inagaki et al. | 29/25.42 |
| 5,367,430 | 11/1994 | DeVoe et al. | 361/328 |

FOREIGN PATENT DOCUMENTS

| 1185913 | 7/1989 | Japan | 361/328 |
| 1289234 | 11/1989 | Japan | 361/321.2 |
| 3178112 | 8/1991 | Japan | 361/328 |
| 4105311 | 4/1992 | Japan | 361/329 |

*Primary Examiner*—Mark H. Paschall
*Assistant Examiner*—Gregory L. Mills
*Attorney, Agent, or Firm*—Ostrolenk, Faber, Gerb & Soffen, LLP

[57] ABSTRACT

A capacitor array in which a plurality of inner electrodes are formed so as to be overlapped with each other in the thickness direction while being separated by a ceramic layer in a ceramic sintered body to construct a plurality of capacitor units, and the plurality of capacitor units are separated from each other by a layer having a lower dielectric constant than that of ceramics composing the sintered body.

9 Claims, 44 Drawing Sheets

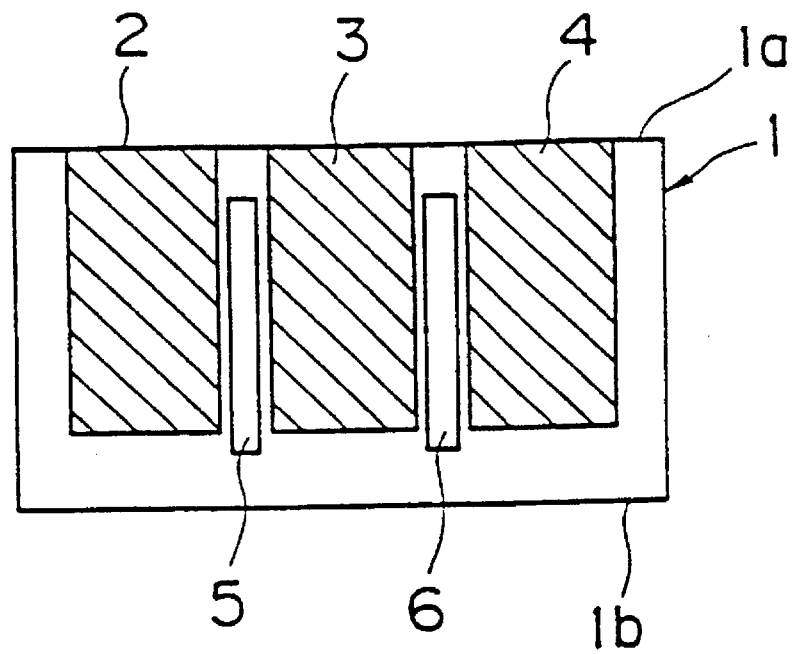
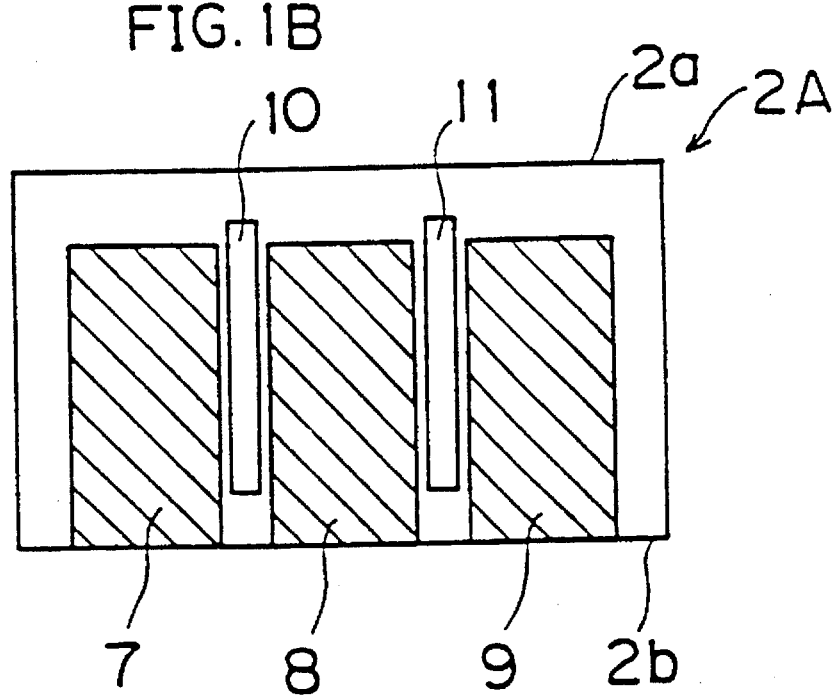

PATTERN A

PATTERN B

PATTERN A

PATTERN B

PATTERN C

PATTERN D

CAPACITOR ARRAY

This is a continuation-in-part of Ser. No. 08/219,710, filed Mar. 29, 1994, now abandoned.

BACKGROUND OF THE INVENTION

1. Field of the Invention

The present invention relates generally to a capacitor array in which a plurality of capacitor units are constructed using one ceramic sintered body, and more particularly, to a capacitor array having an improvement in a structure between adjacent capacitor units.

2. Description of the Prior Art

Miniaturization and high-density mounting of an electronic component has proceeded as an electronic equipment is miniaturized. For example, as a capacitor, a subminiature multilayer ceramic capacitor has been developed. A circuit constructed by mounting a lot of subminiature multilayer ceramic capacitors on a printed circuit board has been realized.

Furthermore, in order to achieve high-density mounting of the electronic component, a capacitor array constructed by integrating a plurality of capacitors has been used. In the capacitor array, a plurality of capacitor units each constructed by forming inner electrodes so as to be overlapped with each other while being separated by a ceramic layer in one ceramic sintered body are provided side by side in the sintered body. If the capacitor array is used, it is possible to decrease the number of capacitors to be prepared and to simplify the mounting operation.

In order to allow high-density mounting of the electronic component, it is desirable that the multilayer capacitor is made smaller in size as described above. However, the smaller the multilayer capacitor is, the smaller the area of the inner electrodes is and the lighter the multilayer capacitor is. As a result, in mounting the multilayer capacitor on the printed circuit board, the surface tension of molten solder causes such a phenomenon that the multilayer capacitor stands with its one outer electrode being a lower end and the other outer electrode floats above the printed circuit board (a tombstone phenomenon). That is, the smaller the multilayer capacitor becomes, the more difficult the mounting of the multilayer capacitor on the printed circuit board becomes.

On the other hand, when the above described capacitor array is used, the plurality of capacitor units are formed in one sintered body. Consequently, the above described tombstone phenomenon due to the surface tension of molten solder does not easily occur. In the capacitor array, however, the plurality of capacitor units are provided side by side in one sintered body, thereby to make it impossible to avoid the production of stray capacitance between the adjacent capacitor units. Therefore, a circuit using the capacitor array may, in some cases, be adversely affected by the stray capacitance.

SUMMARY OF THE INVENTION

An object of the present invention is to provide a capacitor array having a structure which is suitable for high-density mounting, and can be stably mounted on a printed circuit board and can reduce the adverse effect of stray capacitance between adjacent capacitor units.

In accordance with a wide aspect of the present invention, there is provided a capacitor array comprising a ceramic sintered body and a plurality of capacitor units formed in the ceramic sintered body, each of the capacitor units having a plurality of inner electrodes disposed so as to be overlapped with each other while being separated by a ceramic layer, and the adjacent capacitor units being separated from each other by a layer having a lower dielectric constant than that of ceramics composing the ceramic sintered body.

In the capacitor array according to the present invention, the plurality of capacitor units disposed in the sintered body are separated from each other by the layer having a lower dielectric constant than that of the ceramics. Accordingly, the stray capacitance between the adjacent capacitor units is significantly reduced. The stray capacitance between the adjacent capacitor units is thus significantly reduced, thereby to make it possible to reliably prevent the adverse effect of the stray capacitance between the adjacent capacitor units in the capacitor array. If the multilayer capacitor array according to the present invention is used, therefore, mounting costs can be reduced and a chip standing phenomenon in the case of mounting can be prevented, as compared with the conventional case where a plurality of subminiature multilayer capacitors are mounted. In addition, the adverse effect of the stray capacitance between the adjacent capacitor units can be reduced, as compared with the conventional multilayer capacitor array, thereby to make it possible to reliably construct a circuit capable of exhibiting desired characteristics.

Furthermore, in accordance with a particular aspect of the present invention, the layer having a lower dielectric constant than that of the ceramics is constituted by air in a cavity formed between the adjacent capacitor units in the ceramic sintered body.

In accordance with another particular aspect of the present invention, the layer having a lower dielectric constant than that of the ceramics composing the ceramic sintered body is constituted by air in a groove formed so as to extend in the thickness direction from at least one of the major surfaces of the sintered body between the adjacent capacitor units. In addition, the groove may be filled with an arbitrary insulating material having a lower dielectric constant than that of the ceramics.

In accordance with still another aspect of the present invention, there is provided a capacitor array wherein the plurality of capacitor units are disposed in a matrix of m rows and n columns (where m and n are integers which are not less than two) in the sintered body, the inner electrodes in each of the capacitor units are alternately exposed to the groove extending in the thickness direction from at least one of the upper surface and the lower surface of the sintered body or an end surface of the sintered body on both sides of the capacitor unit, and further comprising outer electrodes formed on the inner surfaces of the grooves and the end surfaces of the sintered body so as to be electrically connected to the inner electrodes, the capacitor units with no outer electrode formed therebetween being separated from each other by a dielectric layer having a lower dielectric constant than that of the sintered body. In this case, the dielectric layer having a lower dielectric constant is constituted by the air in the groove formed so as to extend in the thickness direction from at least one of the major surfaces of the sintered body. Further, the groove may be filled with an insulating material or a dielectric material having a lower dielectric constant than that of the ceramics composing the sintered body.

As described in the foregoing, when the adjacent capacitor units are separated from each other by the air, the cavity or the like, the stray capacitance between the adjacent capacitor units is reduced. Further, when the groove is filled with the insulating material or the dielectric material as described above, the stray capacitance between the adjacent capacitor units can be also significantly reduced, and the mechanical strength can be prevented from being decreased by providing the groove.

According to the present invention, therefore, the mounting costs can be reduced and the chip standing phenomenon in the case of mounting can be prevented, as compared with the conventional case where a plurality of subminiature multilayer capacitors are mounted. In addition, the adverse effect of the stray capacitance between the adjacent capacitor units can be reduced, as compared with the conventional multilayer capacitor array, thereby to make it possible to reliably construct a circuit capable of exhibiting desired characteristics.

The foregoing and other objects, features, aspects and advantages of the present invention will become more apparent from the following detailed description of the present invention when taken in conjunction with the accompanying drawings.

Examples of insulating materials having a lower dielectric constant than that of ceramics include glass such as Pb—Si—Al series glass or insulating resin. The insulating resin is preferable because it is so softer than ceramics that it can absorb a stress caused by contraction of the capacitor array.

In accordance with another restricted aspect of the present invention, there is provided a multilayer capacitor array in which a plurality of capacitor units each constructed by forming a plurality of inner electrodes so as to be overlapped with each other in the thickness direction while being separated by a ceramic layer in a ceramic sintered body are provided side by side in a matrix of m rows and n columns (where m and n are integers which are not less than two) in the sintered body, wherein the inner electrodes in each of the capacitor units are alternately exposed to a groove extending in the thickness direction from one surface of the sintered body or an end surface of the sintered body on both sides of the capacitor unit, connecting electrodes are provided on an inner surface of the groove and the end surface of the sintered body so as to be electrically connected to the inner electrodes, the connecting electrodes provided in the groove are formed by separating a metal conductor fitted in the groove into two parts and interposing an insulating layer therebetween, the metal conductor has a projection extending so as to lead to the one surface of the sintered body, and end surfaces of the projection respectively constitute electrodes for connection to the exterior in each of the capacitor units. In the capacitor array, the plurality of capacitor units are provided side by side in a matrix of m rows and n columns, and the connecting electrodes are provided so as to be electrically connected to the inner electrodes on both sides of each of the capacitor units. The connecting electrodes provided in the groove are formed by dividing the metal conductor into two parts and interposing the insulating layer therebetween. Further, the projection of the metal conductor extends so as to lead to the one surface of the sintered body, to constitute the electrodes for connection to the exterior in each of the capacitor units.

Consequently, the capacitor unit can be mounted on a printed circuit board using the electrodes for connection to the exterior provided on the one surface of the sintered body and can be surface-mounted by bump junction or the like. Therefore, high-density mounting is allowed, thereby to make it possible to reduce mounting costs.

Since the connecting electrodes and the electrodes for connection to the exterior are provided for each capacitor unit, it is possible to take out the capacitance of the capacitor unit independently.

Furthermore, in the present invention, the connecting electrodes provided in the groove are formed by dividing the metal conductor fitted in the groove into two parts and interposing the insulating layer therebetween. Since the connecting electrodes are formed using the metal conductor having a previously determined shape, it is possible to provide the capacitor array high in dimensional accuracy of the connecting electrodes in the groove.

In accordance with still another restricted aspect of the present invention, there is provided a multilayer capacitor array in which a plurality of capacitor units each constructed by forming a plurality of inner electrodes so as to be overlapped with each other in the thickness direction while being separated by a ceramic layer in a ceramic sintered body are provided side by side in a matrix of m rows and n columns (where m and n are integers which are not less than two) in the sintered body, wherein the inner electrodes in each of the capacitor units are alternately exposed to a groove extending in the thickness direction from one surface of the sintered body or an end surface of the sintered body on both sides of the capacitor unit, and which comprises connecting electrodes formed on inner surfaces of the grooves and the end surfaces of the sintered body so as to be electrically connected to the inner electrodes, electrodes for connection to the exterior provided on the one surface of the sintered body for each capacitor unit, and lead-out electrodes for connecting the connecting electrodes and the electrodes for connection to the exterior, the adjacent connecting electrodes in the capacitor units being separated by an insulating layer.

Also in this capacitor array, the plurality of capacitor units are provided side by side in a matrix of m rows and n columns, the connecting electrodes are provided so as to be electrically connected to the inner electrodes on both sides of each of the capacitor units, and the connecting electrodes are respectively connected to the electrodes for connection to the exterior provided on the one surface of the sintered body in each of the capacitor units by the lead-out electrodes. Therefore, the capacitor array can be also mounted on a printed circuit board using the electrodes for connection to the exterior provided on the one surface of the sintered body and can be surface-mounted by bump junction or the like. Therefore, high-density mounting is allowed, thereby to make it possible to reduce mounting costs.

Furthermore, the connecting electrodes, the lead-out electrodes and the electrodes for connection to the exterior are provided for each capacitor unit, thereby to make it possible to take out the capacitance of the capacitor unit independently.

Additionally, no through-hole electrode or the like is used, thereby to make it possible to miniaturize each of the capacitor units.

Furthermore, the capacitor array according to the present invention can be surface-mounted on the printed circuit board by bump junction. It is preferable in terms of mounting strength that the ratio of the smallest diameter to the largest diameter of the electrode for connection to the exterior is not less than 0.1.

BRIEF DESCRIPTION OF THE DRAWINGS

FIGS. 1A and 1B are plan views each showing a state where inner electrodes are formed on a ceramic green sheet and a through hole is formed between the adjacent inner electrodes in a first embodiment;

DESCRIPTION OF THE PREFERRED EMBODIMENTS

Figure 2A:
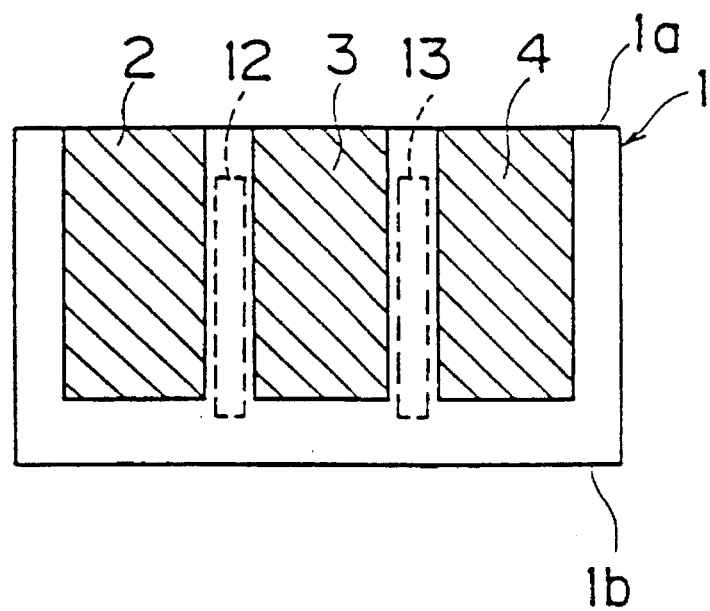
FIGS. 2A and 2B are plan views each showing a state where the through holes of the ceramic green sheet shown in FIG. 1 are filled with a carbon paste.

A capacitor array according to one embodiment of the present invention will be described with reference to the drawings to clarify the present invention. In the following description, a method of fabricating the capacitor array according to the present embodiment will be first described to clarify the construction of the capacitor array.

First Embodiment

As shown in FIGS. 1A and 1B, rectangular ceramic green sheets 1 and 2 are first prepared. Rectangular inner electrodes 2A to 4 are formed from one edge 1a toward the other edge 1b but so as not to lead to the other edge 1b on the upper surface of the ceramic green sheet 1 by printing a conductive paste. In addition, long narrow through holes 5 and 6 are formed parallel to the direction in which the inner electrodes 2 to 4 extend, respectively, in ceramic green sheet portions between the inner electrodes 2 to 4. Similarly, rectangular inner electrodes 7 to 9 extending from the one edge 2b toward the other edge 2a are also formed on the upper surface of the ceramic green sheet 2A, and through holes 10 and 11 are respectively formed in ceramic green sheet portions between the inner electrodes 7 to 9. The inner electrodes 2 to 4 and 7 to 9 may be formed by a thin film forming process such as plating or sputtering.

Figure 2B:
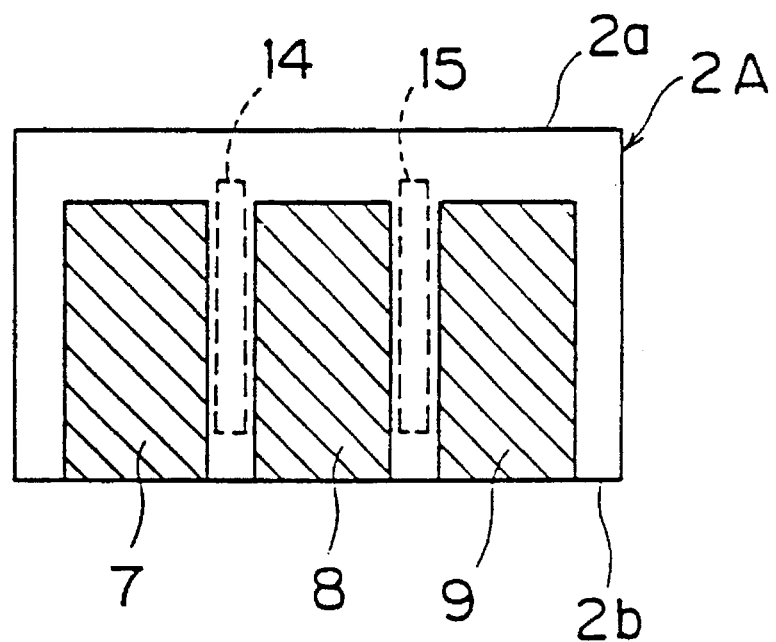

Each of the through holes 5, 6, 10 and 11 of the above described ceramic green sheets 1 and 2A is then filled with a carbon paste containing materials which can be scattered in the case of later sintering, for example, carbon powder and a binder. In FIGS. 2A and 2B, the contour of each of carbon paste layers 12 to 15 with which the through holes 5, 6, 10 and 11 are respectively filled is indicated by a broken line.

Figure 3:
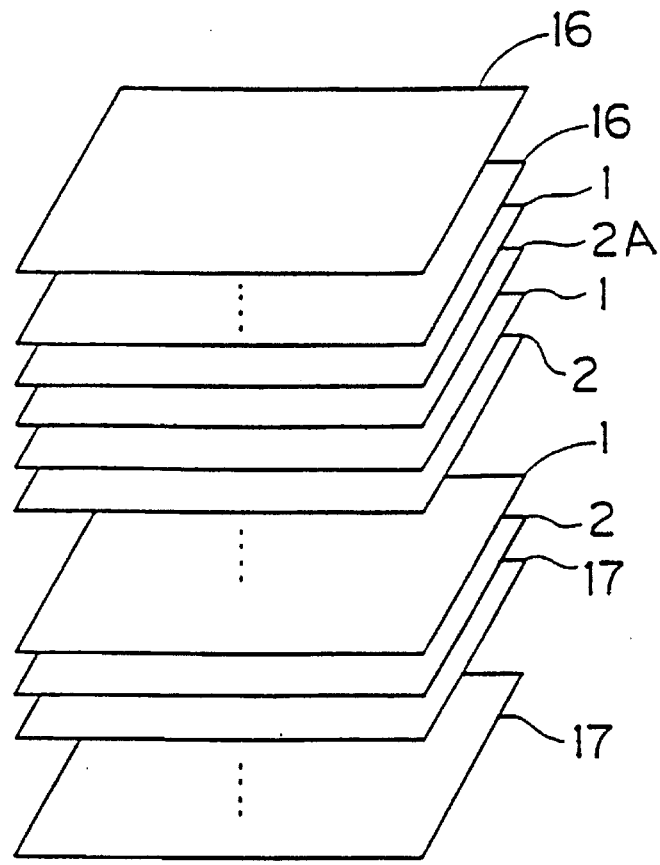
FIG. 3 is a perspective view showing the process of laminating a plurality of ceramic green sheets in the first embodiment.
Figure 4:
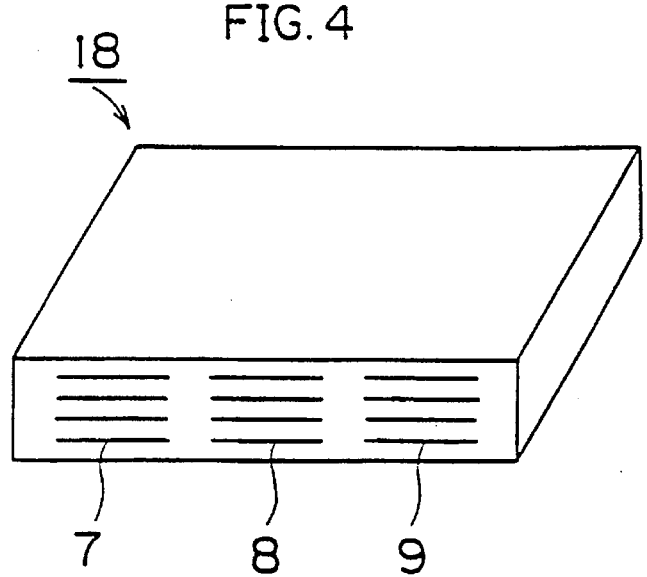
FIG. 4 is a perspective view showing a laminated body obtained by laminating the plurality of ceramic green sheets in the first embodiment.

A plurality of ceramic green sheets 1 and a plurality of ceramic green sheets 2A are then prepared and are alternately laminated without changing the direction shown in FIGS. 2A and 2B, and a suitable number of plain ceramic green sheets 16 and 17 are respectively laminated above and below the ceramic green sheets 1 and 2A, as schematically illustrated in FIG. 3, followed by pressing in the thickness direction, thereby to obtain a laminated body 18 shown in FIG. 4. The laminated body 18 is sintered, thereby to obtain a sintered body 19 shown in FIGS. 5 and 6. In the sintered body 19, the above described carbon paste layers 12 to 15 formed in the ceramic green sheets 1 and 2A are scattered in the case of sintering, thereby to form cavities 20 and 21 indicated by broken lines.

Figure 5:
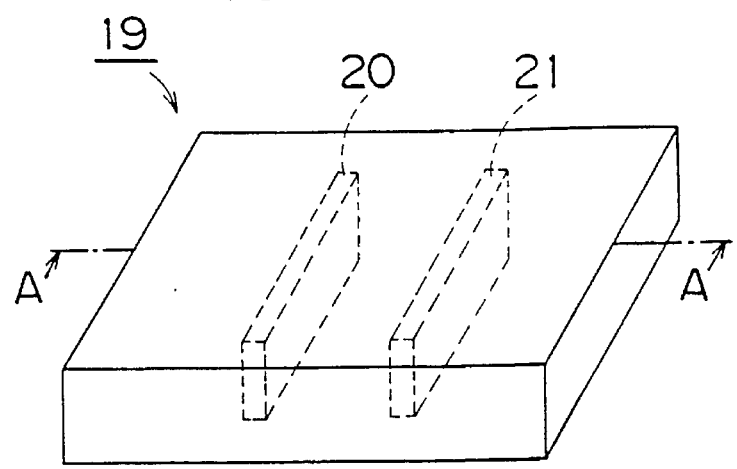
FIG. 5 is a schematic perspective view showing a sintered body.
Figure 6:
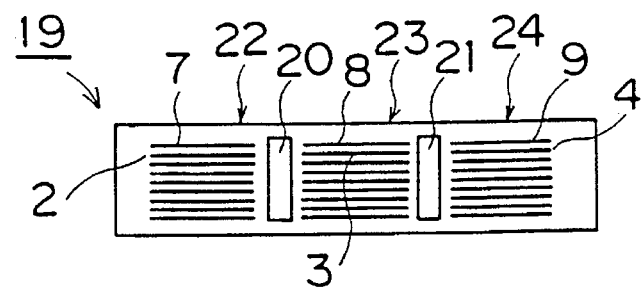
FIG. 6 is a cross sectional view taken along a line A—A shown in FIG. 5.

Furthermore, as apparent from FIG. 6 which is a cross sectional view taken along a line A—A shown in FIG. 5, a first capacitor unit 22 constructed by overlapping inner electrodes 2 and 7 with each other, a second capacitor unit 23 constructed by overlapping inner electrodes 3 and 8 with each other, and a third capacitor unit 24 constructed by overlapping inner electrodes with each other while being separated by a ceramic layer are formed in the sintered body 19. The above described cavities 20 and 21 are respectively formed between the first and third capacitor units 22 to 24.

Figure 7:
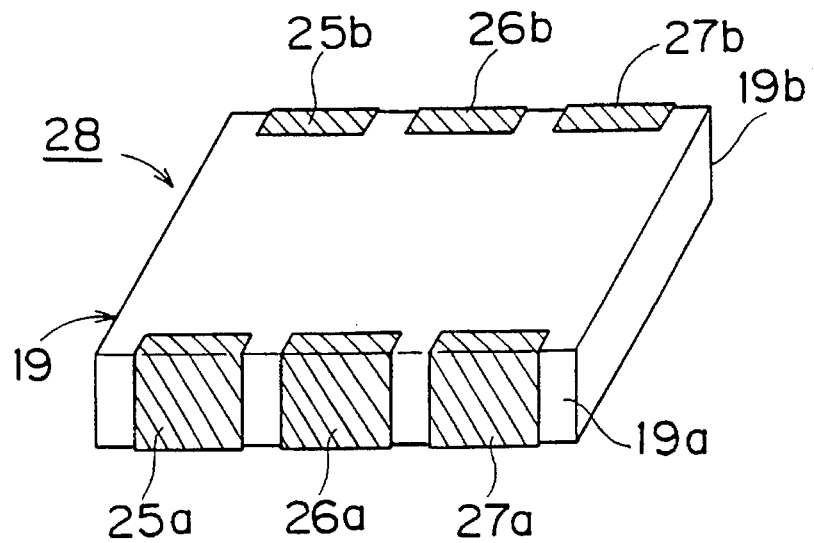
FIG. 7 is a perspective view showing a multilayer capacitor array according to the first embodiment.

Finally, first and second outer electrodes 25a and 25b to 27a and 27b for electrically connecting the respective capacitor units 22 to 24 to the exterior are formed on end surfaces 19a and 19b of the sintered body 19 by a suitable electrode forming process, as shown in FIG. 7. The first and second outer electrodes 25a to 27b can be formed by applying a conductive paste and baking the same or a suitable conductive film forming process such as plating or sputtering.

In a multilayer capacitor 28 obtained, the first to third capacitor units 22 to 24 are formed in the one sintered body 19. Consequently, it is possible to reduce the mounting costs of the multilayer capacitor 28 on a printed circuit board, as in the conventional capacitor array. Moreover, the above described cavities 20 and 21 are respectively formed between the capacitor units 22 to 24, thereby to significantly reduce stray capacitance between the capacitor units 22 to 24.

Since the above described cavities 20 and 21 are provided so as to reduce the stray capacitance between the adjacent capacitor units 22 to 24, the size thereof is not particularly limited. Even if smaller cavities than those in the embodiment as shown are formed, it is possible to reduce the stray capacitance between the adjacent capacitor units, as compared with a case where the cavities 20 and 21 are not formed.

Since the stray capacitance is produced between the inner electrodes in the adjacent capacitor units, it is desirable that the cavities 20 and 21 are so formed as to lead to a place higher than the uppermost inner electrode and lead to a place lower than the lowermost inner electrode, as in the embodiment as shown. Similarly, with respect to the length of the cavities 20 and 21, it is preferable that the carbon paste layers 12 and 13 are so formed as to extend toward an edge 1b as viewed from ends of the inner electrodes 2 to 4, and the carbon paste layers 14 and 15 are so formed as to extend toward an edge 2a as viewed from ends of the inner electrodes 7 to 9.

Furthermore, although the ceramic green sheets 1 and 2 are obtained by forming a slurry obtained by thoroughly mixing arbitrary dialectic ceramic powder conventionally used for a multilayer capacitor, for example, barium titanate with an organic binder and a solvent by the Doctor blade process or the like, the ceramic green sheets 16 and 17 laminated above and below the ceramic green sheets 1 and 2A shown in FIG. 3 need not be composed of the same material as that of the ceramic green sheets 1 and 2A. That is, the ceramic green sheets 16 and 17 may be constructed using a slurry composed of ceramic powder other than the dielectric ceramic powder.

Second Embodiment

Figure 8A:
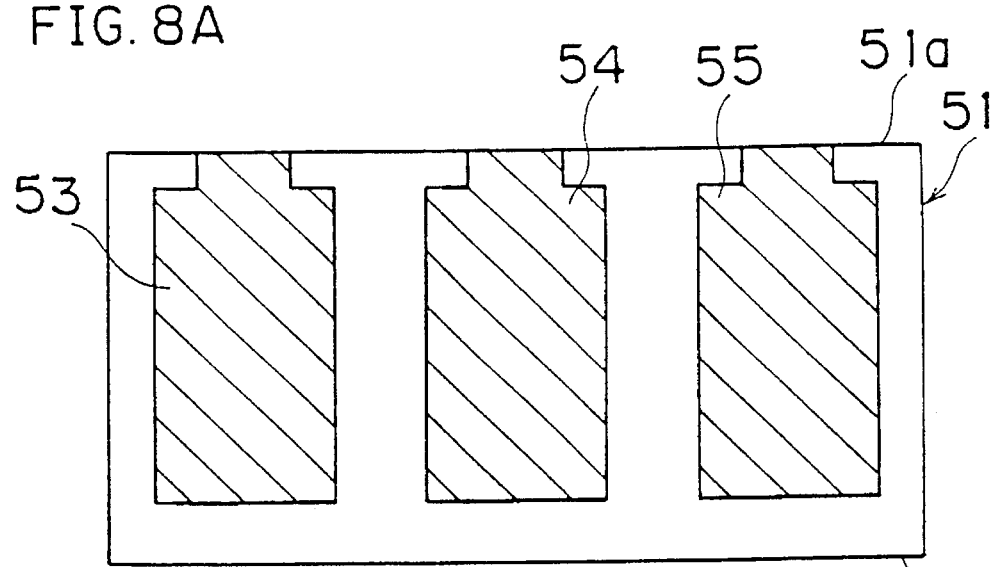
FIGS. 8A and 8B are plan views each showing the shapes of a ceramic green sheet prepared in a second embodiment and inner electrodes formed thereon.
Figure 8B:
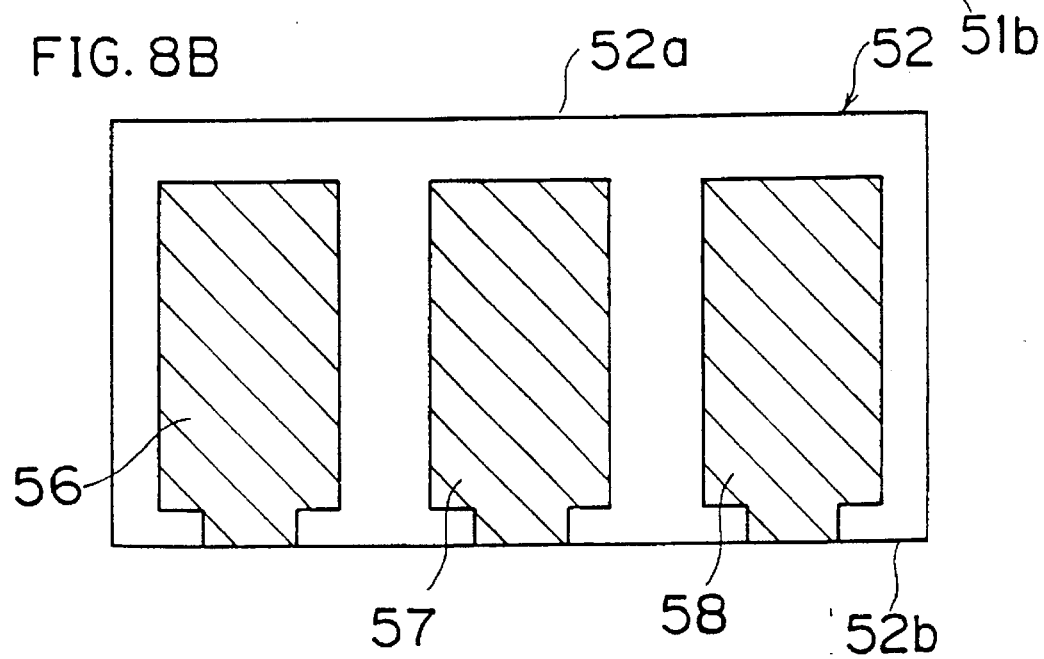

As shown in FIGS. 8A and 8B, rectangular ceramic green sheets 51 and 52 are first prepared. The ceramic green sheets 51 and 52 are obtained by cutting a ceramic green sheet, which is obtained by forming a slurry obtained by thoroughly mixing dielectric ceramic powder such as barium titanate series ceramic powder with a known and commonly used binder and organic solvent by a suitable sheet forming process such as the Doctor blade process.

Substantially rectangular inner electrodes 53 to 55 are formed from one edge 51a toward the other edge 51b but so as not to lead to the other edge 51b on the upper surface of the ceramic green sheet 51. Although the inner electrodes 53 to 55 have a substantially rectangular shape as a whole as shown, each of the inner electrodes 53 to 55 is so formed that the vicinity of a portion in which the inner electrode is exposed to the edge 51a is relatively narrower than the other portion.

Similarly, substantially rectangular inner electrodes 56 to 58 are also formed from one edge 52b toward the other edge 52a but so as not to lead to the other edge 52b on the upper surface of the ceramic green sheet 52.

The above described inner electrodes 53 to 55 and 56 to 58 are respectively formed by printing a conductive paste containing Ag, an Ag—Pd alloy or the like. However, the inner electrodes 53 to 58 may be formed by another conductive film forming process.

Figure 9:
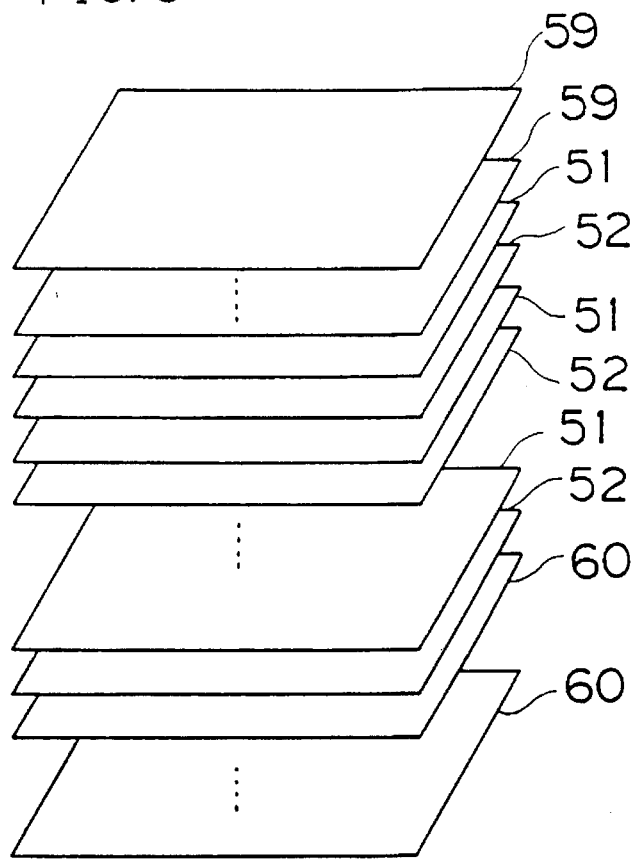
FIG. 9 is a schematic perspective view for explaining the process of laminating a plurality of ceramic green sheets.

A plurality of ceramic green sheets 51 and a plurality of ceramic green sheets 52 are then prepared and are alternately laminated without changing the direction shown in FIGS. 8A and 8B, and a suitable number of plain ceramic green sheets 59 and 60 are laminated above and below the ceramic green sheets 51 and 52, as schematically illustrated in FIG. 9, followed by pressing in the thickness direction, thereby to obtain a laminated body. The laminated body obtained is sintered, thereby to obtain a sintered body 61 shown in FIG. 10 and 11.

Figure 10:
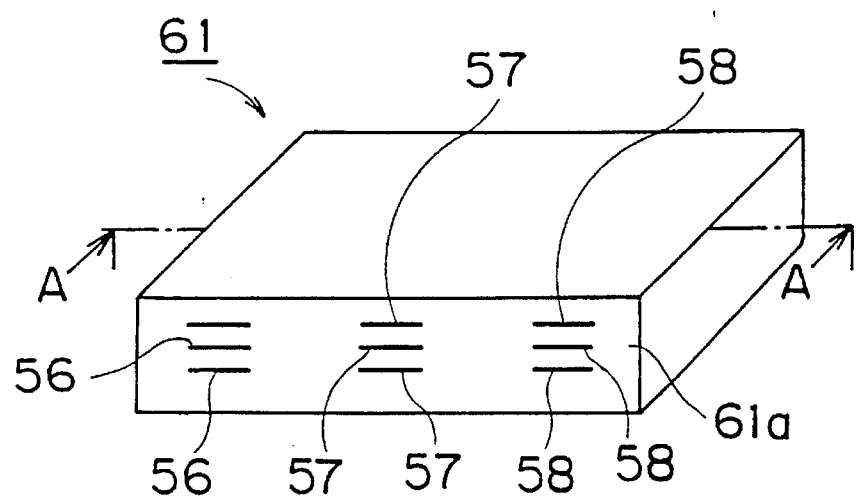
FIG. 10 is a perspective view showing a sintered body.
Figure 11:
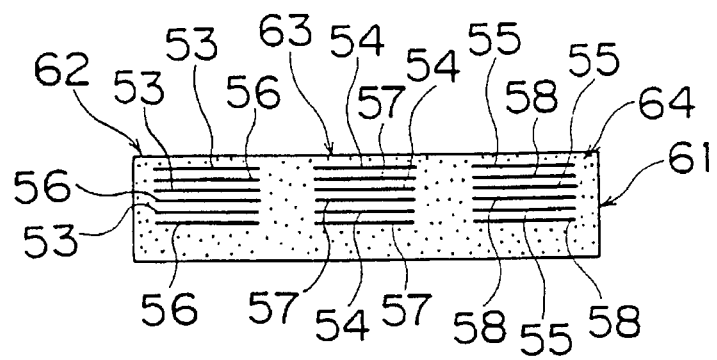
FIG. 11 is a schematic cross sectional view taken along a line A—A shown in FIG. 10.

As apparent from FIG. 10, the above described inner electrodes 56 to 58 are exposed to an end surface 61a of the sintered body 61. Further, as apparent from FIG. 11, the inner electrodes 53 and 56, the inner electrodes 54 and 57, and the inner electrodes 55 and 58 are alternately laminated, respectively, in the thickness direction in the center part of the sintered body 61.

Consequently, a first capacitor unit 62, a second capacitor unit 63 and a third capacitor unit 64 are respectively formed in a portion where the inner electrodes 53 and 56 are overlapped with each other while being separated by a ceramic layer, a portion where the inner electrodes 54 and 57 are overlapped with each other while being separated by the ceramic layer and a portion where the inner electrodes 55 and 58 are overlapped with each other while being separated by the ceramic layer.

Figure 12:
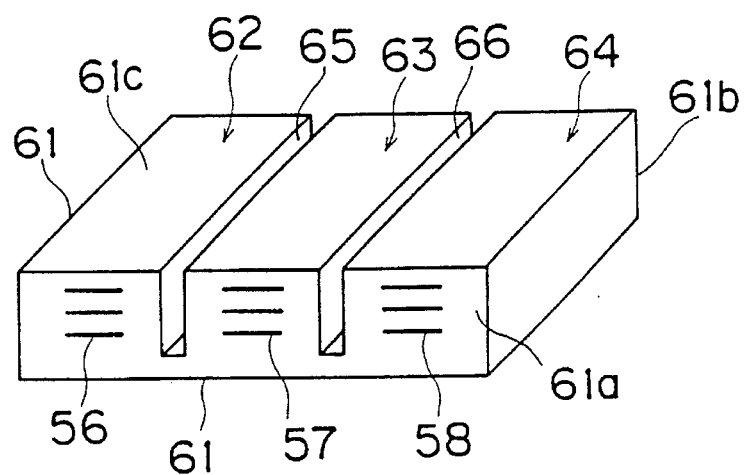
FIG. 12 is a perspective view showing the sintered body in which grooves are formed.

As shown in FIG. 12, grooves 65 and 66 are then formed from an upper surface 61c of the ceramic sintered body 61 toward a lower surface 61d but so as not to lead to the lower surface 61d. The adjacent capacitor units 62 to 64 are thus separated from each other by the grooves 65 and 66. The grooves 65 and 66 can be processed using a diamond cutter, a dicing machine or the like. Although the width of the grooves 65 and 66 is suitably determined by, for example, the size of the sintered body 61 and the size of each of the capacitor units 62 to 64, it is desirable that the grooves 65 and 66 are so formed as to lead to a place lower than the lowermost one of the inner electrodes overlapped with each other in each of the capacitor units 62 to 64.

Figure 13:
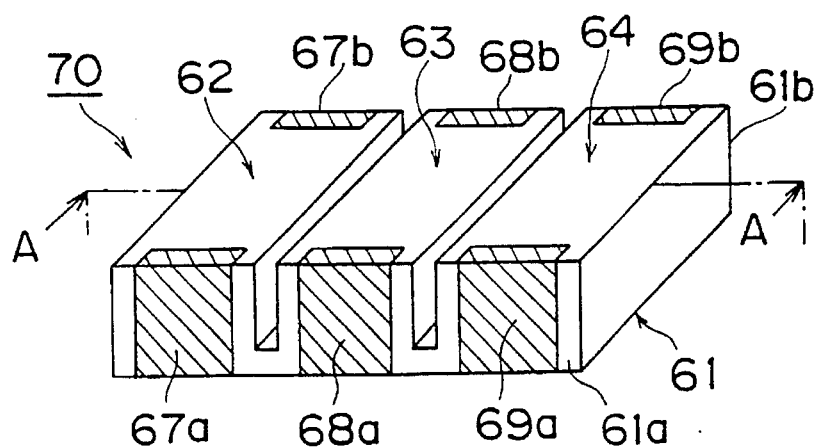
FIG. 13 is a perspective view showing a capacitor array according to the second embodiment.
Figure 14:
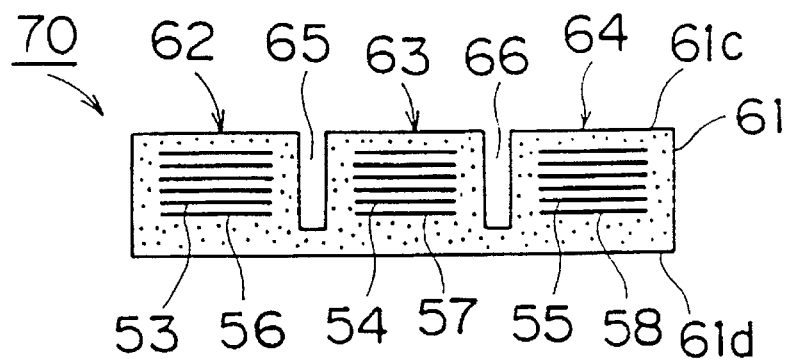
FIG. 14 is a cross sectional view taken along a line A—A shown in FIG. 13.

As shown in FIG. 13, a conductive paste containing Ag is applied to end surfaces 61a and 61b of the above described sintered body 61 and is baked to respectively form the outer electrodes 67a and 67b to 69a and 69b, thereby to make it possible to obtain a capacitor array 70 according to the first embodiment.

In the capacitor array 20, the capacitor units 62 to 64 are separated from each other by the grooves 65 and 66, as apparent from FIGS. 12 and 13. Consequently, it is possible to significantly reduce stray capacitance between the adjacent capacitor units 62 to 64.

Description is now made of an example of specific experiments in the second embodiment.

As the ceramic green sheets 51 and 52, a ceramic green sheet obtained by cutting a ceramic green sheet, which is obtained by forming a ceramic slurry containing barium titanate as a main ingredient in a thickness of 10 µm, to a rectangular shape measuring 60 mm by 40 mm is used. In addition, the above described sintering is performed at a temperature of 1300° C. The ceramic green sheet is so cut as to have a rectangular plane shape measuring 2.5 mm by 1.5 mm using a diamond cutter and then, the above described grooves 65 and 66 are further so formed as to lead to a place lower than the lowermost inner electrode using the diamond cutter, and the outer electrodes are formed in the above described manner, thereby to obtain the capacitor array according to the present embodiment.

For comparison, a capacitor array obtained in the above described manner except that no grooves are formed is prepared as a comparative example.

Figure 15A:
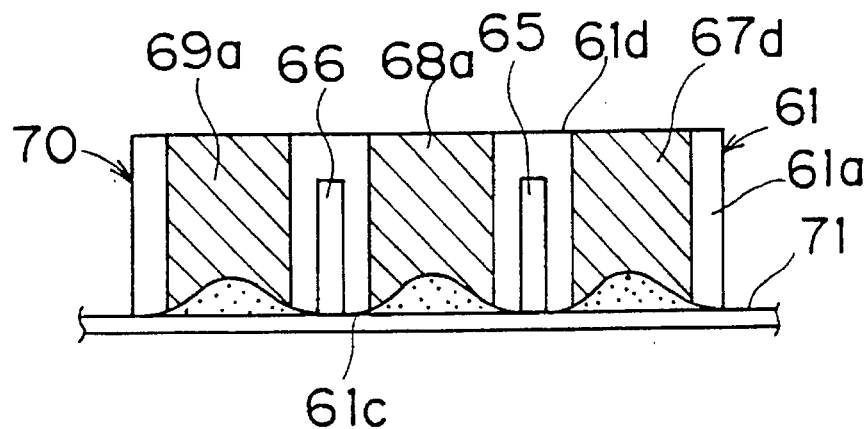
FIGS. 15A and 15B are respectively side views showing states where the capacitor array in the second embodiment and a capacitor array in a comparative example are mounted on a circuit board for testing.
Figure 15B:
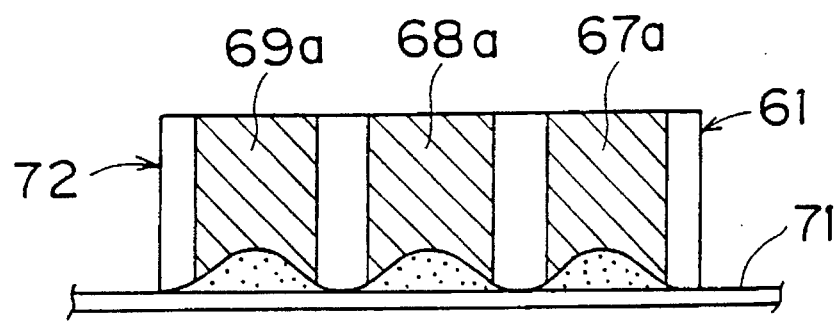

The capacitor arrays 70 and 72 in the embodiment and the comparative example obtained in the above described manner are respectively joined to a circuit board 71 using solder with an upper surface 61c of the sintered body 61 down, as shown in FIGS. 15A and 15B. The process of cooling each of the capacitor arrays 70 and 72 to a temperature of −25° C. with it being mounted on the circuit board 71 and then, heating the capacitor array to +125° C. and cooling the same to −25° C. again is taken as one cycle. After 1000 cycles of cooling and heating are terminated, the insulation resistance of the capacitor array is measured.

A sample in which the insulation resistance is changed by not less than 10% from the initial insulation resistance is considered as a failure. The above described measurements are made with respect to respective 50 capacitor arrays in the embodiment and the comparative example. The results are shown in the following table 1. If the above described failure exists in one capacitor unit in one capacitor array, the one capacitor array is counted as a failure.

TABLE 1

| Comparison of Failure Rate | |
|---|---|
| Embodiment | Comparative Example |
| 0 (0%) | 8 (16%) |

As apparent from the table 1 the failure rate is 16% in the capacitor array 72 in the comparative example, while the above described failure does not occur in the capacitor array 70 in the present embodiment.

Third Embodiment

Figure 16A:
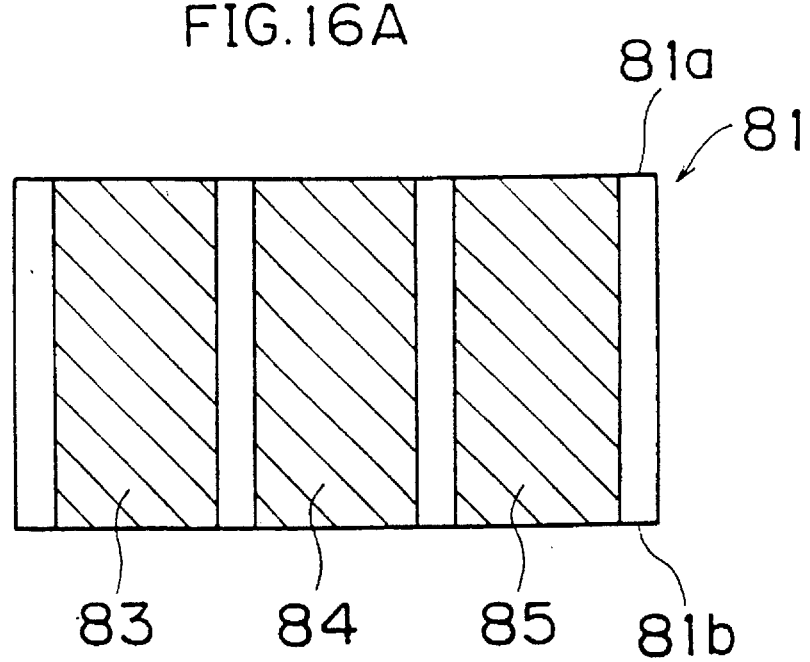
FIGS. 16A and 16B are plan views each showing the shapes of a ceramic green sheet prepared in a third embodiment and inner electrodes formed thereon.
Figure 16B:
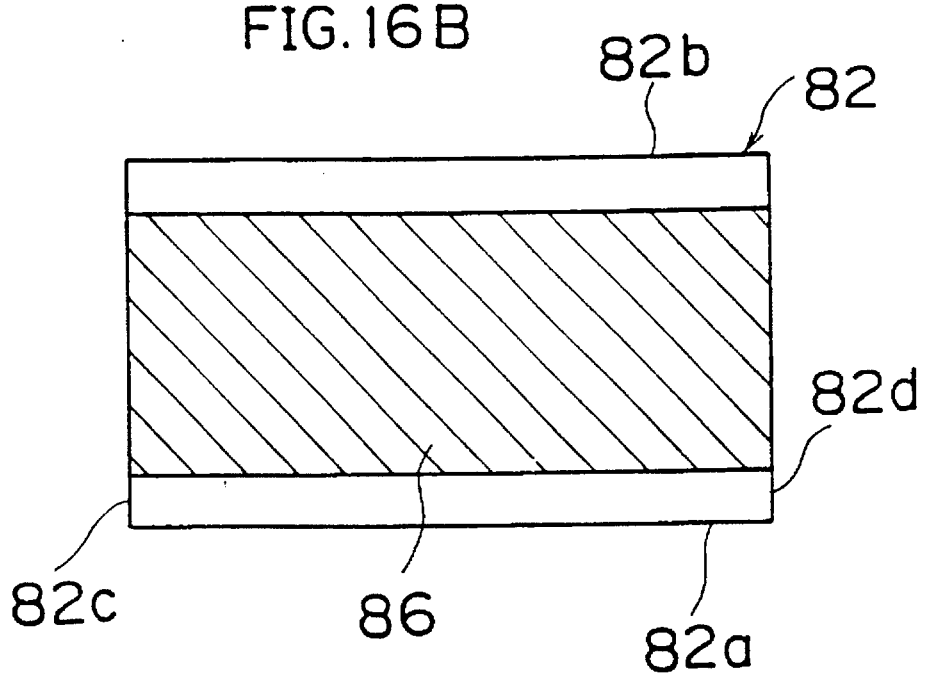

Ceramic green sheets 81 and 82 shown in FIGS. 16A and 16B are prepared in the same manner as that in the second embodiment.

Rectangular inner electrodes 83 to 85 are formed on the ceramic green sheet 81 so as to lead from an edge 81a toward an edge 81b. On the other hand, a rectangular inner electrode 86 is formed on the ceramic green sheet 82 so as to lead to not edges 82a and 82b but edges 82c and 82d extending in the width direction of the ceramic green sheet 82.

The above described inner electrodes 83 to 86 can be formed in the same manner as that in the second embodiment.

Figure 17:
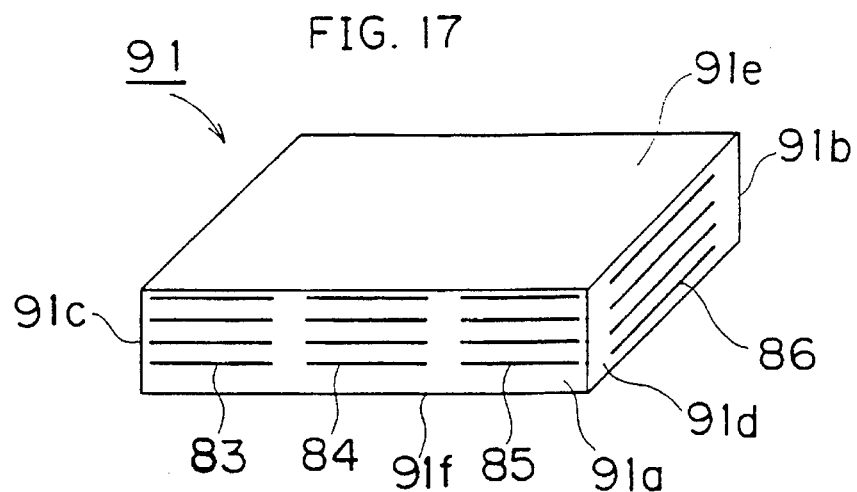
FIG. 17 is a perspective view showing a sintered body.

The above described ceramic green sheets 81 and 82 are then alternately laminated without changing the direction shown in FIGS. 16A and 16B, and a suitable number of plain ceramic green sheets are respectively laminated above and below the ceramic green sheets 81 and 82, followed by pressing in the thickness direction, thereby to obtain a laminated body. The laminated body is sintered, thereby to obtain a sintered body 91 shown in FIGS. 17 and 18.

Figure 18:
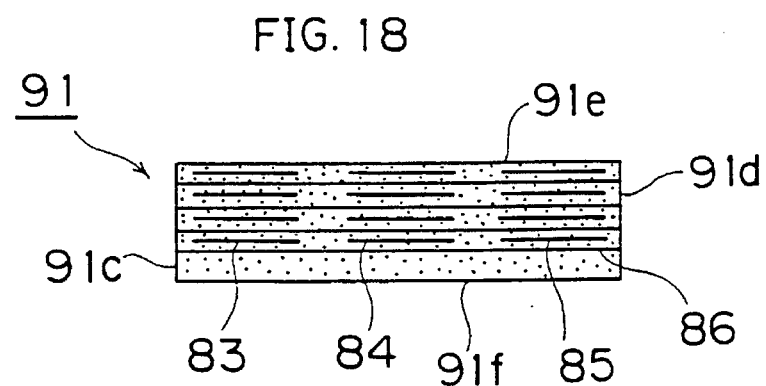
FIG. 18 is a cross sectional view taken along a line A—A shown in FIG. 17.
Figure 19:
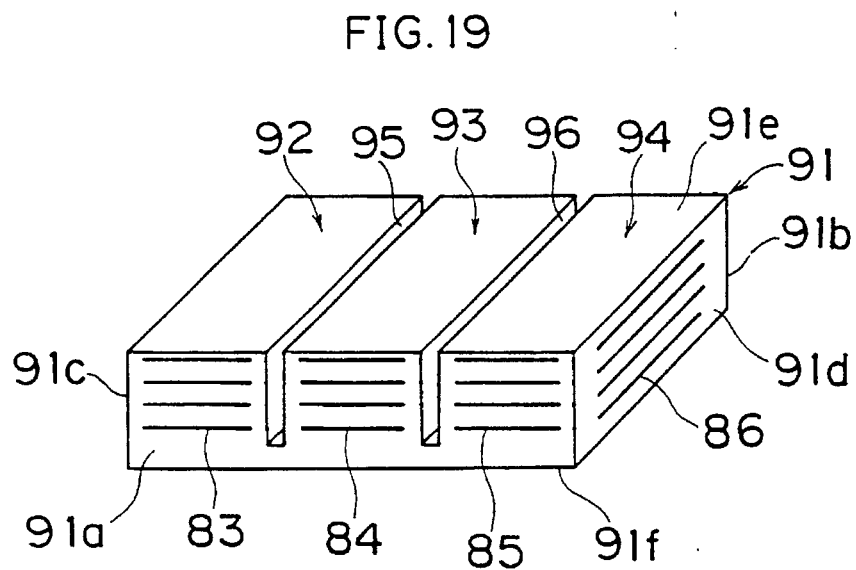
FIG. 19 is a perspective view showing the sintered body in which grooves are formed.

As apparent from FIG. 18, the inner electrodes 83 to 85 are alternately overlapped with the inner electrode 86, respectively, in the thickness direction in the center part of the sintered body 91. In addition, the above described inner electrodes 83 to 85 are exposed to end surfaces 91a and 91b of the sintered body 91, and the inner electrode 86 is exposed to end surfaces 91c and 91d thereof.

Grooves 95 and 96 are then formed so as to lead to a place lower than the lowermost inner electrode 86 but so as not to lead to a lower surface 91f of the sintered body 91 from an upper surface 91e thereof using a dicing machine or a diamond cutter. First to third capacitor units 92 to 94 are separately constructed by forming the grooves 95 and 96.

Figure 20:
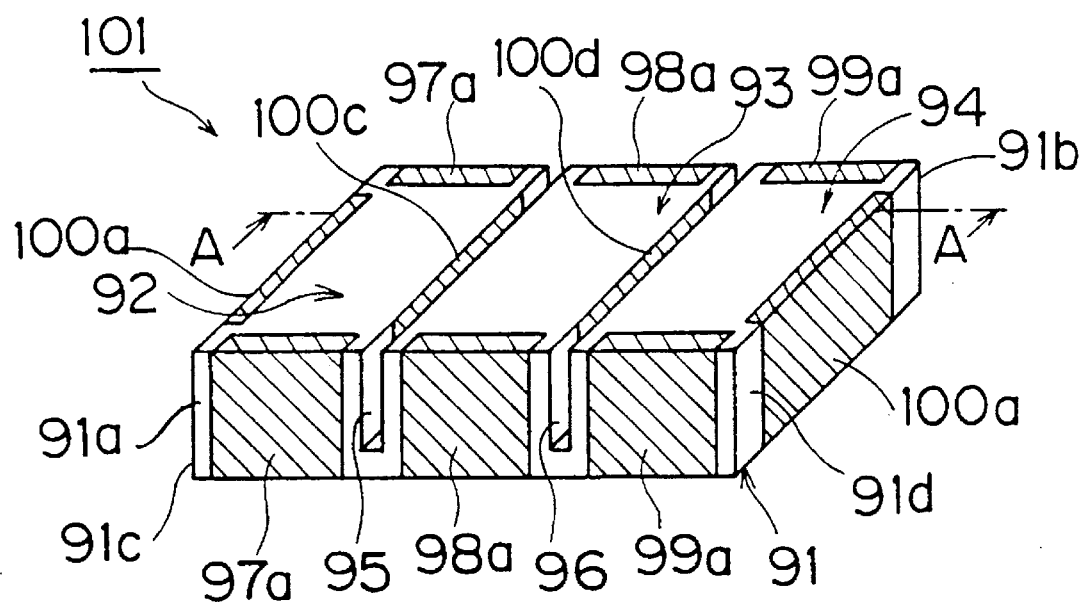
FIG. 20 is a perspective view showing a capacitor array according to the third embodiment.

Thereafter, as shown in FIG. 20, outer electrodes 97a to 99a electrically connected, respectively, to the inner electrodes 83 to 85 are formed on the end surfaces 91a and 91b of the sintered body 91, and outer electrodes 100a are formed on the end surfaces 91c and 91d thereof. In addition, outer electrodes 100c and 100d joined to portions, which remain in the respective capacitor units, of the inner electrodes 86 are respectively formed on the inner surfaces of the grooves 95 and 96.

In a capacitor array 101 according to the third embodiment obtained in the above described manner, the inner electrodes connected to respective one potentials of the capacitor units 92 to 94 are extended to the outer electrodes 100a which are common outer electrodes.

Also in the capacitor array according to the third embodiment, the capacitor units 92 to 94 are separated from each other by the above described grooves 95 and 96, thereby to make it possible to significantly reduce stray capacitance between the adjacent capacitor units.

With respect to the capacitor array according to the third embodiment, specific experiments are conducted in the same manner as the specific experiments in the second embodiment, to compare the capacitor array with a capacitor array in a comparative example in which the grooves 95 and 96 are not formed. The results are shown in the following table 2.

TABLE 2

| Comparison of Failure Rate | |
|---|---|
| Embodiment | Comparative Example |
| 0 (0%) | 6 (12%) |

As apparent from the table 2, after 1000 cycles of cooling and heating of −25° C.+125° C.−25° C. are terminated, the failure rate with respect to the insulation resistance value is low, i.e., 0% in the multilayer capacitor array in the third embodiment, so that it is found that the multilayer capacitor array is superior in reliability to the capacitor array in the comparative example.

Fourth Embodiment

Figure 22A:
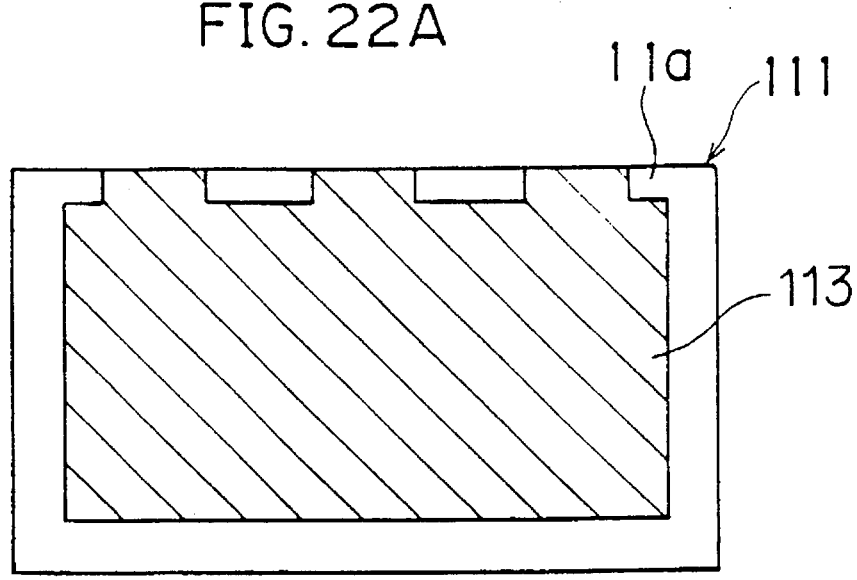
FIGS. 22A and 22B are plan views for each explaining the shapes of a ceramic green sheet prepared in a fourth embodiment and inner electrodes formed thereon.
Figure 22B:
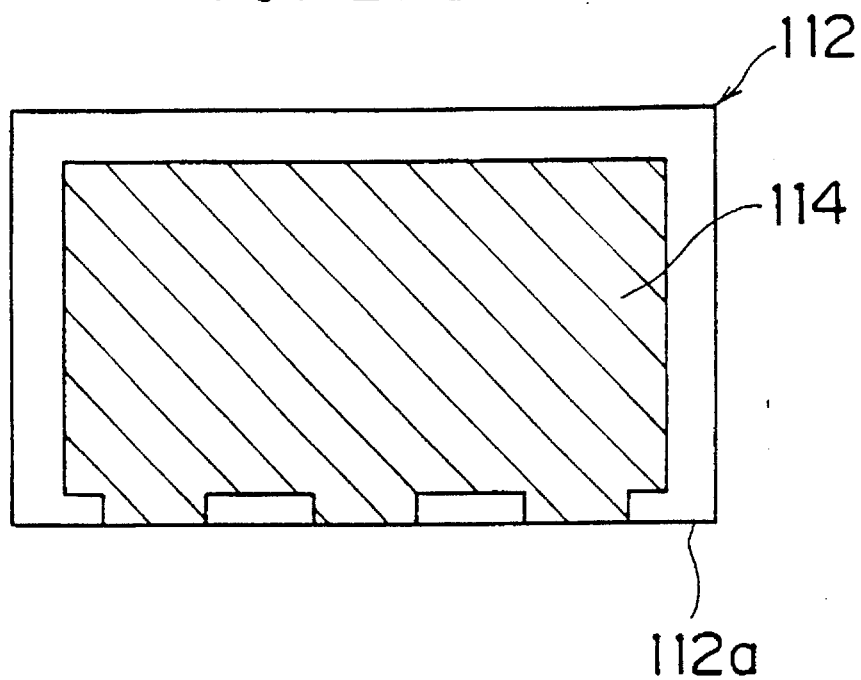

Ceramic green sheets 111 and 112 shown in FIGS. 22A and 22B are prepared in the same manner as that in the second embodiment.

Substantially rectangular inner electrodes 113 and 114 are respectively formed in the same manner as that in the second embodiment on the upper surfaces of the ceramic green sheets 111 and 112. The inner electrode 113 is exposed to one edge 11a of the ceramic green sheet 111 in three portions spaced apart from each other by a predetermined distance. Similarly, the inner electrode 114 is exposed to one edge 112a of the ceramic green sheet 112 (an edge positioned on the opposite side to the edge 111a of the ceramic green sheet 111 after lamination) in three portions spaced apart from each other by a predetermined distance.

The ceramic green sheets 111 and 112 are then alternately laminated without changing the direction shown in FIGS. 22A and 22B, and the subsequent processes are carried out as in the second and third embodiments, thereby to obtain a sintered body. The sintered body obtained is shown in FIGS. 23 and 24.

Figure 23:
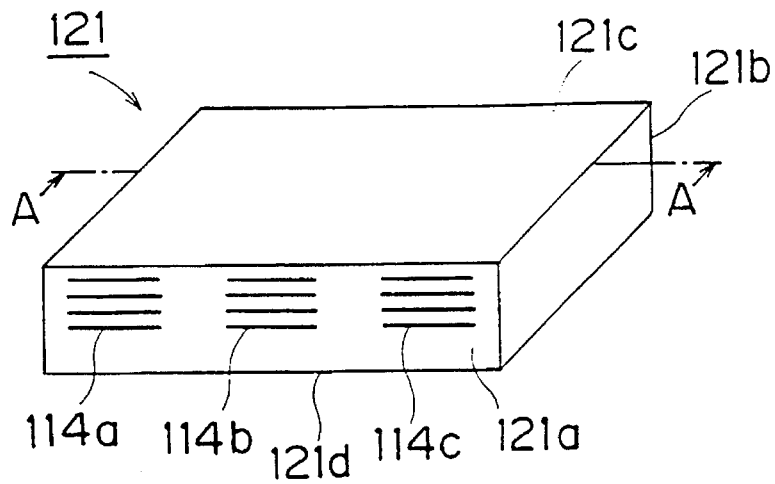
FIG. 23 is a perspective view showing a sintered body.
Figure 24:
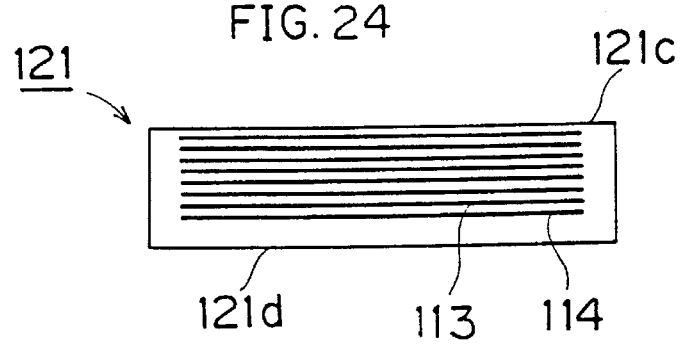
FIG. 24 is a cross sectional view taken along a line A—A shown in FIG. 23.
Figure 25:
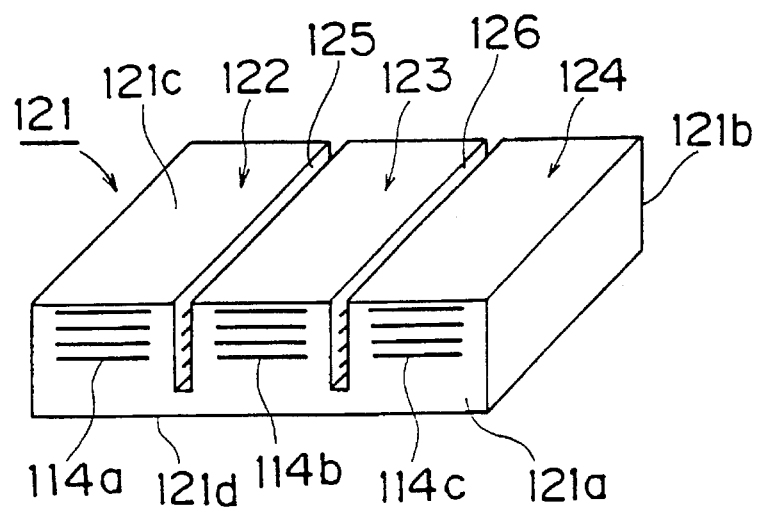
FIG. 25 is a perspective view showing a state where grooves are formed in the sintered body.

As apparent from FIGS. 23 and 24, the inner electrode 114 is exposed to one end surface 121a in the sintered body 121. Portions in which the inner electrode 114 is exposed to the end surface 121a are respectively represented by reference numerals 114a, 114b and 114c. In addition, the inner electrode 113 shown in FIG. 22 is exposed in the thickness direction to the other end surface 121b of the sintered body 121 in three portions, which is not apparent from FIG. 23.

Furthermore, as apparent from FIG. 24, the above described inner electrodes 113 and 114 are alternately laminated in the sintered body 121.

Grooves 125 and 126 are then formed from an upper surface 121c to a lower surface 121d of the above described sintered body 121 but so as not to lead to the lower surface 121d using a diamond cutter or a dying machine. As a result, first to third capacitor units 122 to 124 separated from each other by the grooves 125 and 126 are constructed by forming the grooves 125 and 126.

Specifically, the inner electrodes 113 and 114 are cut in two portions by forming the grooves 125 and 126, so that the inner electrodes 113 and 114 for constituting each of the capacitor units 112 to 124 are formed so as to be alternately overlapped with each other while being separated by a ceramic layer in the thickness direction of the sintered body 121.

Figure 26:
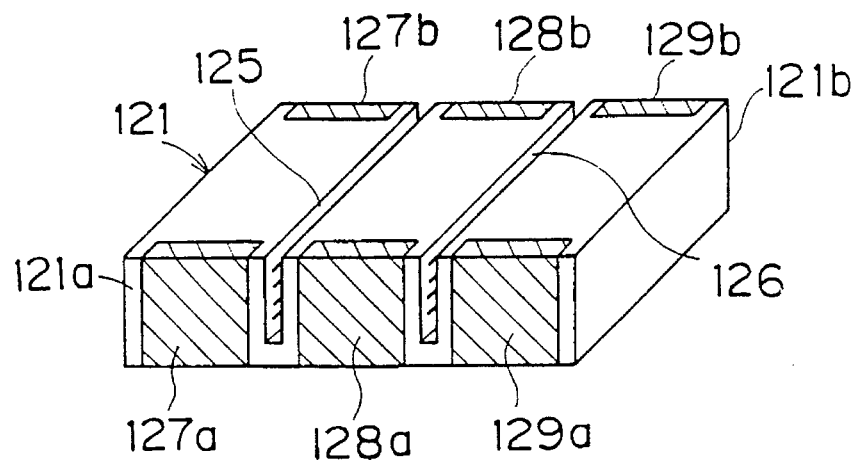
FIG. 26 is a perspective view showing a state where outer electrodes are formed in the fourth embodiment.
Figure 27:
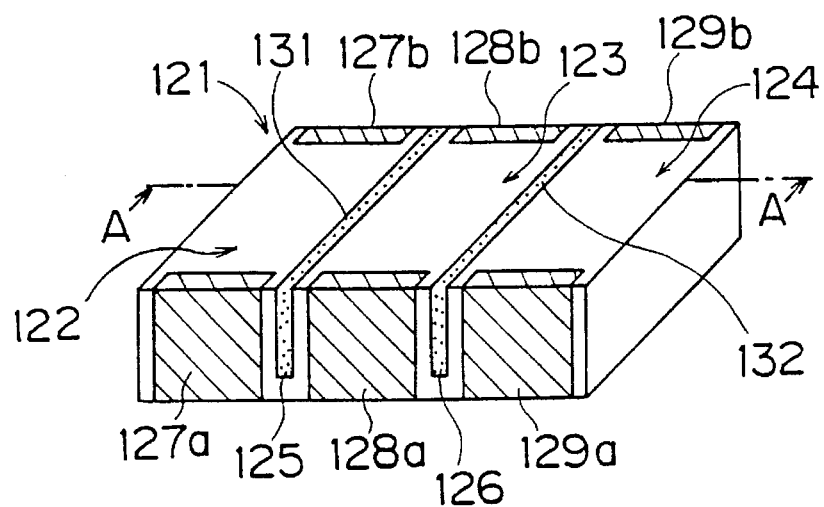
FIG. 27 is a perspective view showing a capacitor array according to the fourth embodiment.
Figure 28:
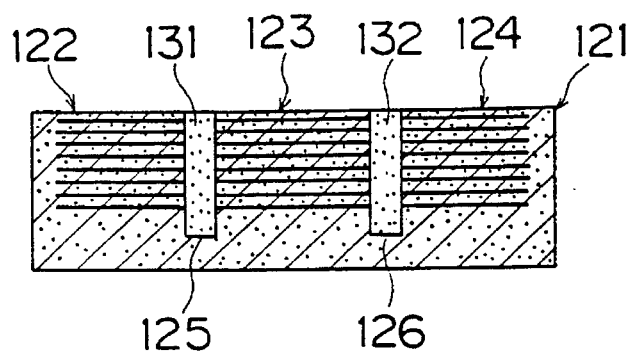
FIG. 28 is a cross sectional view taken along a line A—A shown in FIG. 27.
Figure 29A:
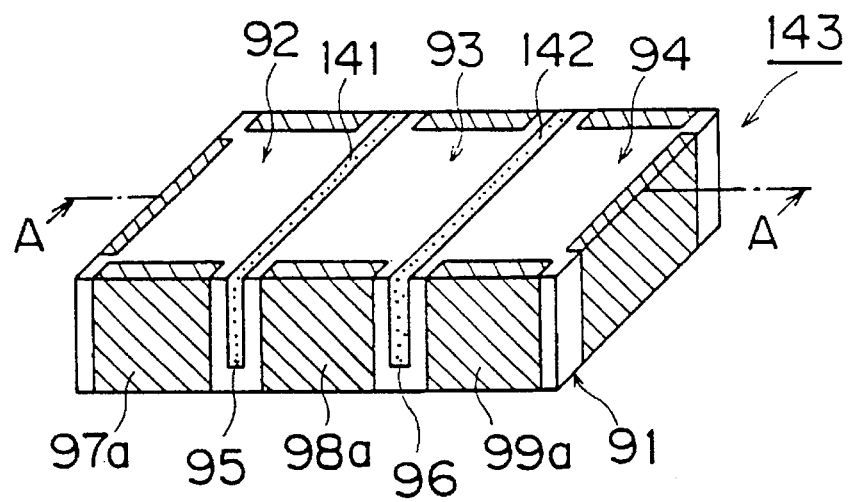
FIGS. 29A and 29B are a perspective view each showing a capacitor array according to a fifth embodiment and a cross sectional view taken along a line A—A.
Figure 29B:
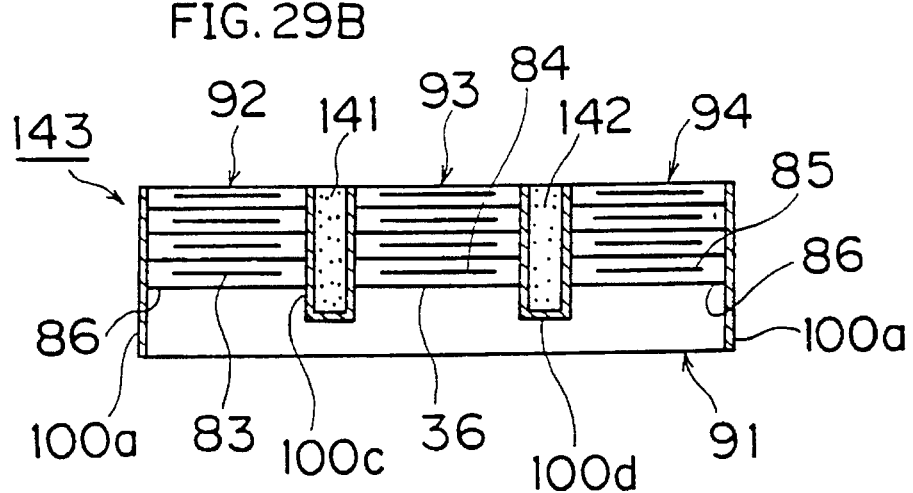

As shown in FIG. 26, outer electrodes 127a and 127b to 129a to 129b are formed as in the first embodiment on opposed end surfaces 121a and 121b of the ceramic sintered body 121. In addition, the grooves 125 and 126 are filled with Pb—Si—Al series glass, and the glass is baked at a temperature of 800° C., thereby to obtain a capacitor array 130 shown in FIGS. 27 and 28. In FIGS. 27 and 28, reference numerals 131 and 132 respectively denote insulating material layers constructed by baking the glass as described above. In the present embodiment, the adjacent capacitor units 122 to 124 are separated from each other by the above described insulating material layers 131 and 132, thereby to make it possible to significantly reduce stray capacitance produced between the adjacent capacitor units, as in the first and second embodiments.

Moreover, the insulating material layers 131 and 132 are formed so as to fill the grooves 125 and 126, so that the mechanical strength is increased. Although in the present embodiment, Pb—Si—Al series glass is used as a material composing the insulating material layers 131 and 132, an arbitrary insulating material, for example, another glass or synthetic resin may be used, provided that the dielectric constant thereof is significantly lower than that of dielectric ceramics composing the sintered body 121.

Fifth Embodiment

Figure 21:
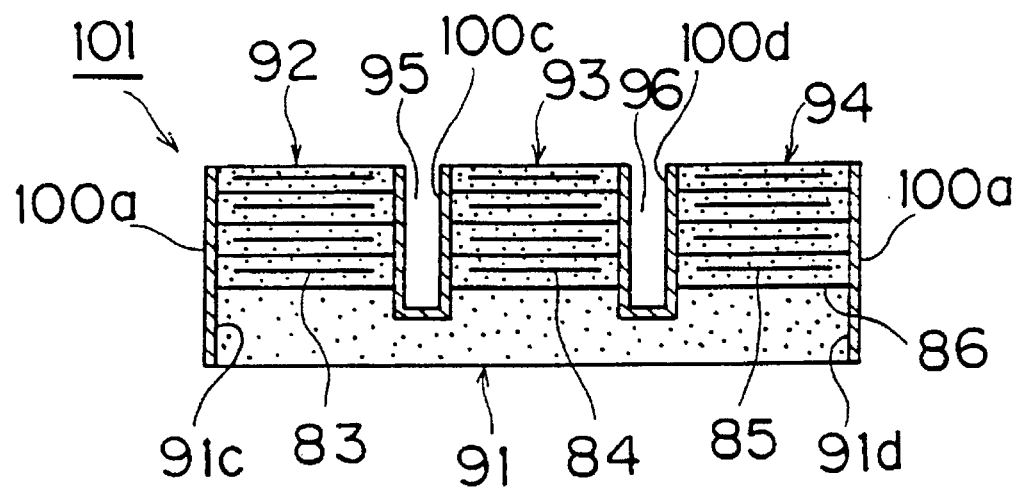
FIG. 21 is a cross sectional view taken along a line A—A shown in FIG. 20.

A fifth embodiment is a further improvement over the capacitor array according to the third embodiment. Specifically, the fifth embodiment is the same as the third embodiment except that in the capacitor array 101 shown in FIGS. 20 and 21, grooves 95 and 96 are further filled with Pb—Si—Al series glass and the glass is baked at a temperature of 800° C., thereby to form insulating material layers.

In a capacitor array according to the fifth embodiment, therefore, first to third capacitor units 92 to 94 are separated from each other by insulating material layers 141 and 142 with which the grooves 95 and 96 are respectively filled. In the capacitor array 143 according to the fifth embodiment, the insulating material layers 141 and 142 are formed between the adjacent capacitor units as described above, thereby to make it possible not only to significantly reduce stray capacitance between the adjacent capacitor units as well as to increase the mechanical strength, as in the capacitor array 51 according to the third embodiment.

Sixth Embodiment

Figure 30A:
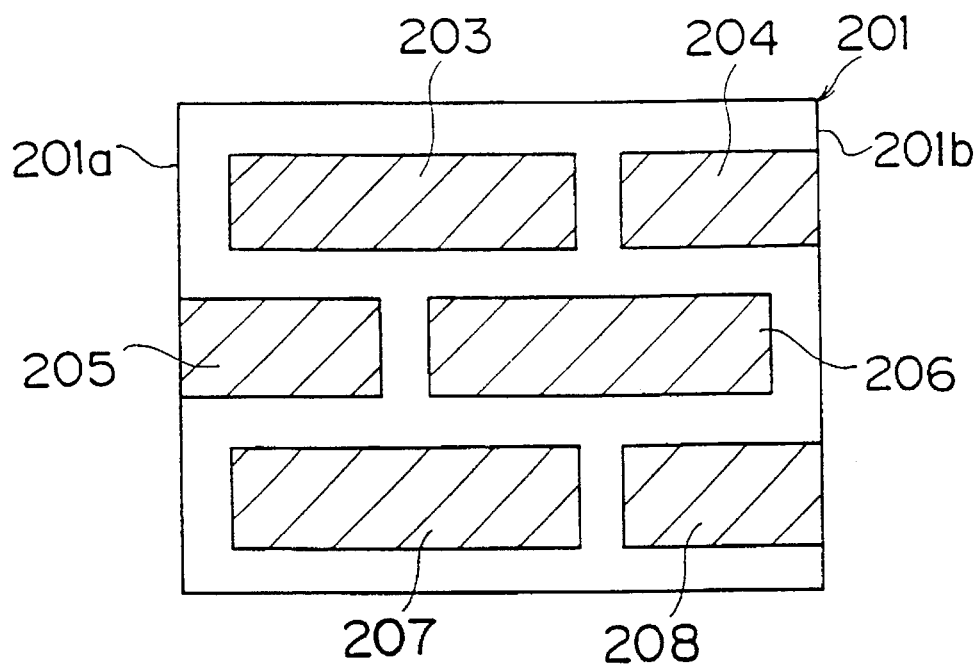
FIGS. 30A and 30B are plan views each showing the shapes of a ceramic green sheet prepared in a sixth embodiment and inner electrodes formed thereon.
Figure 30B:
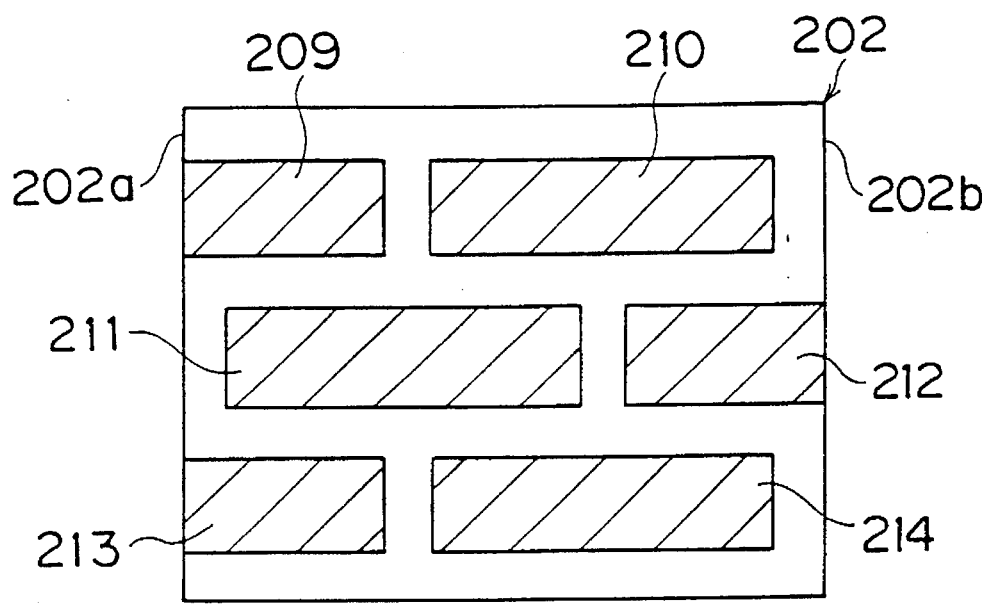

As shown in FIGS. 30A and 30B, rectangular ceramic green sheets 201 and 202 are first prepared. The ceramic green sheets 201 and 202 are obtained by cutting a ceramic green sheet, which is obtained by forming a slurry obtained by thoroughly mixing dielectric ceramic powder such as barium titanate series ceramic powder with a known and commonly used binder and organic solvent using a suitable sheet forming process such as the Doctor blade process.

Rectangular inner electrodes 203 to 208 are formed on the upper surface of the ceramic green sheet 201 by printing a conductive paste so as to extend in the length direction from one edge 201a to the other edge 201b. Similarly, rectangular inner electrodes 209 to 214 are also formed on the upper surface of the ceramic green sheet 202 by printing a conductive paste so that the direction in which edges 202a and 202b extend is the length direction.

The inner electrodes 203 to 208 are arranged on the upper surface of the ceramic green sheet 201 so that the respective widths are equal to each other, and the inner electrodes 203 and 204 constitute the same row, the inner electrodes 205 and 206 constitute the same row and the inner electrodes 207 and 208 constitute the same row. Similarly, the inner electrodes 209 to 214 are arranged on the upper surface of the ceramic green sheet 202 so that the inner electrodes 209 and 210 constitute the same row, the inner electrodes 211 and 212 constitute the same row and the inner electrodes 213 and 214 constitute the same row.

As the above described conductive paste, a conductive paste containing Ag, a Ag—Pd alloy or the like is used. However, the inner electrodes 203 to 208 and 209 to 214 may be formed by a conductive film forming process such as evaporation or plating in addition to printing of the conductive paste.

Figure 31:
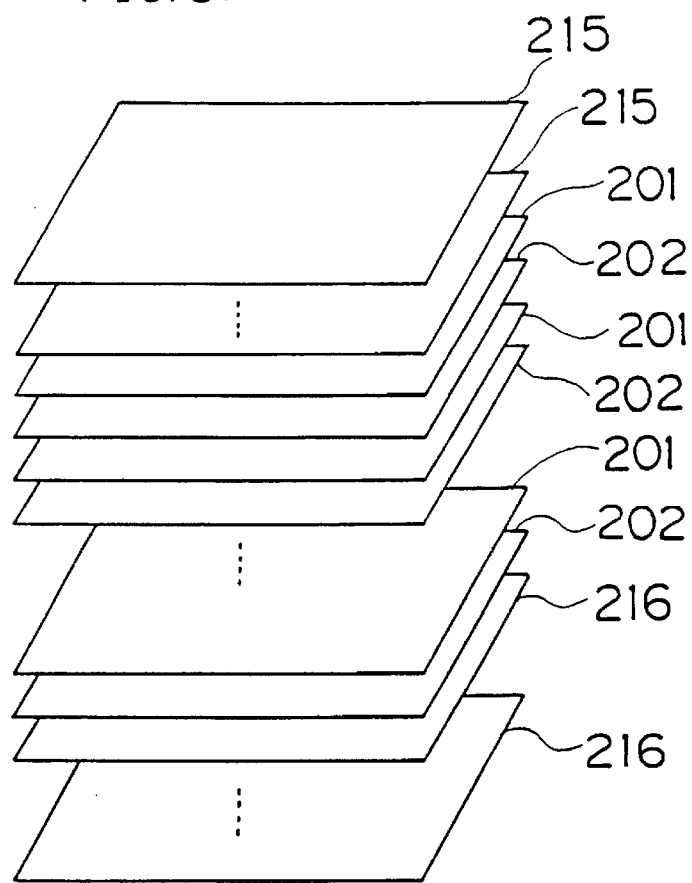
FIGS. 31 is a schematic perspective view for explaining the process of laminating a plurality of ceramic green sheets.

A plurality of ceramic green sheets 201 and a plurality of ceramic green sheets 202 are then prepared and are respectively alternately laminated without changing the direction shown in FIGS. 30A and 30B, and a suitable number of plain ceramic green sheets 215 and 126 are respectively laminated above and below the ceramic green sheets 210 and 202, as schematically shown in FIG. 31, followed by pressing in the thickness direction, thereby to obtain a laminated body. The laminated body obtained is sintered, thereby to obtain a sintered body 217 shown in FIGS. 32 and 33.

Figure 32:
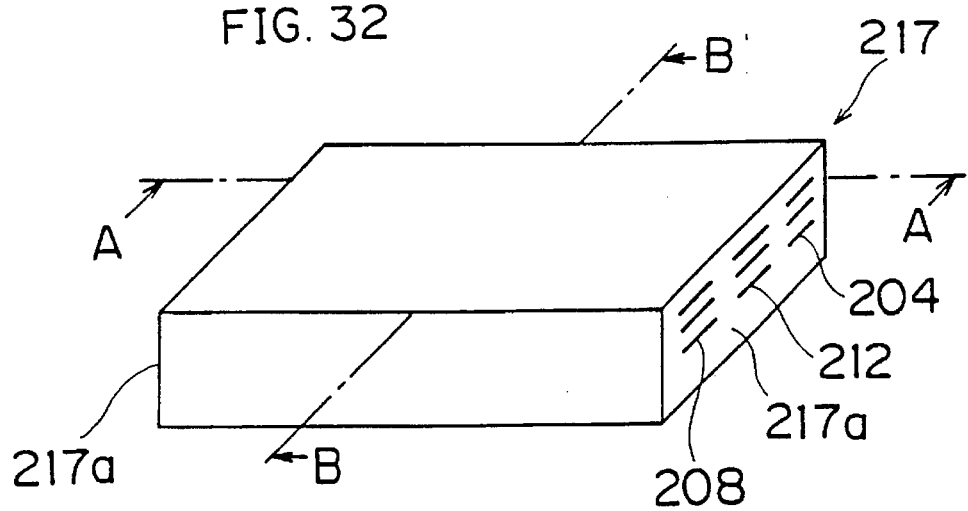
FIG. 32 is a perspective view showing a sintered body.

As apparent from FIG. 32, the inner electrodes 204, 208 and 212 are exposed to one end surface 217a of the sintered body 217, as can be seen with reference to FIGS. 30A and 30B. Similarly, the inner electrodes 205, 209 and 213 shown in FIGS. 30A and 30B are exposed to the other end surface 217b, which is not illustrated.

Figure 33A:
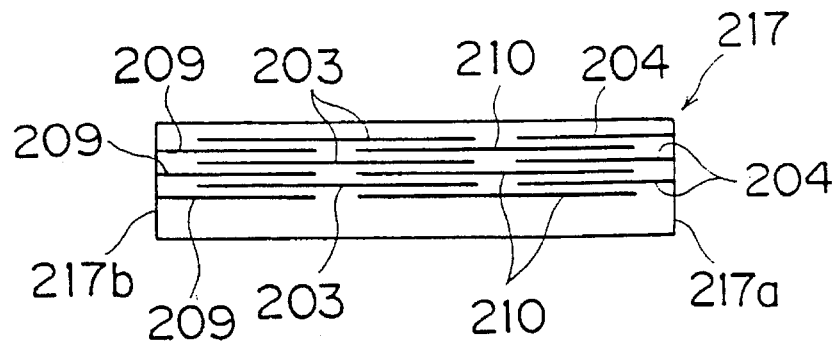
FIGS. 33A and 33B are respectively schematic cross sectional views taken along a line A—A and a line B—B shown in FIG. 32.
Figure 33B:
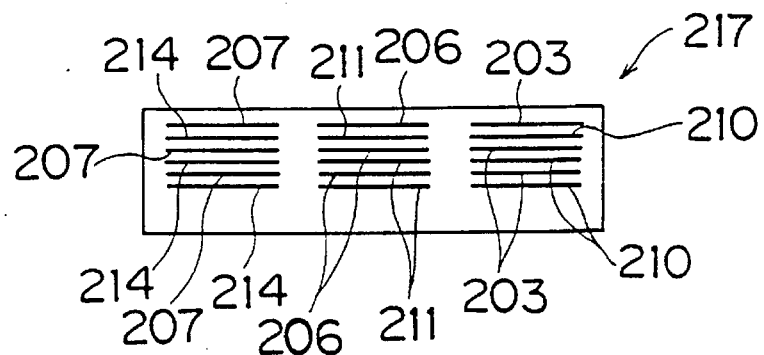

Furthermore, although FIGS. 33A and 33B are respectively cross sectional views taken along a line A—A and a line B—B shown in FIG. 32 (hatching is omitted so as to make the illustration of the inner electrodes understandable. Hatching is similarly omitted in the following similar drawings), it is found that the inner electrode on the ceramic green sheet 201 and the inner electrode on the ceramic green sheet 202 are alternately laminated while being separated by a sintered body layer.

Figure 34:
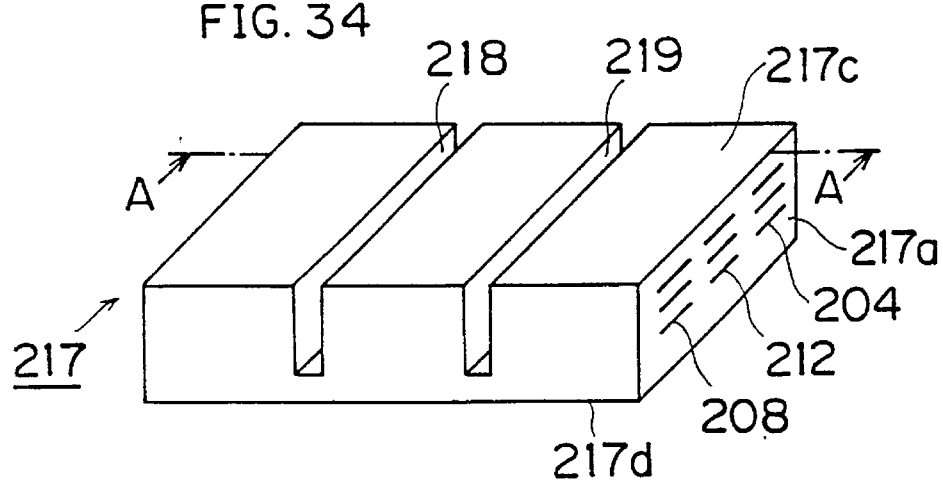
FIG. 34 is a perspective view showing the sintered body in which grooves are formed.
Figure 35:
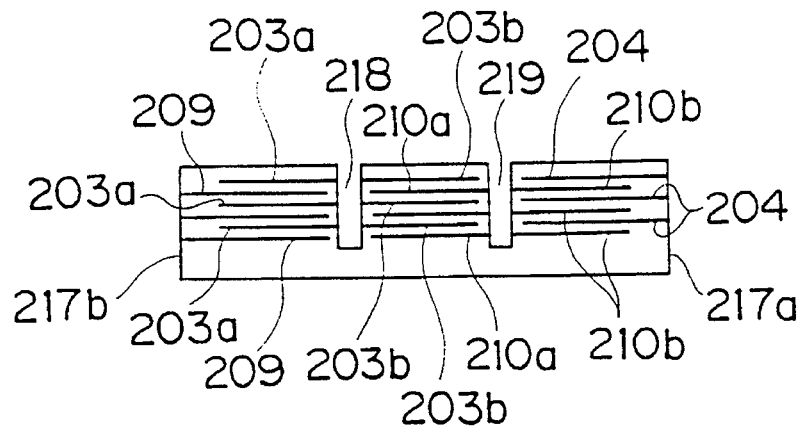
FIG. 35 is a cross sectional view taken along a line A—A shown in FIG. 34.

As shown in FIG. 34, grooves 218 and 219 are then formed from an upper surface 217c of the ceramic sintered body 217 toward a lower surface 217d thereof but so as not to lead to the lower surface 217d. FIG. 35 is cross sectional view showing portions taken along a line A—A shown in FIG. 34. As apparent from FIG. 35, the inner electrode 203 shown in FIG. 30 is divided by forming the groove 218, so that inner electrodes 203a and 203b are exposed to the groove 218. Similarly, the inner electrode 210 formed on the upper surface of the ceramic green sheet 202 is divided by the groove 219, so that inner electrodes 210a and 210b are exposed to both sides of the groove 219 and to the inner surface of the groove 219. Specifically, the above described groove 218 is formed so as to divide the inner electrodes 203 and 207 shown in FIG. 30 in the width direction, and the inner electrode 211 formed on the upper surface of the ceramic green sheet 202 is similarly divided into two inner electrodes having an equal length, which is not necessarily apparent from FIG. 35.

Although the inner electrode 210 is similarly divided into the two inner electrodes 210a and 210b having an equal length by forming the groove 219, each of the inner electrodes 206 and 214 shown in FIG. 30 is also divided into two inner electrode portions.

The above described grooves 218 and 219 can be processed using a diamond cutter, a dicing machine or the like. In addition, it is preferable that the width of the grooves 218 and 219 is set to such a width that the inner electrodes 204 and 209 are not exposed to the grooves 218 and 219, and the depth of the grooves 218 and 219 is so selected that each of the grooves leads to a place lower than the lowermost one of the inner electrodes overlapped with each other, as apparent from FIG. 35. The reason for this is that the grooves 218 and 219 are portions having outer electrodes respectively formed on their inner peripheral surfaces in the process as described later, and the grooves 218 and 219 respectively constitute portions for separating the adjacent capacitors from each other.

Figure 36:
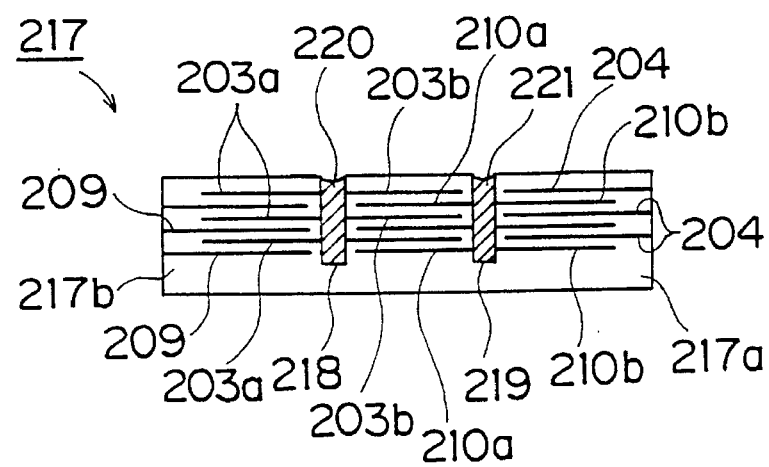
FIG. 36 is a cross sectional view showing a state where grooves are filled with a conductive paste.

As apparent from FIG. 36 which is a cross sectional view of portions shown in FIG. 35, the above described grooves 218 and 219 are then filled with an Ag paste or an Ag—Pd paste 220 and 221 using, for example, a microdispenser.

Figure 37:
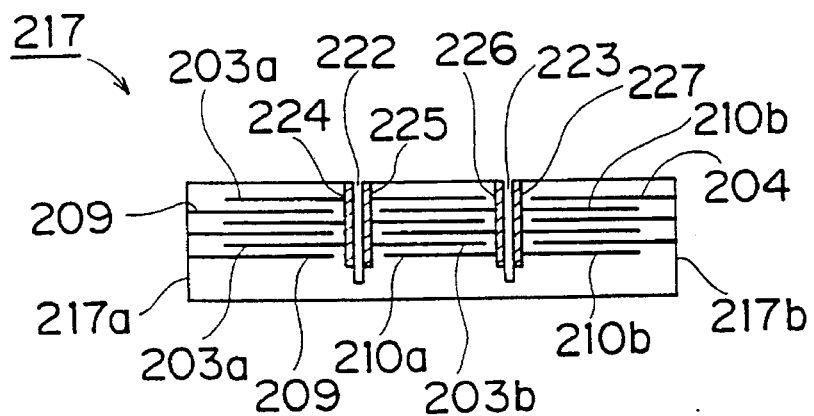
FIG. 37 is a cross sectional view showing a state where relatively narrow grooves are formed so as to form outer electrodes.

Thereafter, the above described conductive pastes 220 and 221 are baked at a temperature of, for example, 850° C., thereby to form conductive layers. In the conductive layers constructed in the above described manner, deeper grooves 222 and 223 than the conductive layers are formed, as shown in FIG. 37. The grooves 222 and 223 must be formed so as to be narrower than the grooves 218 and 219 first formed and so as to be deeper than the grooves 218 and 219 first formed. Therefore, outer electrodes 224 and 227 are formed on both sides of the grooves 222 and 223, as shown in FIG. 37. The outer electrodes 224 and 227 are formed by respective remaining parts of the above described conductive layers 220 and 221, and are electrically connected to the inner electrodes 203a, 203b, 210a and 210b exposed to the grooves 218 and 219. The outer electrode 224 is taken as an example. The outer electrode 224 is electrically connected to the inner electrodes 203a shown in FIG. 35 and respective ones of inner electrodes obtained by respectively dividing the inner electrodes 207 and 211 shown in FIG. 30. Similarly, the inner electrodes in the sintered body 217 are electrically connected every other one in the thickness direction to each of the other outer electrodes 225 to 227.

Figure 38:
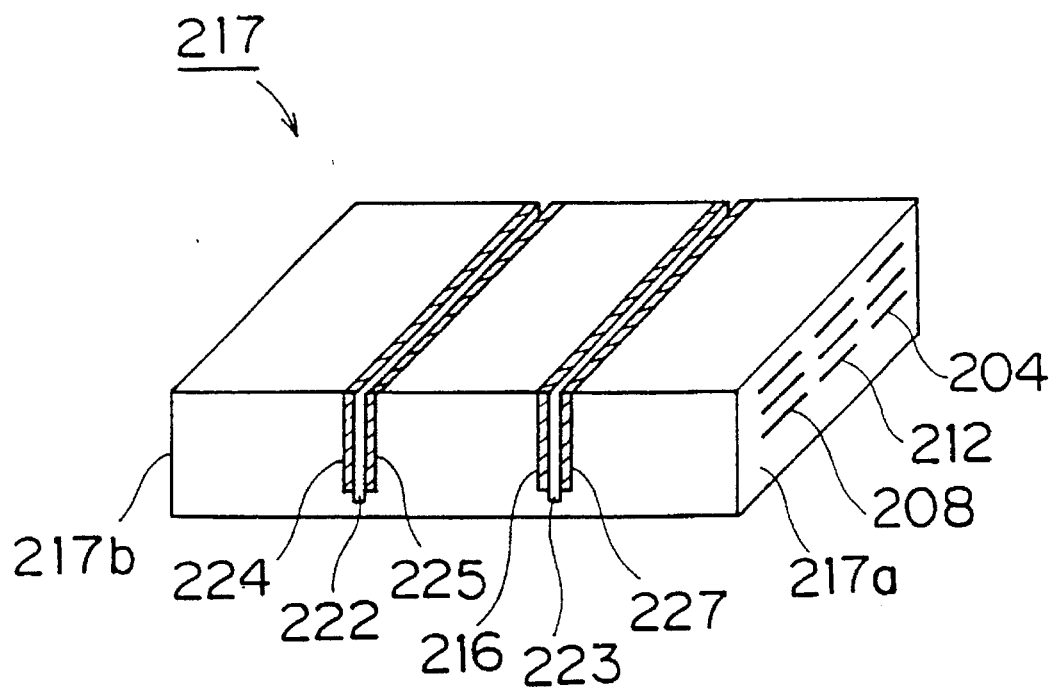
FIG. 38 is a perspective view showing a sintered body in which the outer electrodes are formed on inner walls of the grooves.
Figure 39:
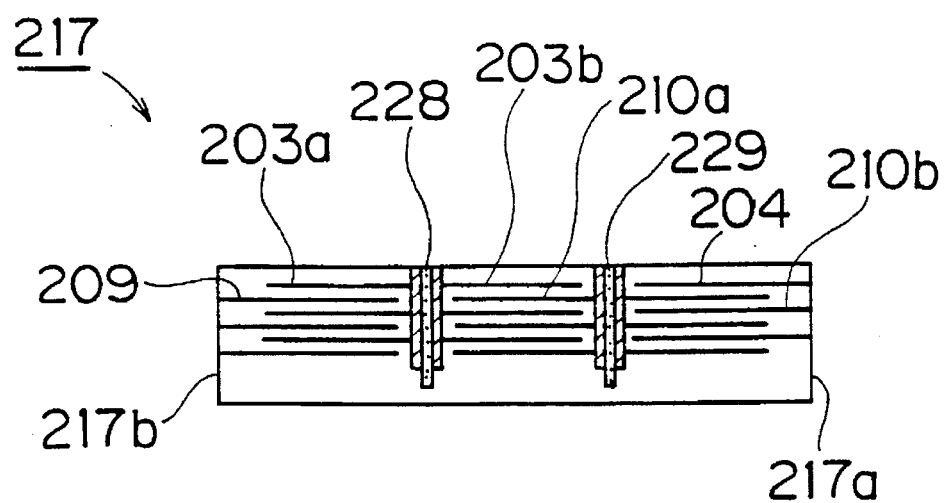
FIG. 39 is a cross sectional view showing a state where dielectric layers having a low dielectric constant composed of a glass paste are formed in the grooves in which outer electrodes are formed.

A sintered body in which the above described outer electrodes 224 and 227 are formed is illustrated in a perspective view of FIG. 38. The above described grooves 222 and 223 are filled with a glass paste containing a material having a lower dielectric constant than that of the sintered body 217 composed of Pb—Al—Si series glass or the like using the microdispenser, as illustrated in FIG. 39 which is a cross sectional view of portions shown in FIG. 37, thereby to form dielectric layers 228 and 229. When the grooves are filled with the above described glass paste to form the dielectric layers 228 and 229, the dielectric layers 228 and 229 are constructed by heat-treating the glass paste at a temperature of, for example, approximately 800° C. after the filling. However, a material composing the dielectric layers 228 and 229 is not limited to the above described glass paste. An arbitrary material can be used, provided that the dielectric constant thereof is lower than the dielectric constant of ceramics composing the sintered body 217. The dielectric layers 228 and 229 can be formed by suitable processing depending on the type of material.

Furthermore, the dielectric layers 228 and 229 must be formed so as not to cover the upper surfaces of the outer electrodes 224 to 227 disposed on both sides.

Figure 40:
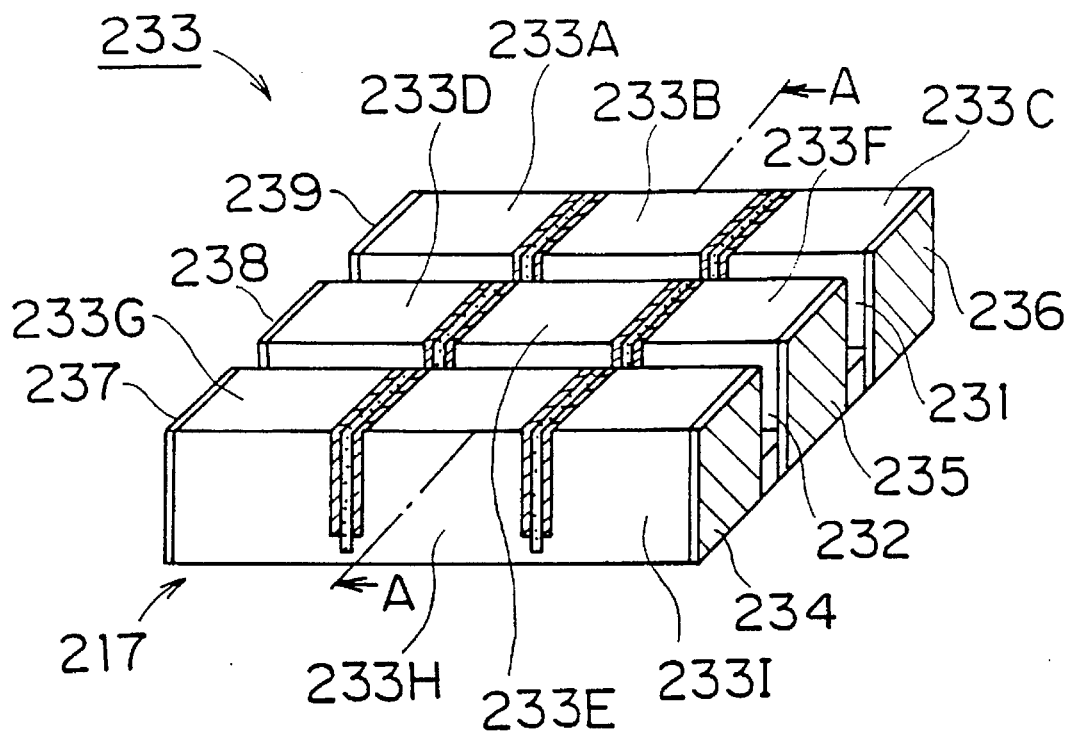
FIG. 40 is a perspective view showing a capacitor array according to a seventh embodiment.

Grooves 231 and 232 shown in FIG. 40 are formed in the sintered body 217 in the direction orthogonal to the above described grooves 218, 219, 222 and 223.

Figure 41:
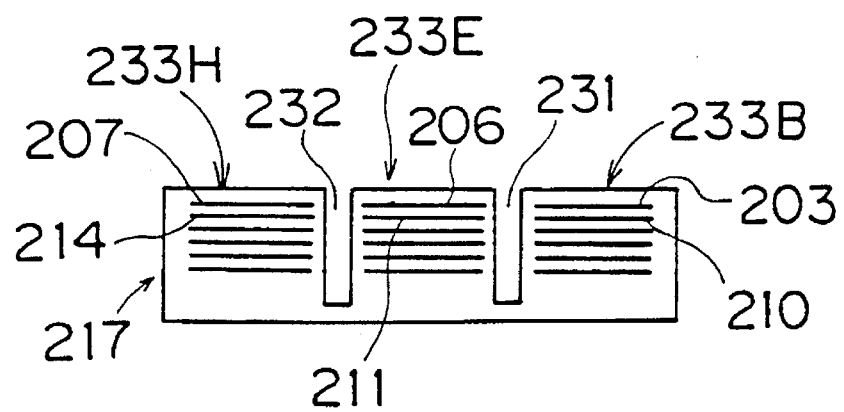
FIG. 41 is a cross sectional view taken along a line A—A shown in FIG. 40.

As apparent from FIG. 41 which is a cross sectional view taken along a line A—A shown in FIG. 40, the above described grooves 231 and 232 are formed so as to have such a width that inner electrodes disposed on both sides of each of the grooves 231 and 232 are not exposed to inner walls of the groove. Description is made with reference to the inner electrodes formed on the ceramic green sheets 201 and 202 shown in FIG. 30. The above described groove 231 is formed between the row in which the inner electrodes 203 and 204 are formed and the row in which the inner electrodes 205 and 206 are so formed that the inner electrodes 203 and 204 and the inner electrodes 205 and 206 are separated from each other, and the groove 231 is formed so as to have such a width that side edges of the inner electrodes 203, 204, 205 and 206 are not exposed to the groove 231. The same is true for the groove 232.

The inner electrodes exposed to outer end surfaces of the capacitor units constructed on both sides of each of the rows are constructed by respectively forming outer electrodes 234 to 239 as shown on both end surfaces 217a and 217b of the sintered body 217. The outer electrodes 234 to 239 can be formed in accordance with a known outer electrode forming process.

In the above described manner, a multilayer capacitor array 233 according to the present embodiment shown in FIG. 40 is obtained. In the multilayer capacitor array 233 according to the present embodiment, nine capacitor units are constructed. Specifically, capacitor unit portions in three rows separated by the grooves 231 and 232 are constructed, and the capacitor unit portion in each of the rows has three capacitor units separated by the above described dielectric layers 228 and 229. That is, in the present embodiment, a capacitor array in a matrix of m=3 and n=3 is constructed. In FIG. 40, the respective capacitor units are represented by reference numerals 233A to 233I.

Furthermore, although in the above described embodiment, the ceramic green sheets 201 and 202 shown in FIG. 30 are used, and are directly laminated, thereby to obtain the capacitor array 233 in a matrix of 3 rows and 3 column by passing through the respective processes, a larger ceramic green sheet may be used to fabricate a capacitor array in a matrix of m≧4 and n≧4 and then, cut in the thickness direction to obtain a capacitor array in a matrix of 3 rows and 3 columns shown in FIG. 40.

Description is now made of the results of specific experiments.

As the ceramic green sheets 210 and 202, a ceramic green sheet obtained by forming a slurry mainly composed of barium titanate series dielectric ceramic powder in a thickness of 10 μm is used. Inner electrodes are formed by applying an Ag—Pd paste and baking the same, thereby to obtain a sintered body having dimensions of 8.1 mm long, 8.1 mm wide and 1.0 mm thick as the sintered body 217 shown in FIG. 32. Thereafter, the above described grooves 218 and 219 are formed (300 μm wide), and the grooves 218 and 219 are filled with an Ag paste as a conductive paste composing outer electrodes, and the Ag paste is baked at a temperature of 850° C. to form the above described grooves 222 and 223, thereby to form the outer electrodes 224 to 227 facing the grooves 222 and 223. In addition, the grooves 222 and 223 are constructed by forming narrower grooves (100 μm wide) than the grooves 218 and 219 (300 μm wide), further filling the grooves with Pb—Al—Si series glass as the above described dielectric layers and heat-treating the glass at a temperature of 800° C., thereby to finally obtain the capacitor array 233 in a matrix of 3 rows and 3 columns having a plane shape measuring 2.5 mm by 2.5 mm.

Figure 42A:
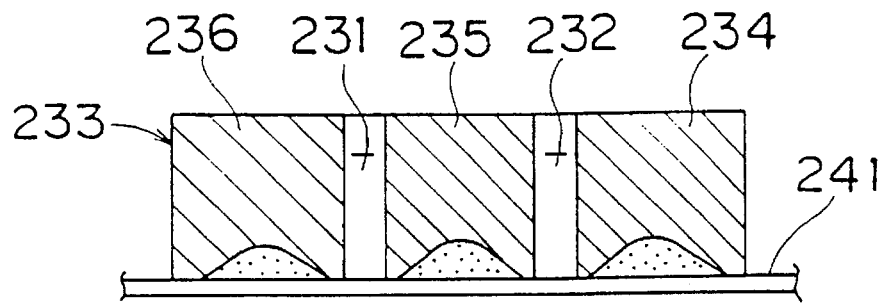
FIGS. 42A and 42B are respectively side views showing states where the capacitor array in a seventh embodiment and a capacitor array in a comparative example are mounted on a circuit board for testing.
Figure 42B:
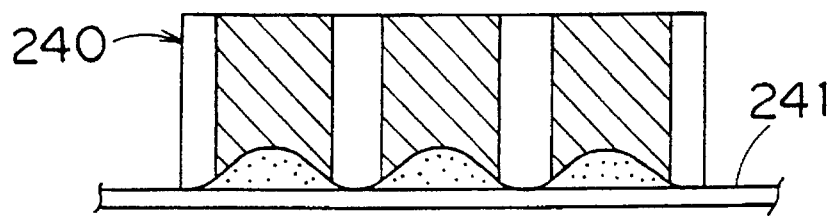

The above described capacitor array 233 and the conventional capacitor array 240 in which the above described grooves 222, 223, 231 and 232 are not formed for comparison are prepared. As shown in FIGS. 42A and 42B, the capacitor arrays 233 and 240 are respectively mounted on a circuit board for teasing 241 using solder with they being turned upside down in the direction shown in FIG. 40. The processes of cooling each of the capacitor arrays to a temperature of −25° C. with it being mounted on the circuit board for testing 241 and then, heating the capacitor array to a temperature of +125° C. and cooling the same to a temperature of −25° C. again are then taken as one cycle. After 1000 cycles of cooling and heating are terminated, the insulation resistance of the capacitor array is measured.

A sample in which the insulation resistance is changed by not less than 10% from the initial insulation resistance is considered as a failure. The above described measurements are made with respect to respective 50 capacitor arrays in the embodiment and the comparative example. The results are shown in the following table 3. When the above described failure exists in one capacitor unit in one capacitor array, the one capacitor array is counted as a failure.

TABLE 3

| Comparison of Failure Rate | |
|---|---|
| Embodiment | Comparative Example |
| 0 (0%) | 12 (24%) |

As apparent from the table 3, the failure rate is 24% in the capacitor array in the comparative example, while the above described failure does not occur in the capacitor array 233 in the embodiment.

Seventh Embodiment

Figure 43:
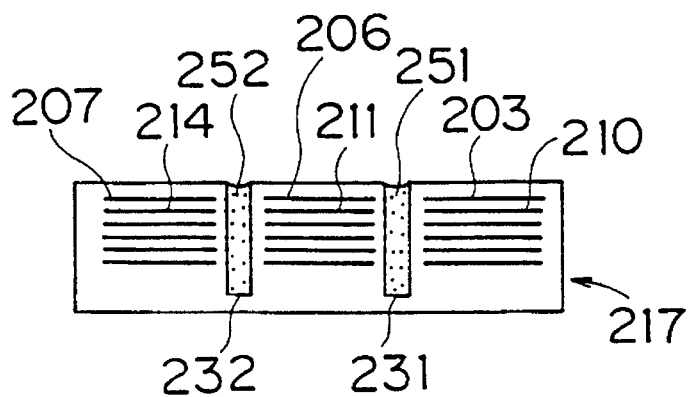
FIG. 43 is a cross sectional view for explaining the capacitor array according to the seventh embodiment.

A capacitor array 233 shown in FIG. 40 is first obtained in the same manner as that in the sixth embodiment. Thereafter, grooves 231 and 232 of the capacitor array 233 are filled with a glass paste mainly composed of Pb—Al—Si series glass powder using a microdispenser, as shown in a cross sectional view of FIG. 43, and the glass paste is heat-treated at a temperature of, for example, 800° C., thereby to form dielectric layers 251 and 252. The other construction is entirely the same as that in the sixth embodiment and hence, the description of the sixth embodiment shall be incorporated in the seventh embodiment.

Since in the seventh embodiment, dielectric layers having a lower dielectric constant than that of the above described sintered body 217 are respectively formed in the above described grooves 231 and 232, stray capacitance between capacitor units on both sides of each of the grooves 231 and 232 is effectively reduced. Moreover, in the seventh embodiment, the grooves 231 and 232 are also filled with the above described solid dielectric layers, so that the capacitor array in the seventh embodiment is superior in mechanical strength to the capacitor array in the sixth embodiment.

Although in the above described embodiments, the grooves for separating the adjacent capacitor units are formed so as to extend from the upper surface to the lower surface of the sintered body, the grooves may be formed from the lower surface to the upper surface, or the grooves may be formed so as to extend in the thickness direction from both the upper surface and the lower surface. In order to reliably reduce the stray capacitance between the adjacent capacitor units, however, the grooves must be positioned beside a portion where the inner electrodes overlapped with each other are positioned. Consequently, it is preferable that the grooves are formed from one of the upper surface and the lower surface.

Eighth Embodiment

Although in the above described first to seventh embodiments, the plurality of inner electrodes constituting each of the capacitor units are so disposed as to be overlapped with each other in the thickness direction of the sintered body, the plurality of inner electrodes may be overlapped with each other while being separated by the ceramic layer not in the thickness direction of the sintered body constituting the capacitor array but in the direction orthogonal to the thickness direction. In addition, major surfaces of the sintered body are one surface to be mounted on a printed circuit board or the like and another surface opposing to the one surface. Further, the thickness of the sintered body is a distance between the major surfaces and the thickness direction is one perpendicular to major surfaces.

Figure 44:
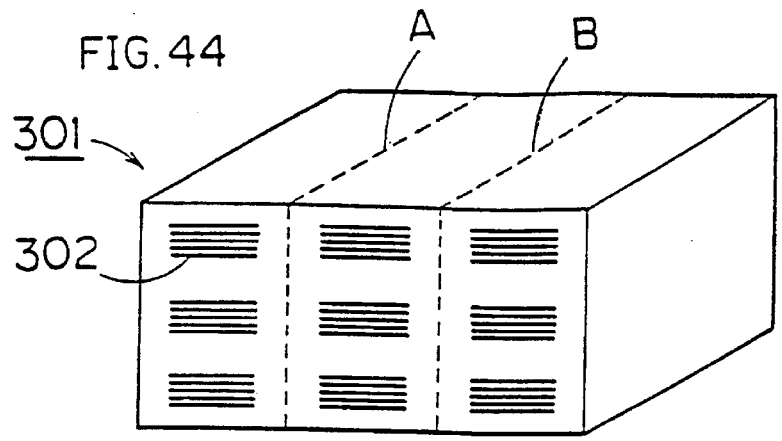
FIG. 44 is a perspective view showing a mother laminated body prepared in an eighth embodiment.

Such an example will be described with reference to FIGS. 44 to 46. As shown in FIG. 44, a mother laminated body 301 has a plurality of inner electrodes 302. The plurality of inner electrodes 302 are laminated while being separated by a ceramic layer so as to constitute one capacitor unit. A plurality of capacitor unit portions each constructed by laminating the plurality of inner electrodes 302 are disposed side by side in the thickness direction and in the lateral direction in the mother laminated body 301.

Figure 45:
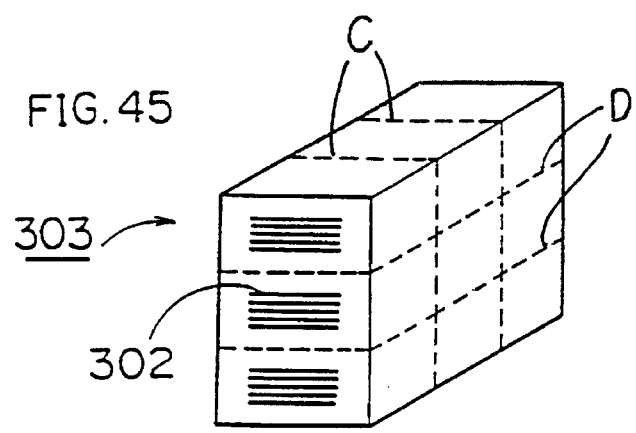
FIG. 45 is a perspective view showing a sintered body obtained in the eighth embodiment.
Figure 46:
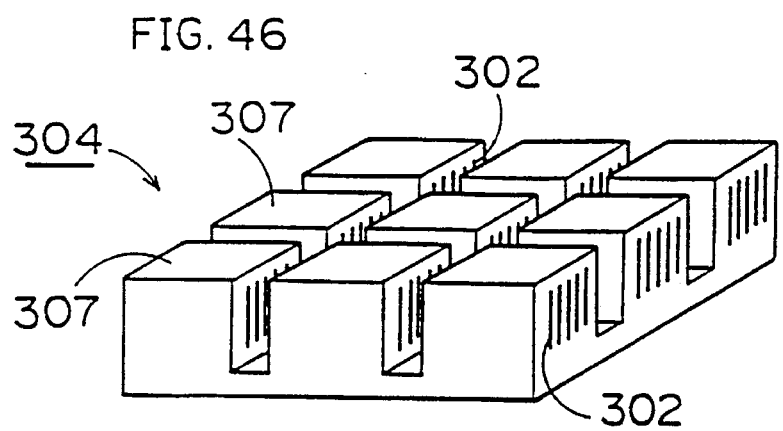
FIG. 46 is a perspective view showing a capacitor array according to the eighth embodiment.

The above described mother laminated body 301 is then cut along cutting lines A and B shown in FIG. 44, thereby to make it possible to obtain a sintered body 303 shown in FIG. 45. In addition, the sintered body 303 is subjected to groove processing along lines C and D as shown and is processed in the same manner as that in the above described seventh embodiment, thereby to make it possible to obtain a capacitor array 304 shown in FIG. 46. In the capacitor array 304, a plurality of capacitor units 307 are disposed in a matrix. However, the plurality of inner electrodes 302 in each of the capacitor units 307 are overlapped with each other not in the thickness direction of the sintered body 303 but in the direction orthogonal to the thickness direction. In other words, the inner electrodes 302 are extended in the thickness direction of the sintered body 303.

Such construction that the plurality of inner electrodes are laminated in the direction orthogonal to the thickness direction of the sintered body to form the capacitor unit as described above is not limited to the capacitor array in which a plurality of capacitor units are disposed in a matrix as described above. The same construction is also applicable to the above described first to fifth embodiments.

Although the present invention has been described and illustrated in detail, it is clearly understood that the same is by way of illustration and example only and is not to be taken by way of limitation, the spirit and scope of the present invention being limited only by the terms of the appended claims.

Although in the fifth embodiment, the insulating material layers are composed of Pb—Si—Al series glass, they may be composed of a material other than glass, for example, insulating resin. Since insulating resin is softer than glass, it can absorb a stress caused by contraction of the capacitor array itself.

Ninth Embodiment

Figure 47:
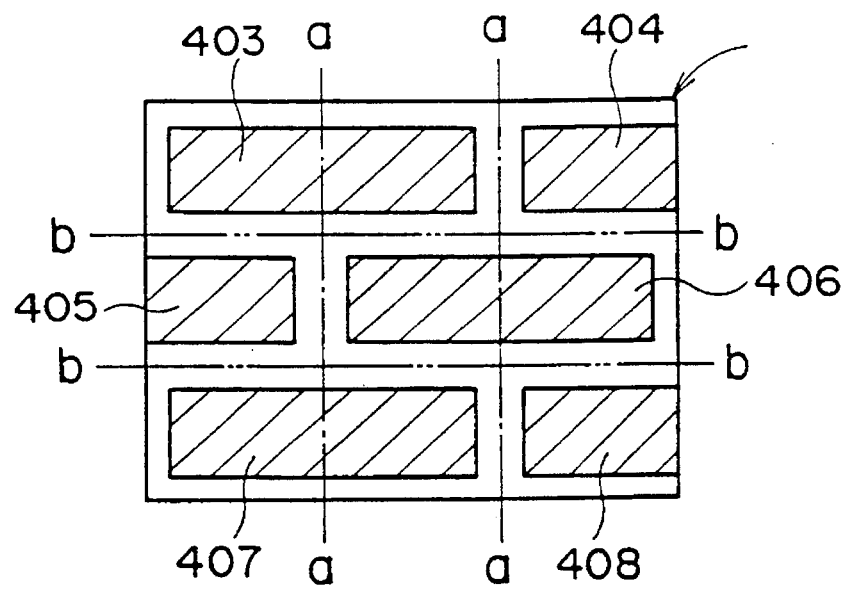
FIG. 47 is a plan view showing a ceramic green sheet used in a ninth embodiment of the present invention.
Figure 48:
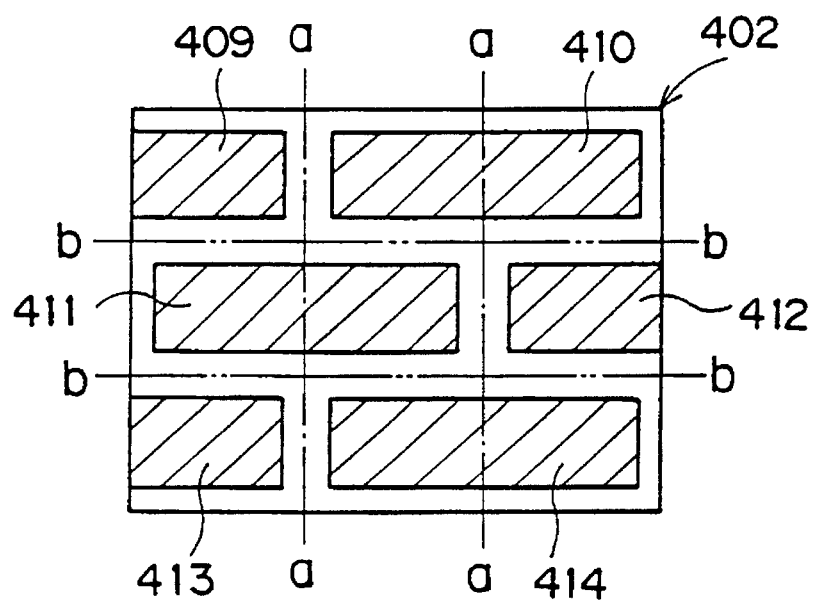
FIG. 48 is a plan view showing a ceramic green sheet used in the ninth embodiment of the present invention.

Rectangular ceramic green sheets 401 and 402 as shown in FIGS. 47 and 48 are first prepared. The ceramic green sheets 401 and 402 are obtained by cutting a ceramic green sheet, which is obtained by forming a slurry obtained by thoroughly mixing dielectric ceramic powder such as barium titanate series ceramic powder with a known and commonly used binder and organic solvent by a suitable sheet forming process such as the Doctor blade process.

Referring to FIG. 47, rectangular inner electrodes 403 to 408 having a pattern A are formed by printing a conductive paste on the upper surface of the ceramic green sheet 401.

Referring to FIG. 48, rectangular inner electrodes 409 to 414 are also formed so as to have a pattern B by printing a conductive paste on the upper surface of the ceramic green sheet 402.

In FIGS. 47 and 48, lines a—a and lines b—b indicate portions where grooves are formed as described later, and portions enclosed by the lines respectively correspond to capacitor units.

Examples of the above described conductive paste include a conductive paste containing conductive powder of Ag or an Ag—Pd alloy. The inner electrodes 403 to 408 and to 414 may be formed by another conductive forming process such as evaporation or plating in addition to printing of the conductive paste.

Figure 49:
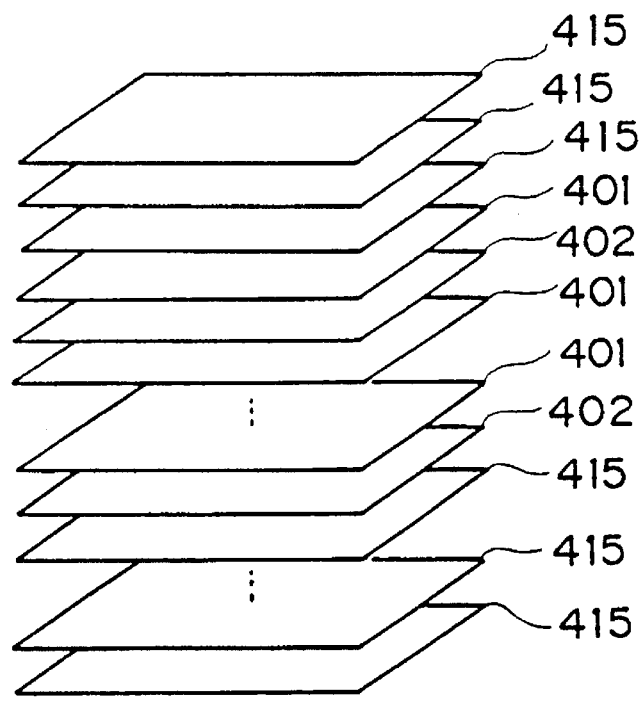
FIG. 49 is a perspective view for explaining a state where ceramic green sheets are laminated in the ninth embodiment of the present invention.

A predetermined number of ceramic green sheets 401 and and plain ceramic green sheets 415 are then prepared, and are laminated without changing the direction shown in FIGS. 47 and 48. As schematically illustrated in FIG. 49, a plurality of plain ceramic green sheets 415 are first laminated, a predetermined number of ceramic green sheets and 402 are then alternately laminated, and a predetermined number of plain ceramic green sheets 415 are finally laminated, followed by pressing in the thickness direction. A laminated body thus obtained is sintered, thereby to obtain a sintered body 420 shown in FIG. 50.

Figure 50:
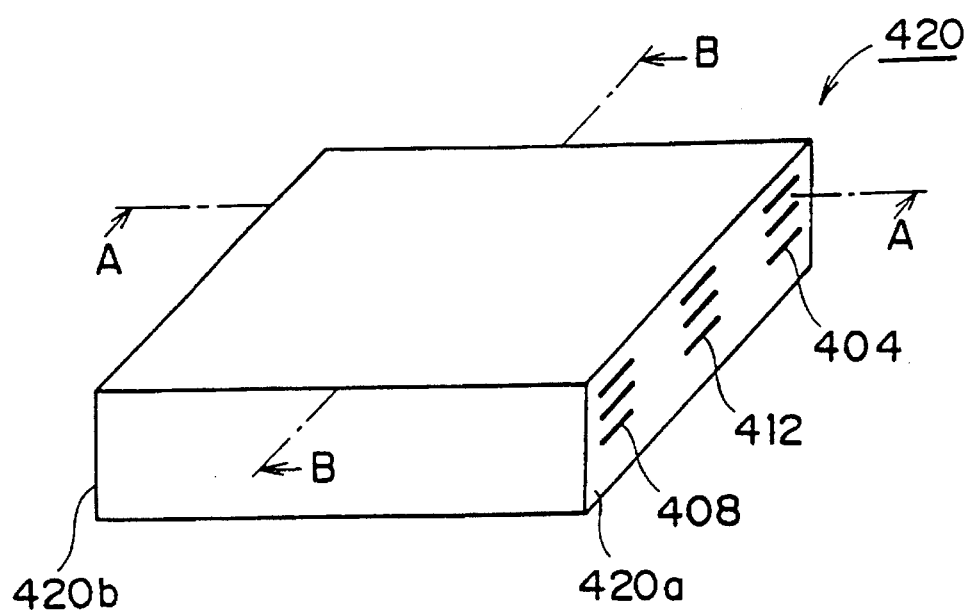
FIG. 50 is a perspective view showing a sintered body obtained in the ninth embodiment of the present invention.

Referring to FIG. 50, the inner electrodes 404, 412 and 408 are exposed to one end surface 420a of the sintered body 420 thus obtained, as apparent by referring to FIGS. 47 and 48. Similarly, the inner electrodes 409, 405 and 413, which are not illustrated, are exposed on the other end surface 420b.

Figure 51:
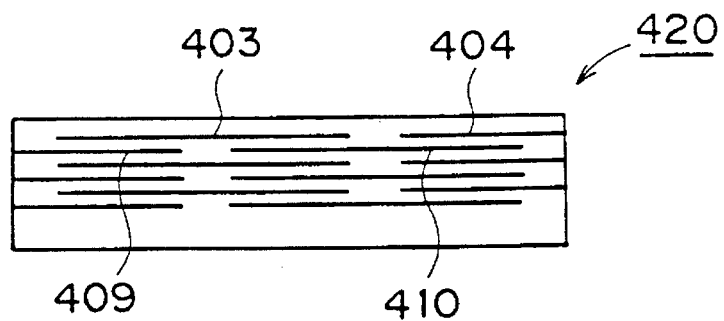
FIG. 51 is a cross sectional view taken along a line A—A shown in FIG. 50.
Figure 52:
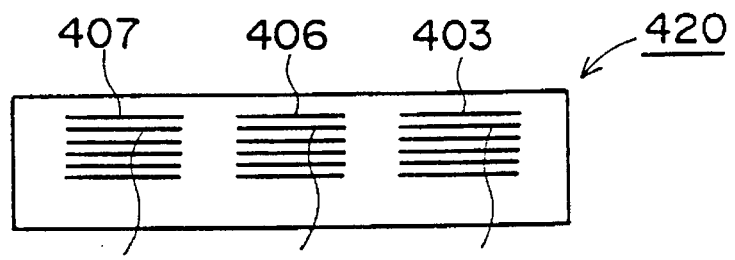
FIG. 52 is a cross sectional view taken along a line B—B shown in FIG. 50.

FIG. 51 is a cross sectional view taken along a line A—A shown in FIG. 50, and FIG. 52 is a cross sectional view taken along a line B—B shown in FIG. 50. In FIGS. 51 and 52, hatching is omitted so as to make the illustration of the inner electrodes understandable. In the following similar drawings, hatching is also omitted. As apparent from FIGS. 51 and 52, a structure in which the inner electrodes are overlapped with each other is formed by alternately laminating the ceramic green sheets 401 shown in FIG. 47 and the ceramic green sheets 402 shown in FIG. 48.

Figure 53:
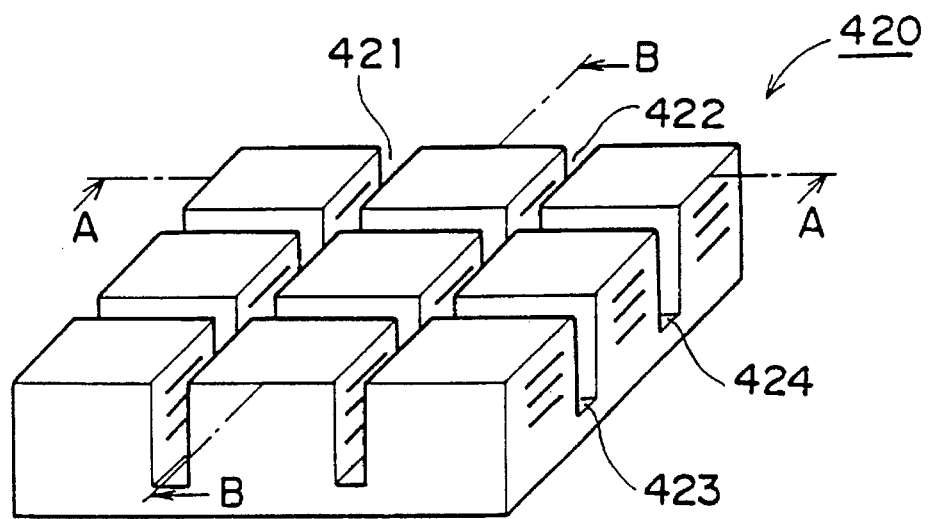
FIG. 53 is a perspective view showing a state where grooves along lines a—a and lines b—b shown in FIGS. 47 and 48 are formed in the sintered body in the ninth embodiment of the present invention.
Figure 54:
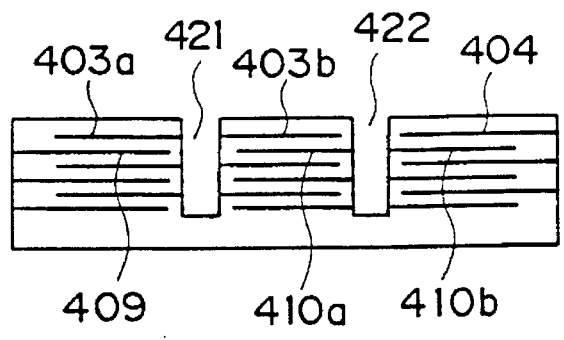
FIG. 54 is a cross sectional view taken along a line A—A shown in FIG. 53.
Figure 55:
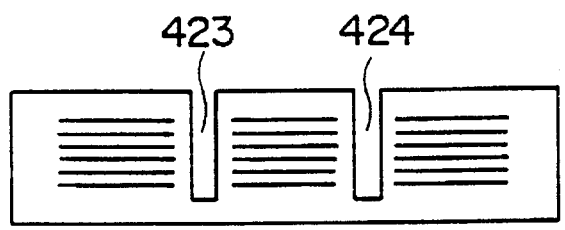
FIG. 55 is a cross sectional view taken along a line B—B shown in FIG. 53.

As shown in FIG. 53, grooves along the lines a—a and the lines b—b shown in FIGS. 47 and 48 are respectively formed in the ceramic sintered body 420. Referring to FIG. 53, grooves 421 and 422 are the grooves along the lines a—a, and grooves 423 and 424 are the grooves along the lines b—b. FIG. 54 is a cross sectional view taken along a line A—A shown in FIG. 53, and FIG. 55 is a cross sectional view taken along a line B—B shown in FIG. 53. Referring to FIG. 54, the inner electrode 403 is divided by forming the groove 421, whereby inner electrodes 403a and 403b are exposed to the groove 421. Further, the inner electrode 410 is divided by forming the groove 422, whereby inner electrodes 410a and 410b are exposed to the groove 422. Similarly, the inner electrode 407 shown in FIG. 47 and the inner electrode 411 shown in FIG. 48, which are not illustrated in FIG. 54, are divided by forming the groove 421, whereby inner electrodes obtained by the division are exposed to the groove 421. Further, the inner electrode 406 shown in FIG. 47 and the inner electrode 414 shown in FIG. 48 are divided by forming the groove 422, whereby inner electrodes obtained by the division are exposed to the groove 422.

As apparent from FIG. 54, the width of the grooves 421 and 422 is so selected that the inner electrodes 409 and 410a are not exposed to the groove 421 and the inner electrodes 403b and 404 are not exposed to the groove 422. Further, the depth of the groves 421 and 422 is so selected that the grooves lead to a place lower than the lowermost inner electrode out of the overlapped inner electrodes.

Referring to FIG. 55, the grooves 423 and 424 are formed to such a width that the inner electrodes disposed on both sides of the grooves are not exposed to inner walls of the grooves 423 and 424. The grooves 421 to 424 can be processed using a diamond cutter, a dicing machine or the like.

Figure 56:
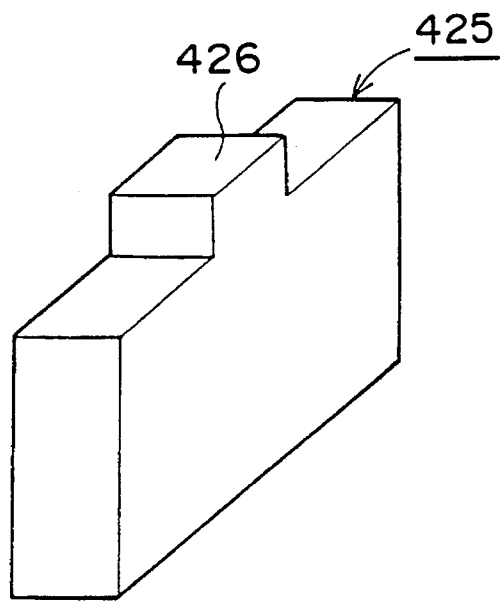
FIG. 56 is a perspective view showing a metal conductor used in the ninth embodiment of the present invention.

Referring to FIG. 56, a metal conductor 425 which is to be fitted in the grooves 421 and 422 is then prepared. The metal conductor 425 is provided with a projection 426 extending so as to lead to the upper surface of the sintered body 420 when it is fitted in the grooves 421 and 422. This metal conductor 425 can be made of a metal or an alloy mainly composed of silver, for example.

Figure 57:
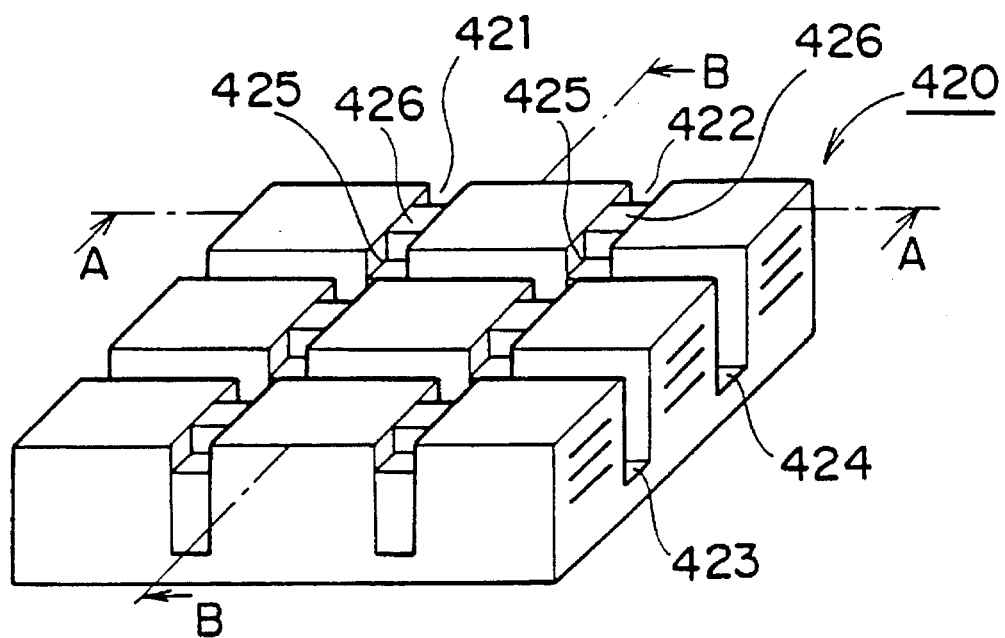
FIG. 57 is a perspective view showing a state where metal conductors shown in FIG. 56 are fitted in the sintered body in which the grooves are formed.

FIG. 57 is a perspective view showing a state where the metal conductors 425 shown in FIG. 56 are respectively fitted in the grooves 421 and 422 of the sintered body 420. The thickness of the metal conductor 425 is set to a thickness slightly smaller than the thickness of the grooves 421 and 422. A silver paste containing ceramic powder, for example, is applied to both surfaces of the metal conductor 425. The metal conductors 425 are respectively inserted into the grooves 421 and 422, after which the silver paste is baked at a temperature of 850° C., for example.

Figure 58A:
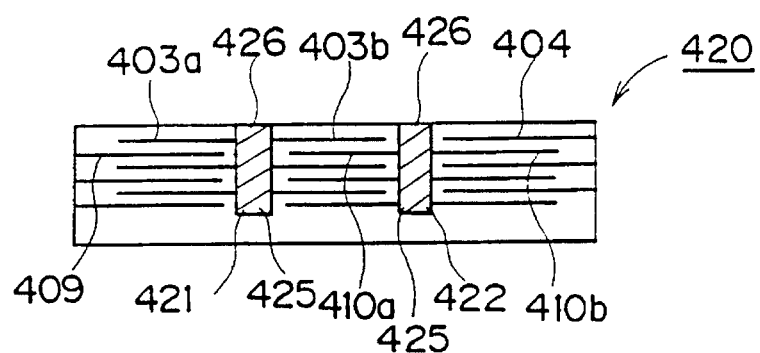
FIGS. 58A to 58C are cross sectional views showing the steps of respectively forming narrow grooves in the metal conductors fitted in the grooves and forming insulating layers in the grooves in the ninth embodiment of the present invention.

FIG. 58A is a cross sectional view taken along a line A—A shown in FIG. 57. As shown in FIG. 58A, the metal conductors 425 thus fitted are respectively brought into contact with and electrically connected to the inner electrodes 403a and 403b exposed to the groove 421 and the inner electrodes 410a and 410b exposed to the groove 422.

Figure 58B:
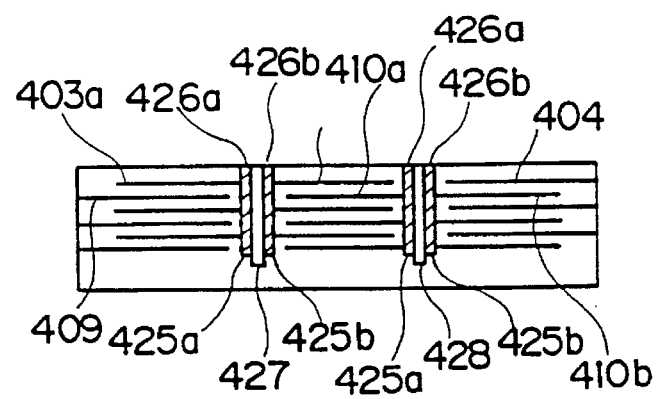

Referring to FIG. 58B, the metal conductors 425 thus fitted in the grooves are then respectively provided with grooves 427 and 428 narrower and deeper than the metal conductors. The grooves 427 and 428 can be similarly processed using a diamond cutter, a dicing machine or the like. The metal conductor 425 is divided by forming each of the grooves 427 and 428, to form connecting electrodes 425a and 425b. Furthermore, the projection of the metal conductor 425 extending to the upper surface of the sintered body 420 is divided, to form electrodes for connection to the exterior 426a and 426b.

Figure 58C:
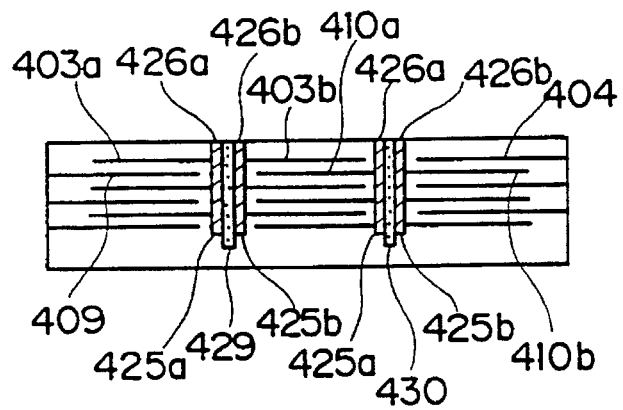

Referring to FIG. 58C, the grooves thus formed are then respectively filled with a Pd—Al—Si series glass paste, for example, using a microdispenser, for example, after which the glass paste is baked at a temperature of 800° C., for example, thereby to form insulating layers 429 and 430. Consequently, each of the insulating layers 429 and 430 is interposed between the connecting electrodes 425a and 425b. A material composing the insulating layers 429 and 430 is not limited to the glass paste. An arbitrary material such as ceramics having insulating properties can be used.

As shown in FIG. 58C, the inner electrodes 403a are electrically connected to the connecting electrode 425a, the inner electrodes 403b are electrically connected to the connecting electrode 425b, the inner electrodes 410a are electrically connected to the connecting electrode 425a, and the inner electrodes 410b are electrically connected to the connecting electrode 425b.

Figure 59:
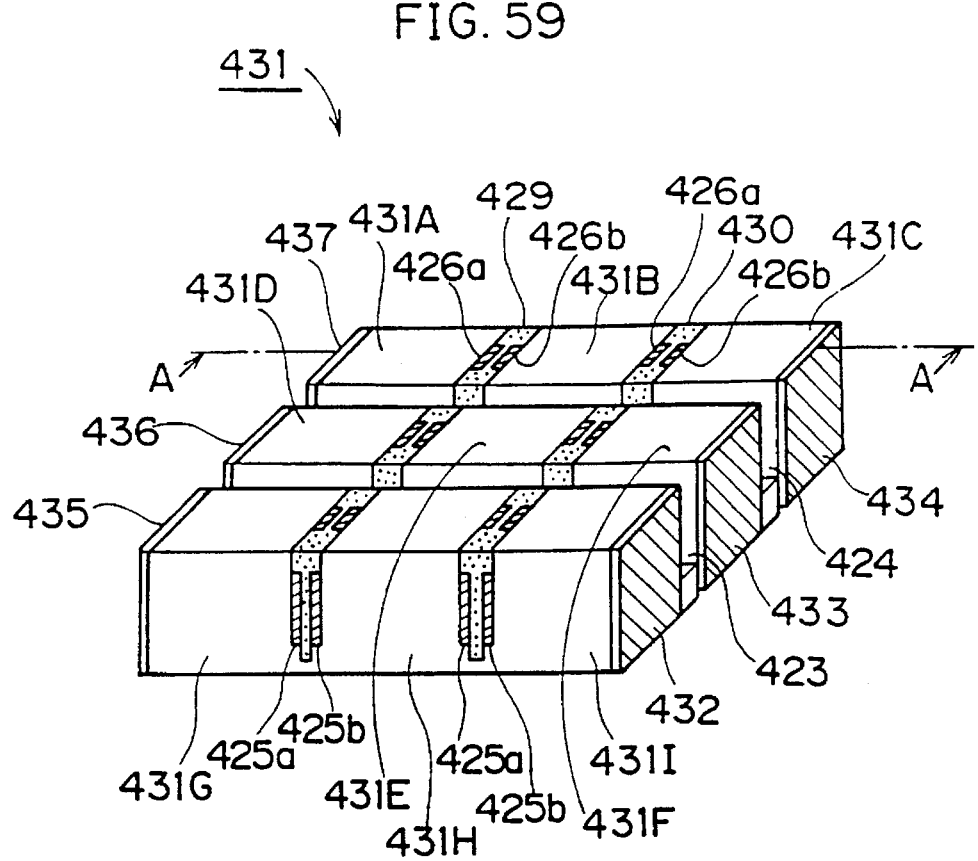
FIG. 59 is a perspective view showing a multilayer capacitor array according to the ninth embodiment of the present invention.
Figure 60:
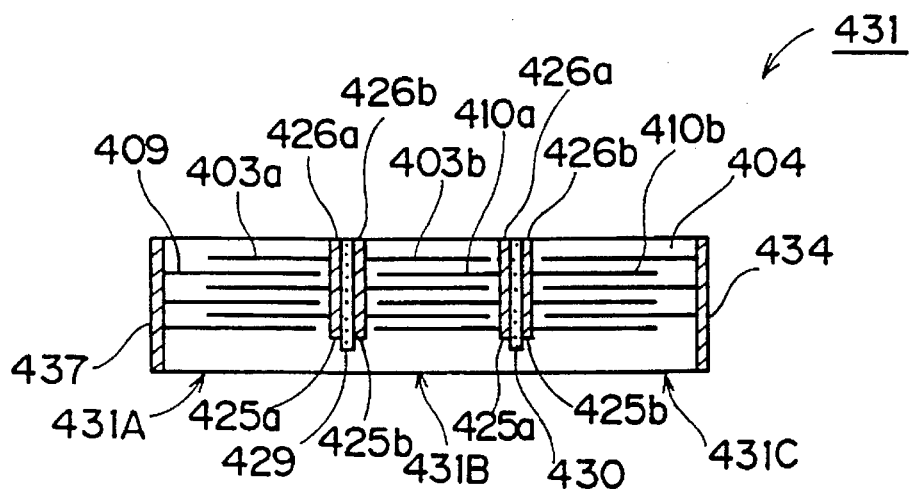
FIG. 60 is a cross sectional view taken along a line A—A shown in FIG. 59.

Referring to FIG. 59, a conductive paste or the like is then applied to outer end surfaces of the sintered body, to form connecting electrodes 432 to 437. FIG. 60 is a cross sectional view taken along a line A—A shown in FIG. 59. As shown in FIG. 60, the inner electrodes 404 are connected every other one by the connecting electrode 434 formed on the outer end surface. Similarly, the inner electrodes 409 are electrically connected every other one by the connecting electrode 437.

Referring to FIG. 59, the connecting electrodes are thus formed on both sides of the sintered body, thereby to obtain a multilayer capacitor array 431. In the multilayer capacitor array 431, nine capacitor units 431A to 431I are constructed.

Referring to FIG. 60, the capacitor unit 431B, for example, is paid attention to. The inner electrodes 403b and the inner electrodes 410a are alternately laminated. The inner electrodes 403b are electrically connected to the connecting electrode 425b, and the inner electrodes 410a are electrically connected to the connecting electrode 425a. The connecting electrodes 425b and 425a are electrically connected to the electrodes for connection to the exterior 426b and 426a extending to the upper end surface of the sintered body, respectively. Similarly in the other capacitor unit, the inner electrodes alternately laminated are electrically connected to the connecting electrodes on both sides, respectively. The connecting electrodes directly extend or extend as the electrodes for connection to the exterior to the upper end surface of the multilayer capacitor array 431. Consequently, the electrodes for connection to the exterior or ends of the connecting electrodes in the respective capacitor units 431A to 431I are formed on one surface of the multilayer ceramic capacitor array 431. The capacitor units can be surface-mounted on a printed circuit board by bump junction or the like.

Figure 61:
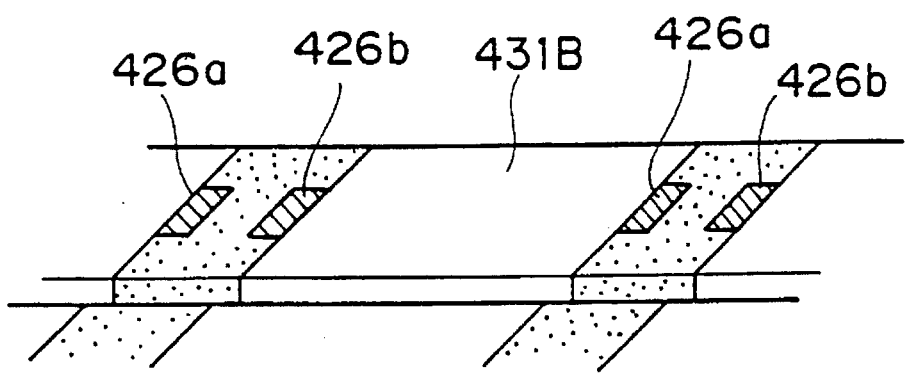
FIG. 61 is an enlarged perspective view showing the vicinity of electrodes for connection to the exterior in the ninth embodiment of the present invention.

Referring to FIG. 61, the capacitor unit 431B has the electrodes for connection to the exterior 426b and 426a provided on its upper end surface. The capacitor unit 431B can be surface-mounted on a land of the printed circuit board by bump junction or the like using the electrodes for connection to the exterior 426b and 426a. Consequently, the need for a larger land than the capacitor element as in the conventional example is eliminated, thereby to allow high-density mounting.

Description is now made of the results of specific experiments.

As the ceramic green sheets 410 and 402, a ceramic green sheet obtained by forming a slurry mainly composed of barium titanate series dielectric ceramic powder to a thickness of 10 μm is used. The inner electrodes are formed by applying a conductive paste mainly composed of silver and palladium. The ceramic green sheets are laminated, and a laminated body obtained is pressed, followed by sintering at a temperature of 1350° C., thereby to form the sintered body 420 (see FIG. 50).

The grooves 421 and 422 having a width of 150 μm (see FIG. 53) and the grooves 423 and 424 having a width of 100 μm (see FIG. 53) are then formed. The metal conductor 425 mainly composed of sliver (see FIG. 56), both surfaces of which are coated with a silver paste containing ceramic powder, is fitted in the grooves 421 and 422, after which the silver paste is baked at a temperature of 850° C. (see FIG. 57). The grooves 427 and 428 having a width of 100 μm (see FIG. 58B) are respectively formed in the grooves 421 and 422. The grooves 427 and 428 are filled with Pb—A—Si series glass, after which the glass is baked at a temperature of 800° C., thereby to form the insulating layers 429 and 430 (see FIG. 58C). The connecting electrodes are then formed on the outer end surfaces of the sintered body, thereby to finally obtain the capacitor array 431 in a matrix of 3 rows and 3 columns having a plane shape measuring 2.0 mm by 3.0 mm (see FIG. 59).

A multilayer capacitor for comparison in which electrodes are led out in its outer edges (comparative example 1) and a capacitor array in which a plurality of such capacitor functions that inner electrodes are led out by through holes provided in its inner portion are continuously formed in a matrix (comparative example 2), which are equal in material and are equal in conditions such as the number of laminations to the capacitor array 431 according to the present embodiment, are respectively mounted on a circuit board for testing measuring 10 mm by 10 mm so as to achieve highest density mounting. The capacitance densities on mounting in the present embodiment and the comparative examples 1 and 2 are compared. As a result, the capacitance density on mounting is 7.3 μF/cm$^2$ in the present embodiment, while being 6.5 μF/cm$^2$ in the comparative example 1 and 5.0 μF/cm$^2$ in the comparative example 2.

Furthermore, the temperature cycle test and the vibration test are carried out with respect to the capacitor arrays in the embodiment and the comparative examples 1 and 2. In the temperature cycle test, samples are respectively subjected to temperature changes between −25° C. and 125° C. for 100 cycles, and then the insulation resistance values of the samples are measured. A sample in which the insulation resistance value is changed by not less than 10% is considered as a failure. In the vibration test, samples are respectively subjected to vibration of 10→2000→10 Hz (1.55 mm) in the x, y and z directions for one hour, and then the insulation resistance values of the samples are measured. A sample in which the insulation resistance value is changed by not less than 10% is considered as a failure. As a result, the failure rate is 0% with respect to the capacitor arrays in the embodiment and the comparative examples 1 and 2.

As can be seen from the results, the capacitor array according to the embodiment of the present invention has the same reliability as that of the conventional capacitor element and allows high density mounting.

Although in the above described embodiment, the ceramic green sheets 401 and 402 shown in FIGS. 47 and 48 are used and are directly laminated, thereby to obtain the capacitor array 431 in a matrix of 3 rows and 3 columns by passing through the above described processes, larger ceramic green sheets may be used to fabricate a larger capacitor array than the capacitor array in a matrix of 3 rows and 3 columns and then, cut the capacitor array in the thickness direction, to obtain a capacitor array in a matrix of predetermined rows and columns.

It should be noted that a method of fabricating a capacitor array according to the present invention is not limited to the order of processes and the methods in the above described embodiment.

Tenth Embodiment

Rectangular ceramic green sheets 501 to 504 as shown in FIGS. 62 to 65 are first prepared. The ceramic green sheets are obtained by cutting a ceramic green sheet, which is obtained by forming a slurry obtained by thoroughly mixing dielectric ceramic powder such as barium titanate series ceramic powder with a known and commonly used binder and organic solvent by a suitable sheet forming process such as the Doctor blade process.

Figure 62:
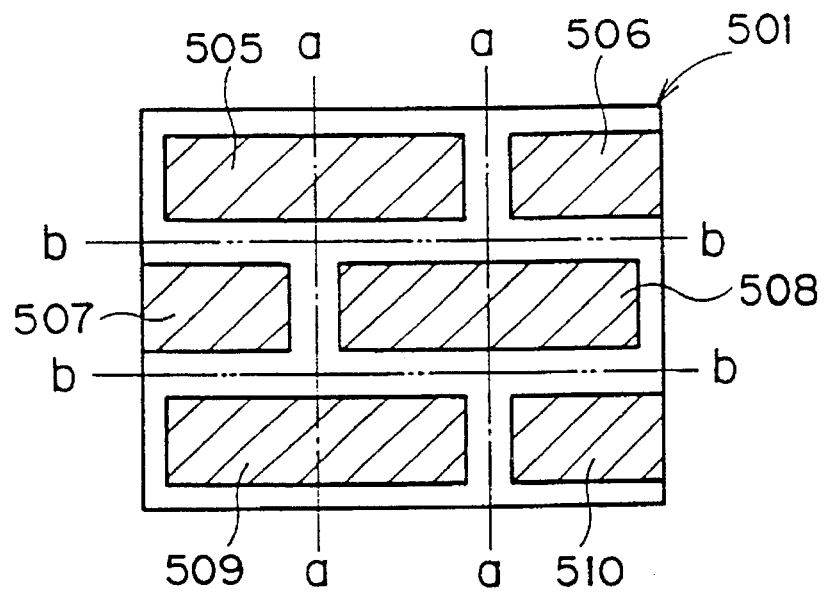
FIG. 62 is a plan view showing a ceramic green sheet used in a tenth embodiment and an eleventh embodiment of the present invention.

Referring to FIG. 62, rectangular inner electrodes 505 to 510 having a pattern A are formed by printing a conductive paste on the upper surface of the ceramic green sheet 501.

Figure 63:
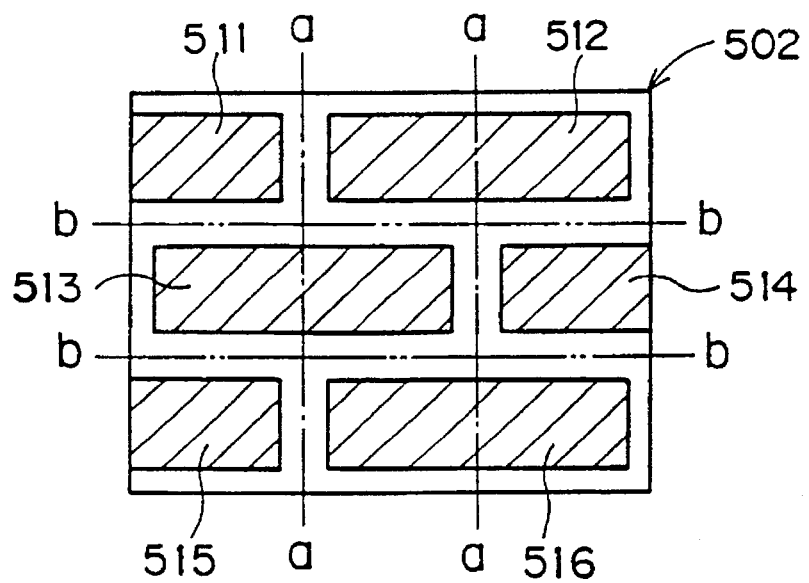
FIG. 63 is a plan view showing a ceramic green sheet used in the tenth embodiment and the eleventh embodiment of the present invention.

Referring to FIG. 63, rectangular inner electrodes 511 to 516 are also formed so as to have a pattern B by printing a conductive paste on the upper surface of the ceramic green sheet 502.

Figure 64:
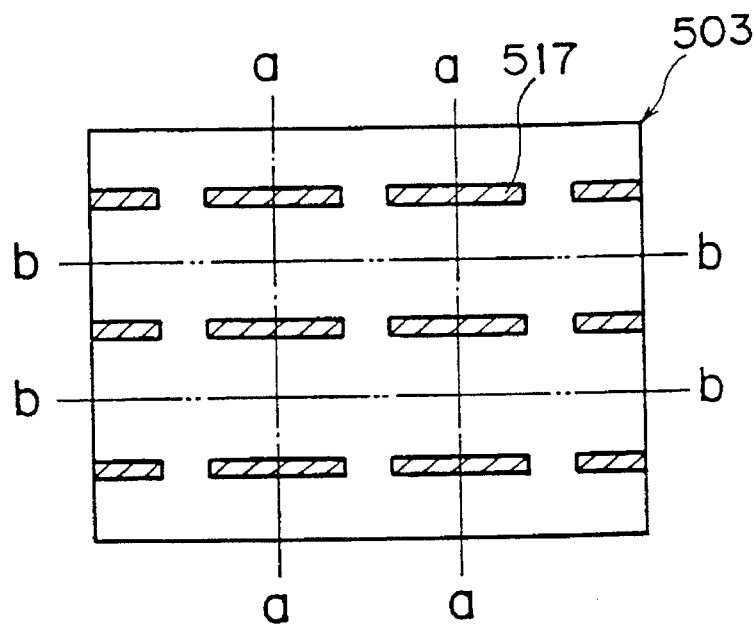
FIG. 64 is a plan view showing a ceramic green sheet used in the tenth embodiment of the present invention.

Referring to FIG. 64, lead-out electrodes 517 are formed as a pattern C on the upper surface of a ceramic green sheet 503.

Figure 65:
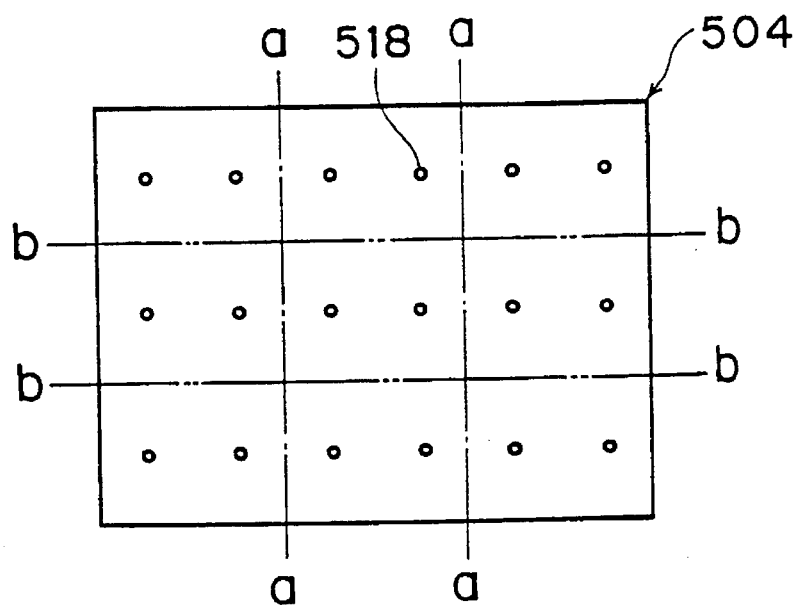
FIG. 65 is a plan view showing a ceramic green sheet used in the tenth embodiment of the present invention.

Referring to FIG. 65, openings 518 are formed according to a predetermined pattern as a pattern D on a ceramic green sheet 504. The opening 518 is filled with a filler mainly composed of carbon.

In FIGS. 62 to 65, lines a—a and lines b—b indicate portions where grooves are formed as described later, and portions enclosed by the lines respectively correspond to capacitor units.

Examples of the above described conductive paste include a conductive paste containing conductive powder of Ag or an Ag—Pd alloy. The inner electrodes 505 to 510 and 511 to 516 and the lead-out electrodes 517 may be formed by another conductive film forming process such as evaporation or plating in addition to printing of the conductive paste.

Figure 66:
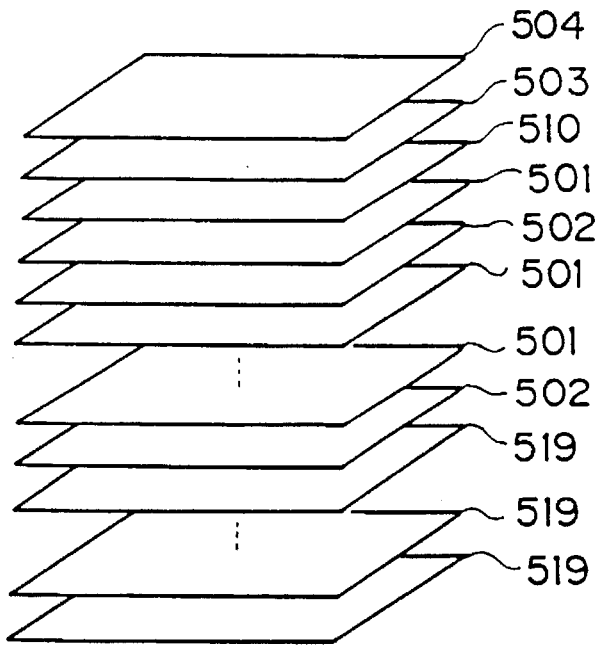
FIG. 66 is a perspective view for explaining a state where ceramic green sheets are laminated in the tenth embodiment of the present invention.

A predetermined number of ceramic green sheets 501 to 504 and plain ceramic green sheets 519 are then prepared, and are laminated without changing the direction shown in FIGS. 62 to 65. The ceramic green sheets are laminated as schematically illustrated in FIG. 66, followed by pressing in the thickness direction, thereby to obtain a laminated body. The laminated body is sintered, thereby to obtain a sintered body 520 shown in FIG. 67.

Figure 67:
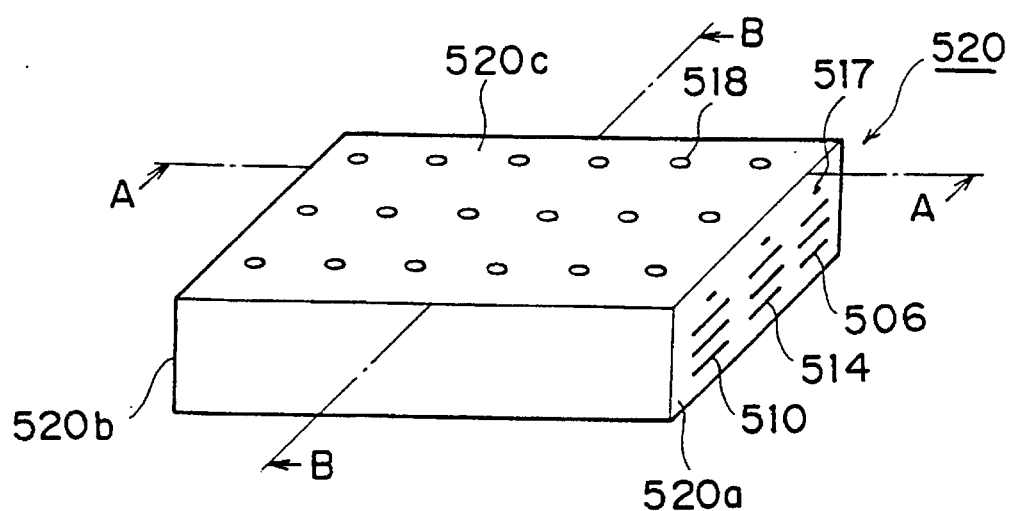
FIG. 67 is a perspective view showing a sintered body obtained in the tenth embodiment of the present invention.

Referring to FIG. 67, the inner electrodes 506, 514 and 510 are exposed, as apparent by referring to FIGS. 62 and 63, and the lead-out electrodes 517 shown in FIG. 64 are exposed to one end surface 520a of the sintered body 520 thus obtained. Similarly, the inner electrodes 511, 507 and 515 and the lead-out electrodes 517, which are not illustrated, are exposed on the other end surface 520b. The openings 518 having the pattern D shown in FIG. 65 are formed on an upper surface 520c of the sintered body 520. Since carbon or the like in the openings 518 is removed in the case of sintering, the openings 518 remain in an opened state.

Figure 68:
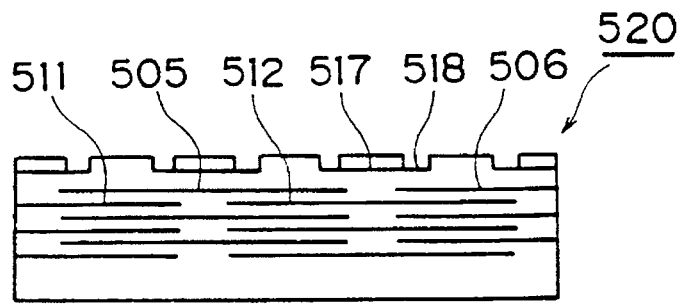
FIG. 68 is a cross sectional view taken along a line A—A shown in FIG. 67.
Figure 69:
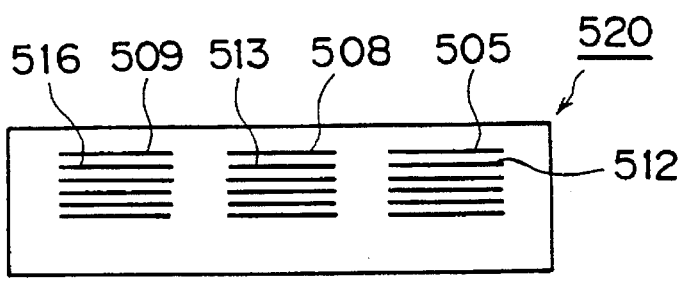
FIG. 69 is a cross sectional view taken along a line B—B shown in FIG. 67.

FIG. 68 is a cross sectional view taken along a line A—A shown in FIG. 67, and FIG. 69 is a cross sectional view taken along a line B—B shown in FIG. 67. In FIGS. 68 and 69, hatching is omitted so as to make the illustration of the inner electrodes understandable. In the following similar drawings, hatching is also omitted.

Figure 70:
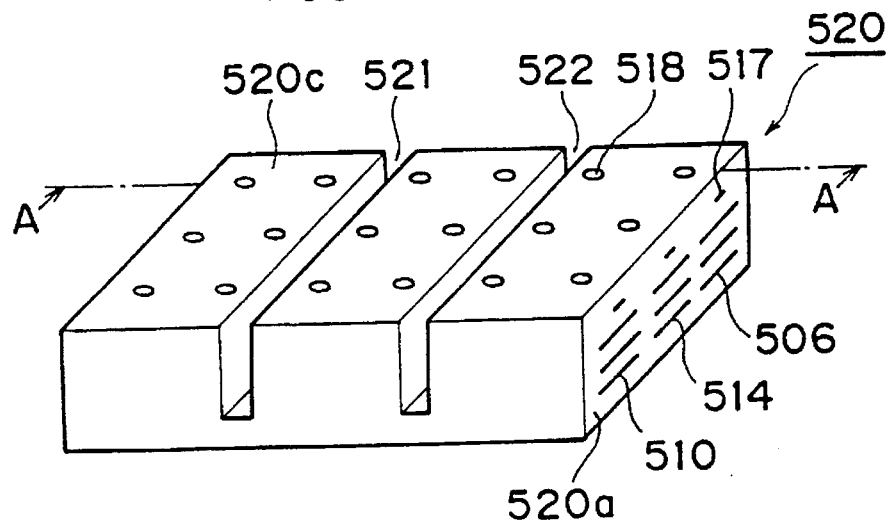
FIG. 70 is a perspective view showing a state where grooves along lines a—a shown in FIGS. 62 to 65 are formed in the sintered body in the tenth embodiment of the present invention.
Figure 71A:
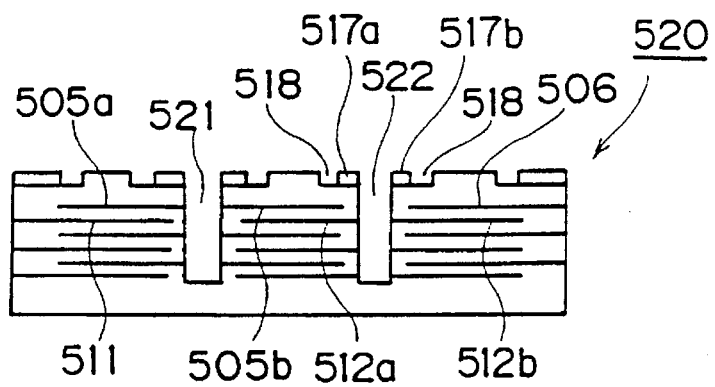
FIGS. 71A to 71C are cross sectional views showing the steps of respectively forming conductive layers in the grooves shown in FIG. 70 and then, forming narrow grooves in the tenth embodiment of the present invention.

FIG. 70 is a perspective view showing a state after the grooves along the lines a—a shown in FIGS. 62 to 65 are formed in the ceramic sintered body 520. Referring to FIG. 70, grooves 521 and 522 are formed in the thickness direction from the upper surface 520c of the sintered body 520. FIG. 71A is a cross sectional view taken along a line A—A shown in FIG. 70. Referring to FIG. 71A, the lead-out electrode 517 is divided by forming the groove 522, whereby lead-out electrodes 517a and 517b are exposed to the groove 522. Similarly, the inner electrode 512 is divided by forming the groove 522, whereby inner electrodes 512a and 512b are exposed to the groove 522. In addition, the lead-out electrode is similarly divided by forming the groove 521, and the inner electrode 505 is also divided by forming the groove 521, whereby lead-out electrodes obtained by the division and inner electrodes 505a and 505b are exposed to the groove 521. Similarly, the inner electrode 508 shown in FIG. 62, the inner electrode 516 shown in FIG. 63, and the other lead-out electrode 521 shown in FIG. 64 are divided by forming the groove 522, whereby inner electrodes and lead-out electrodes obtained by the division are exposed to the groove 522. The inner electrode 509 shown in FIG. 62, the inner electrode 513 shown in FIG. 63, and the other lead-out electrode 517 shown in FIG. 64 are similarly divided by forming the groove 521, whereby inner electrodes and lead-out electrodes obtained by the division are exposed to the groove 521.

The grooves 521 and 522 can be processed using a diamond cutter, a dicing machine or the like. As apparent from FIG. 71A, the width of the grooves 521 and 522 is so selected that the inner electrodes 511 and 512a are not exposed to the groove 521 and the inner electrodes 505b and 506 are not exposed to the groove 522. Further, the depth of the groves 521 and 522 is so selected that the grooves lead to a place lower than the lowermost inner electrode out of the overlapped inner electrodes.

Figure 71B:
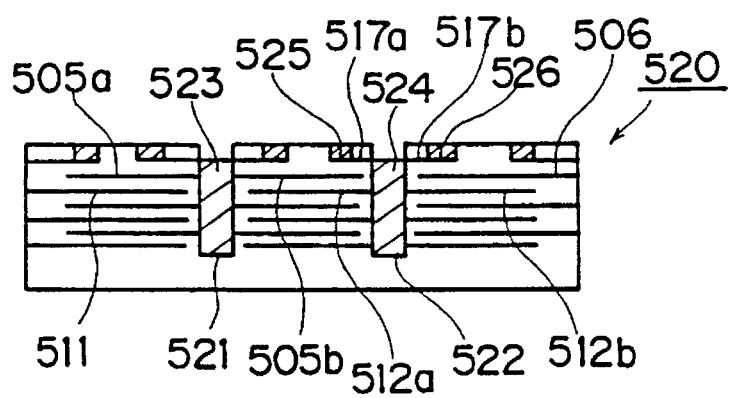

Referring to FIG. 71B, the grooves 521 and 522 are then filled with an Ag paste or an Ag—Pd paste using a microdispenser, for example, after which the paste is baked at a temperature of 850° C., for example, thereby to form conductive layers 523 and 524. Consequently, the conductive layer 524 is brought into contact with and electrically connected to the lead-out electrodes 517a and 517b and the inner electrodes 512a and 512b. Similarly, the conductive layer 523 is also brought into contact with and electrically connected to the lead-out electrodes and the inner electrodes 505a and 505b. In this case, the openings 518 are also filled with a conductive paste, after which the conductive paste is baked, thereby to form electrodes for connection to the exterior 525 and 526.

Figure 71C:
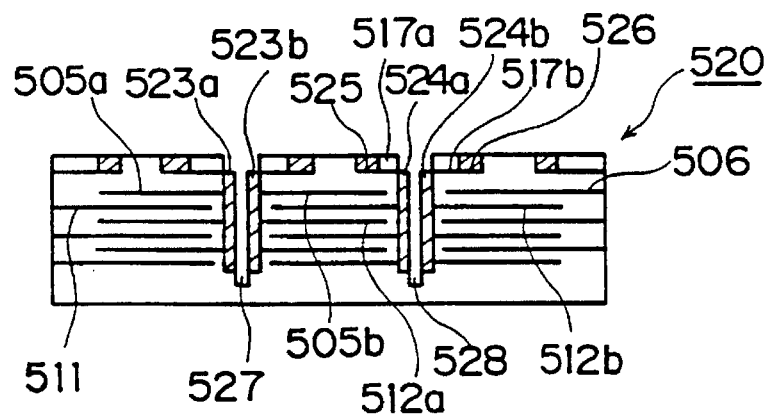

Referring to FIG. 71C, the conductive layers 523 and 524 are then respectively provided with grooves 527 and 528 narrower and deeper than the conductive layers. Consequently, the conductive layers are divided and parts thereof remain, respectively, so that connecting electrodes 523a and 523b and connecting electrodes 524a and 524b are formed. The connecting electrode 524a is electrically connected to the lead-out electrode 517a and the inner electrodes 512b, and the connecting electrode 524b is electrically connected to the lead-out electrode 517b and the inner electrodes 512b. Further, the lead-out electrode 517a is electrically connected to the electrode for connection to the exterior 525, and the lead-out electrode 517b is electrically connected to the electrode for connection to the exterior 526.

Similarly, the connecting electrode 523a is electrically connected to the inner electrodes 505a, and is electrically connected to one of lead-out electrodes and one of electrodes for connection to the exterior. The connecting electrode 523b is also electrically connected to the inner electrodes 505b, and is electrically connected to the other lead-out electrode and the other electrode for connection to the exterior. Consequently, the connecting electrodes 524a and 524b and the connecting electrodes 523a and 523b are so constructed that the inner electrodes inside the sintered body 520 are electrically connected thereto every other one in the thickness direction.

Figure 72:
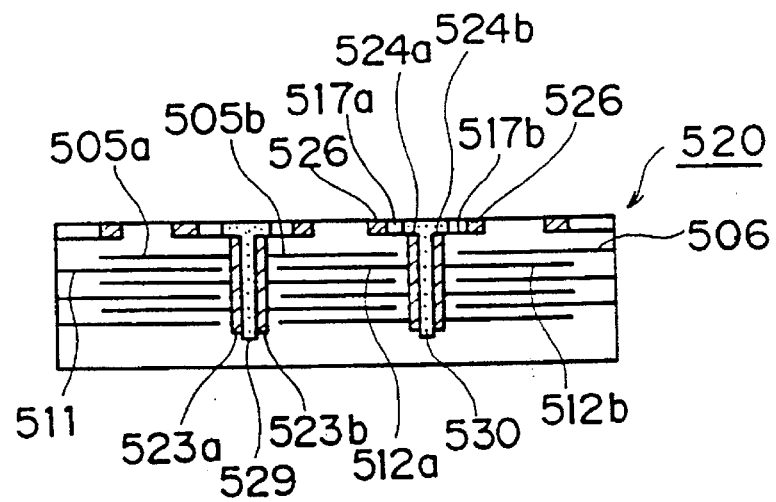
FIG. 72 is a cross sectional view showing a state where insulating layers are respectively formed in the narrow grooves shown in FIG. 71C.

The grooves 527 and 528 are then respectively filled with a Pd—Al—Si series glass paste, for example, using a microdispenser, for example, after which the glass paste is baked at a temperature of 800° C., for example, thereby to form insulating layers 529 and 530 shown in FIG. 72. Consequently, the insulating layers 529 and 530 are respectively interposed between the connecting electrodes 523a and 523b and between the connecting electrodes 524a and 524b. A material composing the insulating layers 529 and 530 is not limited to glass paste. An arbitrary material such as ceramics having insulating properties can be used.

Since the connecting electrodes 523a and 523b and the connecting electrodes 524a and 524b are not formed to lead to the upper surface of the sintered body 520, the connecting electrodes can be covered with the insulating layers 529 and 530.

Figure 73:
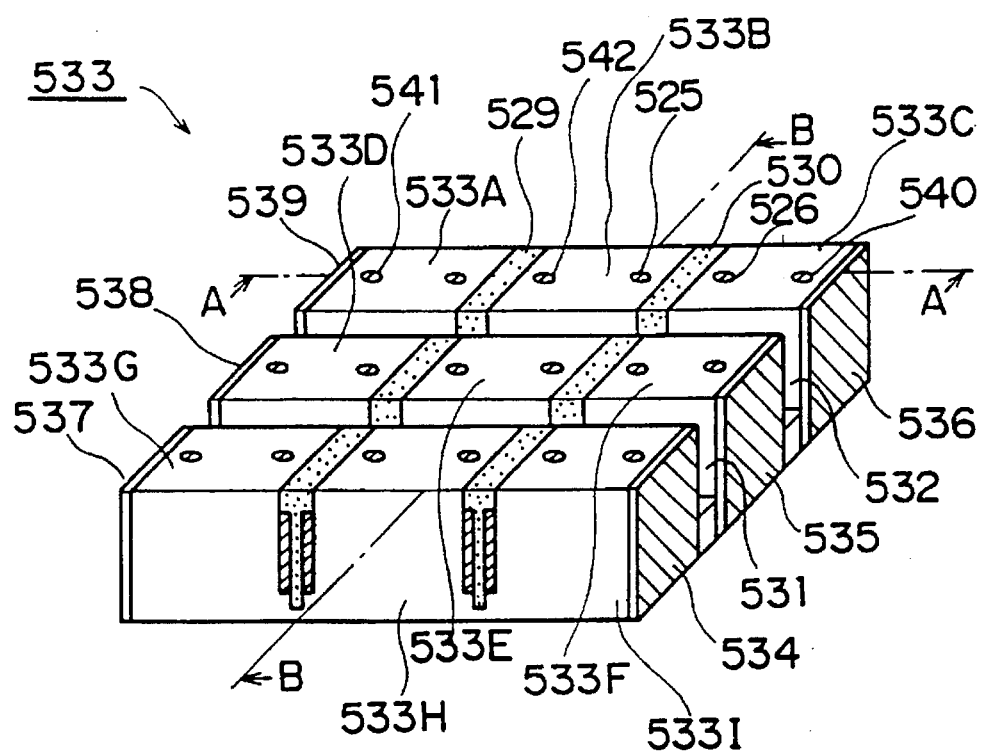
FIG. 73 is a perspective view showing a multilayer capacitor array according to the tenth embodiment of the present invention.
Figure 74:
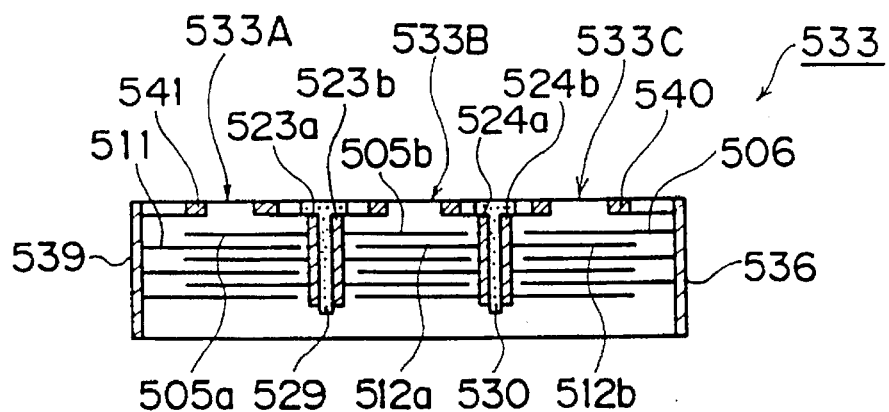
FIG. 74 is a cross sectional view taken along a line A—A shown in FIG. 73.
Figure 75:
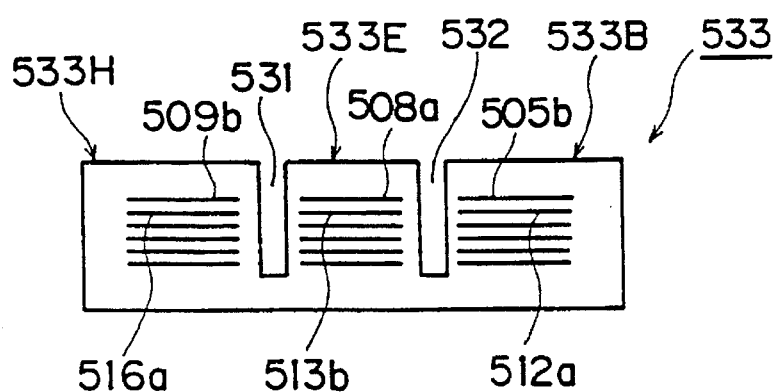
FIG. 75 is a cross sectional view taken along a line B—B shown in FIG. 73.

Referring to FIG. 73, grooves 531 and 532 are then formed along the lines b—b shown in FIGS. 62 to 65. FIG. 74 is a cross sectional view taken along a line A—A shown in FIG. 73, and FIG. 75 is a cross sectional view taken along a line B—B. As apparent from FIG. 75, the grooves 531 and 532 are formed to such a width that the inner electrodes disposed on both sides of the grooves 531 and 532 are not exposed to inner walls of the grooves 531 and 532. In addition, connecting electrodes 534 and 539 are respectively formed on outer end surfaces of the capacitor units, as illustrated in FIG. 73. By the connecting electrodes 534 to 539, the inner electrodes exposed to the outer end surfaces of each of the capacitor units are electrically connected. The connecting electrodes 534 to 539 can be formed by a known electrode forming process such as application and baking of a conductive paste.

As shown in FIG. 74, the inner electrodes 506 are connected every other one by the connecting electrode 536 formed on the outer end surface, and the connecting electrode 536 is electrically connected to an electrode for connection to the exterior 540 through a lead-out electrode. Similarly, the inner electrodes 511 are electrically connected every other one by the connecting electrode 539, and an electrode for connection to the exterior 541 is electrically connected to the connecting electrode 539 through a lead-out electrode.

As described in the foregoing, a multilayer capacitor array 533 according to the present embodiment shown in FIG. 73 is obtained. In the multilayer capacitor array 533 according to the present embodiment, nine capacitor units are constructed. Specifically, a capacitor array in a matrix of m=3 and n=3 is constructed, so that capacitor units 533A to 533I are constructed. Referring to FIG. 74, the connecting electrodes 539 and 523a, the connecting electrodes 523b and 524a, and the connecting electrodes 524b and 536 respectively constitute pairs of electrodes for taking out capacitance with respect to the capacitor units 533A, 533B and 533C. The insulating layer 529 or 530 and the groove 531 or 532 are interposed between the adjacent capacitor units, thereby to make it possible to reduce the adverse effect of stray capacitance between the capacitor units.

Figure 76:
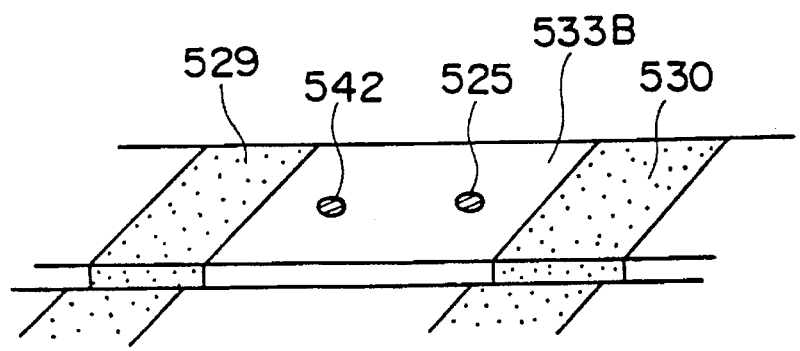
FIG. 76 is an enlarged perspective view showing the vicinity of electrodes for connection to the exterior in the tenth embodiment of the present invention.

Referring to FIG. 73, electrodes for connection to the exterior as indicated by reference numerals 525, 526, and 540 to 542, for example, are formed in the multilayer capacitor array 533 according to the present embodiment. The electrodes for connection to the exterior are electrically connected to the inner electrodes in the respective capacitor units through the lead-out electrodes and the connecting electrodes. Consequently, the capacitor units can be mounted on a printed circuit board by bump junction to the electrodes for connection to the exterior, for example. For example, the electrodes for connection to the exterior 525 and 542 are provided with respect to the capacitor unit 533B, as shown in FIG. 76, and the capacitor unit 533B can be surface-mounted by bump junction or the like on a land of the printed circuit board provided so as to correspond to the electrodes for connection to the exterior with a portion where the electrodes for connection to the exterior are provided directed downward. Consequently, the need for a larger land than the capacitor element as in the conventional example is eliminated, thereby to allow high density mounting.

Description is now made of the results of specific experiments.

As the ceramic green sheets 501 to 504, a ceramic green sheet obtained by forming a slurry mainly composed of barium titanate series dielectric ceramic powder to a thickness of 10 μm is used. The inner electrodes are formed by applying a conductive paste mainly composed of silver and palladium. The diameter of the opening 518 shown in FIG. 65 is set to 40 μm. The ceramic green sheets are laminated, and a laminated body obtained is pressed, followed by sintering at a temperature of 1350° C., thereby to form the sintered body 520. The grooves 521 and 522 having a width of 150 μm (see FIG. 70) are formed. The grooves 521 and 522 are filled with a silver paste containing ceramic powder as a conductive paste for forming the connecting electrodes, after which the silver paste is baked at a temperature of 850° C. The grooves 527 and 528 having a width of 100 μm (see FIG. 71C) are then formed. The grooves 527 and 528 are filled with Pb—Al—Si series glass, after which the glass is baked at a temperature of 800° C. The grooves 531 and 532 having a width of 300 μm (see FIG. 73) are then formed, and the connecting electrodes are formed on the outer end surfaces of the sintered body, thereby to finally obtain the capacitor array in a matrix of 3 rows and 3 columns having a plane shape measuring 2.5 mm by 2.5 mm (see FIG. 73).

A multilayer capacitor for comparison in which electrodes are led out in its outer edges (comparative example 1) and a capacitor array in which a plurality of such capacitor functions that inner electrodes are led out by through holes provided in its inner portion are continuously formed in a matrix (comparative example 2), which are equal in material and are equal in conditions such as the number of laminations to the capacitor array 533 according to the present embodiment, are respectively mounted on a circuit board for testing measuring 10 mm by 10 mm so as to achieve highest density mounting. The capacitance densities on mounting in the present embodiment and the comparative examples 1 and 2 are compared. As a result, the capacitance density on mounting is 7.3 μF/cm$^2$ in the present embodiment, while being 6.5 μF/cm$^2$ in the comparative example 1 and 5.0 μF/cm$^2$ in the comparative example 2.

Furthermore, the temperature cycle test and the vibration test are carried out with respect to the capacitor arrays in the embodiment and the comparative examples 1 and 2. In the temperature cycle test, samples are respectively subjected to temperature changes between −25° C. and 125° C. for 100 cycles, and then the insulation resistance values of the samples are measured. A sample in which the insulation resistance value is changed by not less than 10% is considered as a failure. In the vibration test, samples are respectively subjected to vibration of 10→2000→10 Hz (1.55 mm) in the x, y and z directions for one hour, and then the insulation resistance values of the samples are measured. A sample in which the insulation resistance value is changed by not less than 10% is considered as a failure. As a result, the failure rate is 0% with respect to the capacitor arrays in the embodiment and the comparative examples 1 and 2.

As can be seen from the results, the capacitor array according to the embodiment of the present invention has the same reliability as that of the conventional capacitor element and allows high density mounting.

Eleventh Embodiment

Figure 77:
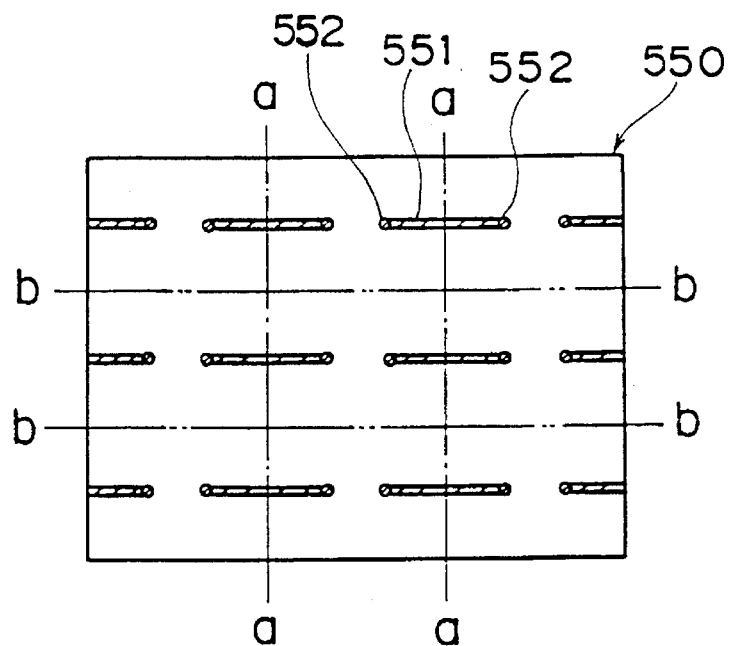
FIG. 77 is a plan view showing a ceramic green sheet used in an eleventh embodiment of the present invention.

The ceramic green sheets 501 and 502 in which the inner electrodes are formed as shown in FIGS. 62 and 63 and a ceramic green sheet 550 shown in FIG. 77 are used, to fabricate a capacitor array according to an eleventh embodiment. Referring to FIG. 77, in the ceramic green sheet 550, a lead-out electrode 551 is formed in a region corresponding to each of capacitor units and electrodes for connection to the exterior 552 are formed in its ends. The lead-out electrode 551 and the electrodes for connection to the exterior 552 can be formed by another conductive film forming process such as printing of a conductive paste containing conductive powder of Ag or an Ag—Pd alloy, evaporation or plating, similarly to the inner electrodes in the ceramic green sheets 501 and 502 shown in FIGS. 62 and 63.

Figure 78:
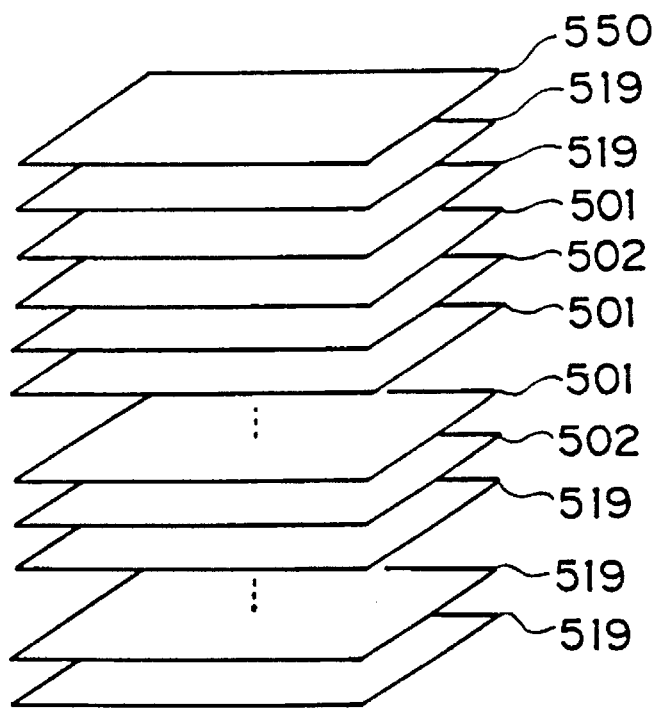
FIG. 78 is a perspective view for explaining a state where ceramic green sheets are laminated in the eleventh embodiment of the present invention.

As shown in FIG. 78, a plurality of plane ceramic green sheets 519 are laminated below the ceramic green sheet 550, a predetermined number of ceramic green sheets 501 and 502 shown in FIGS. 62 and 63 are alternately laminated below the ceramic green sheets 519, and a plurality of plain ceramic green sheets are further laminated below the ceramic green sheets 501 and 502, followed by pressing in the thickness direction. A laminated body thus obtained is sintered, thereby to obtain a sintered body 553 shown in FIG. 79.

Figure 79:
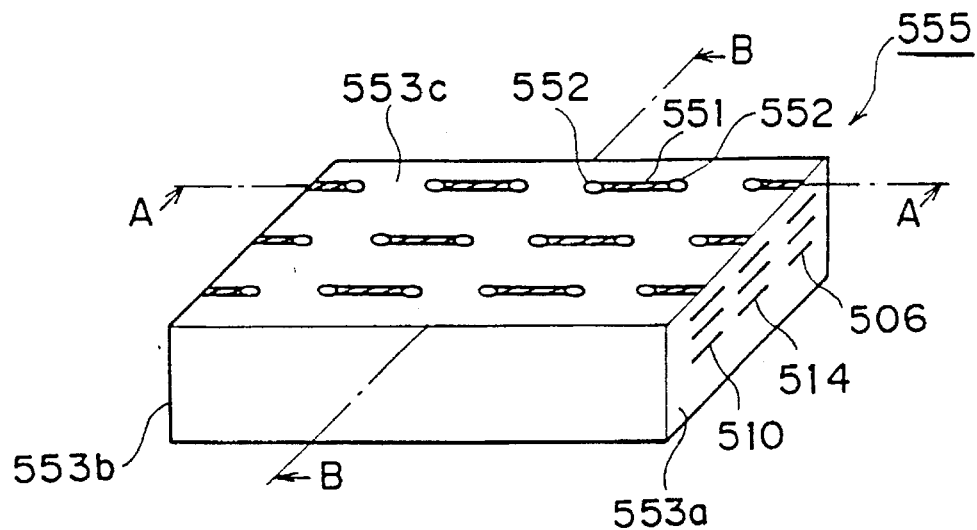
FIG. 79 is a perspective view showing a sintered body obtained in the eleventh embodiment of the present invention.

Referring to FIG. 79, inner electrodes 506, 514 and 510 are exposed to one end surface 553a of the sintered body 553, and inner electrodes 511, 507 and 515 shown in FIG. 62, which are not illustrated, are similarly exposed to the other end surface 553b. The lead-out electrode 551 and the electrodes for connection to the exterior 552 provided in its ends in the ceramic green sheet 550 are formed on an upper surface 553c of the sintered body 553.

Figure 80:
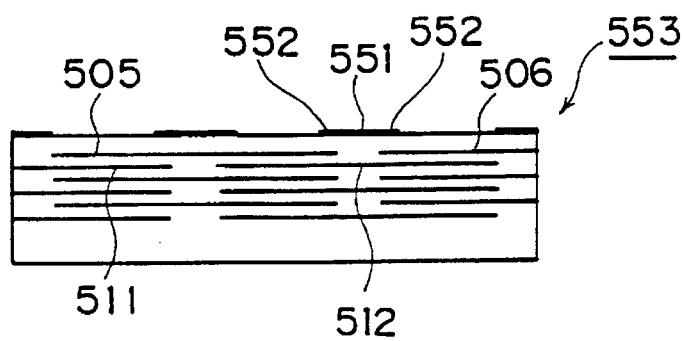
FIG. 80 is a cross sectional view taken along a line A—A shown in FIG. 79.
Figure 81:
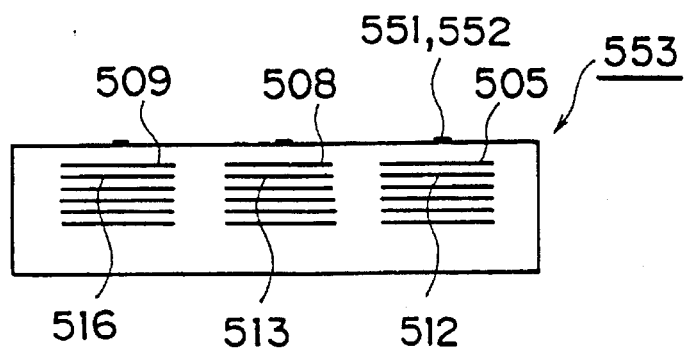
FIG. 81 is a cross sectional view taken along a line B—B shown in FIG. 79.

FIG. 80 is a cross sectional view taken along a line A—A shown in FIG. 79, and FIG. 81 is a cross sectional view taken along a line B—B shown in FIGS. 79. As apparent from FIGS. 80 and 81, a structure in which the inner electrodes are overlapped with each other is formed by alternately laminating the ceramic green sheets 501 shown in FIG. 62 and the ceramic green sheets 502 shown in FIG. 63.

Figure 82:
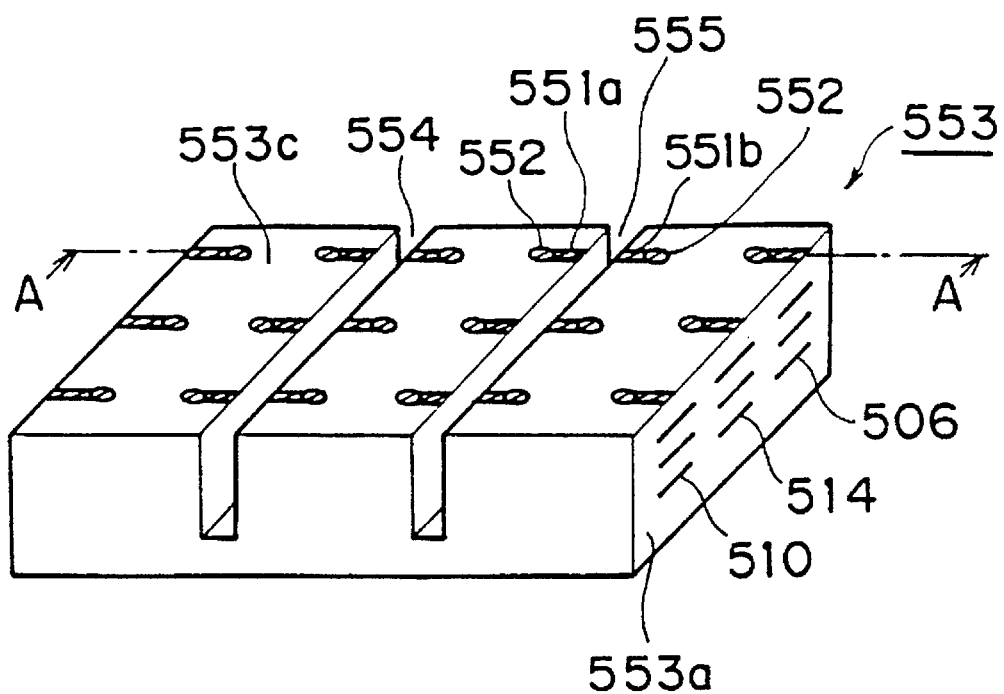
FIG. 82 is a perspective view showing a state where grooves along lines a—a shown in FIGS. 62, 63 and 77 in the eleventh embodiment of the present invention.

Referring to FIG. 82, grooves 554 and 555 are then formed in the sintered body 553 along lines a—a shown in FIGS. 62, 63 and 77. As shown in FIG. 82, the lead-out electrode 551 formed on the upper surface 553C of the sintered body 553 is divided into lead-out electrodes 551a and 551b by the grooves 554 and 555.

Figure 83A:
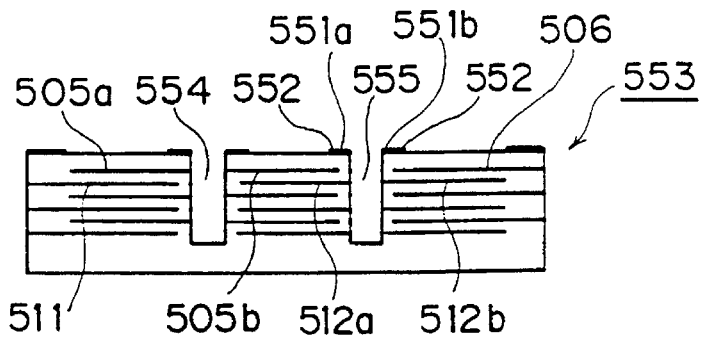
FIGS. 83A to 83C are cross sectional views showing the steps of respectively forming conductive layers in the grooves shown in FIG. 82 and then, forming narrow grooves in the eleventh embodiment of the present invention.

FIG. 83A is a cross sectional view taken along a line A—A shown in FIG. 82. As shown in FIG. 83A, the lead-out electrode 551 is divided into lead-out electrodes 551a and 551b by forming the grooves 554 and 555, whereby the lead-out electrodes 551a and 551b are exposed to the grooves 554 and 555. Further, the inner electrode 505 is divided into inner electrodes 505a and 505b by the groove 554, whereby the inner electrodes 505a and 505b are exposed to the groove 554. Similarly, the inner electrode 512 is divided into inner electrodes 512a and 512b by the groove 555, whereby the inner electrodes 512a and 512b are exposed to the groove 555.

Figure 83B:
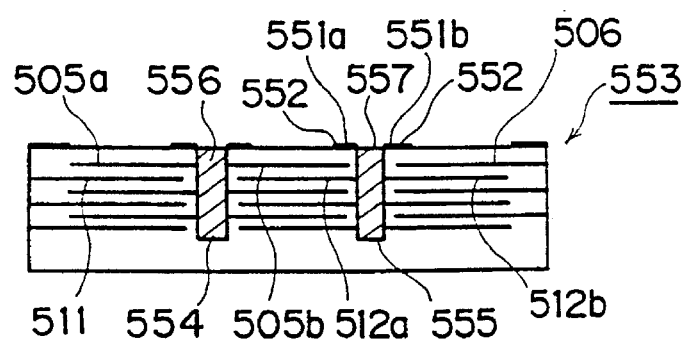

Referring to FIG. 83B, the grooves 554 and 555 are then filled with a silver paste containing ceramic powder using a microdispenser, after which the silver paste is baked at a temperature of 850° C., thereby to form conductive layers 556 and 557, as in the above described tenth embodiment. The conductive layers 556 and 557 are respectively brought into contact with and electrically connected to the lead-out electrode 551a and 551b and the inner electrode 505a and 505b and the lead-out electrodes 551a and 551b and the inner electrodes 512a and 512b.

Figure 83C:
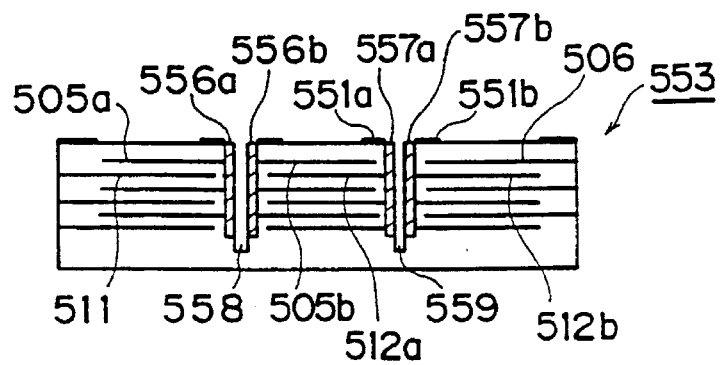

Referring to FIG. 83C, the conductive layers 556 and 557 are then respectively provided with grooves 558 and 559 narrower and deeper than the conductive layers. By respectively forming the grooves 558 and 559, the conductive layer 556 is divided to form connecting electrodes 556a and 556b and the conductive layer 557 is divided to form connecting electrodes 557a and 557b. The connecting electrode 556a is electrically connected to the lead-out electrode 551a and the inner electrodes 505a, the connecting electrode 556b is electrically connected to the lead-out electrode 551b and the inner electrodes 505b, the connecting electrode 557a is electrically connected to the lead-out electrode 551a and the inner electrodes 512a, and the connecting electrode 557b is electrically connected to the lead-out electrode 551b and the inner electrodes 512b.

Figure 84:
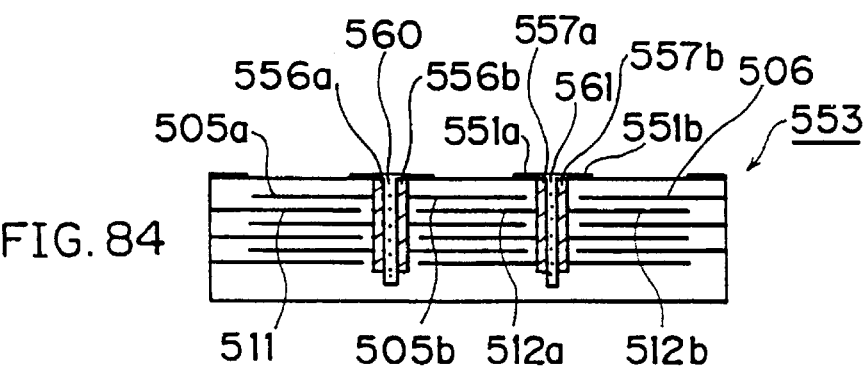
FIG. 84 is a cross sectional view showing a state where insulating layers are respectively formed in the narrow grooves shown in FIG. 83C.

Referring to FIG. 84, the grooves 558 and 559 are then filled with a Pb—Al—Si series glass paste, after which the glass paste is heat-treated at a temperature of approximately 800° C., for example, thereby to form insulating layers 560 and 561, as in the above described tenth embodiment. The connecting electrodes 556a and 556b are insulated from each other by the insulating layer 560, and the connecting electrodes 557a and 557n are insulated from each other by the insulating layer 561.

Figure 85:
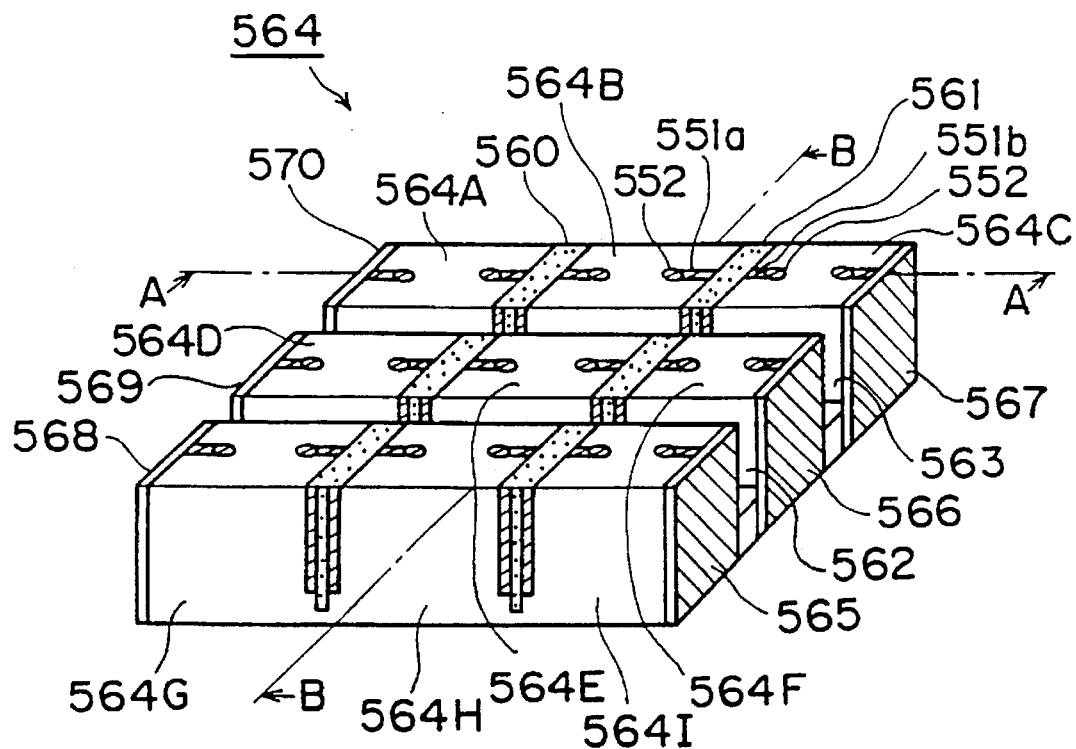
FIG. 85 is a perspective view showing a multilayer capacitor array according to the eleventh embodiment of the present invention.
Figure 86:
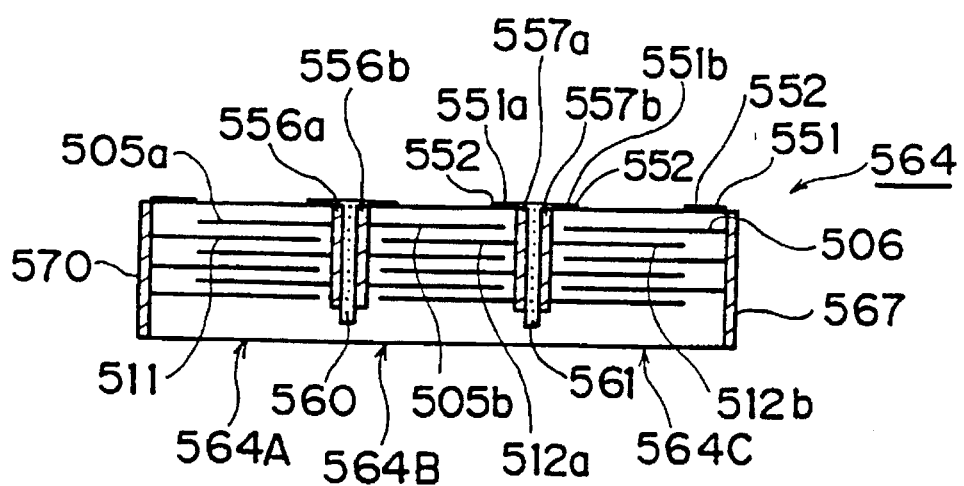
FIG. 86 is a cross sectional view taken along a line A—A shown in FIG. 85.
Figure 87:
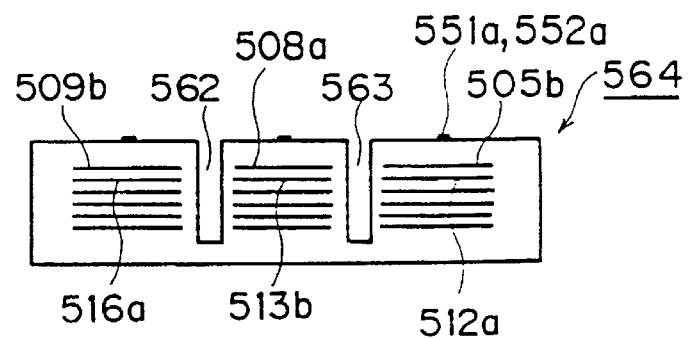
FIG. 87 is a cross sectional view taken along a line B—B shown in FIG. 85.

Referring to FIG. 85, grooves 562 and 563 are then formed along lines b—b shown in FIGS. 62, 63 and 77, and connecting electrodes 565 to 570 are further formed by, for example, applying or baking a conductive paste in portions of the respective capacitor units on outer end surfaces of the sintered body. FIG. 86 is a cross sectional view taken along a line A—A, and FIG. 87 is a cross sectional view taken along a line B—B shown in FIG. 85. Referring to FIG. 85, the connecting electrodes are thus formed on both sides of the sintered body, thereby to obtain a multilayer capacitor array 564. In the multilayer capacitor array 564, nine capacitor units 564A to 564I are constructed.

Referring to FIG. 86, the capacitor unit 564C, for example, is paid attention to. The inner electrodes 506 are exposed to a side surface of the sintered body. Therefore, the inner electrodes can be electrically connected to the connecting electrode 567 by forming the connecting electrode 567. The connecting electrode 567 is electrically connected to the lead-out electrode 551 and the electrodes for connection to the exterior 552 formed on an upper surface of the sintered body. In addition, the other inner electrodes 512b in the capacitor unit 564C are electrically connected to the connecting electrode 557b. The connecting electrode 557b is electrically connected to the electrode for connection to the exterior 552 through the lead-out electrode 551b. Similarly in the other capacitor unit, the inner electrodes alternately laminated are electrically connected to the connecting electrodes on both sides, respectively. The connecting electrodes are electrically connected to the electrodes for connection to the exterior 552 formed on the upper surface of the multilayer capacitor array 564 through the lead-out electrodes, respectively. Consequently, the electrodes for connection to the exterior 552 in the capacitor units 564A to 564I are formed on one surface of the multilayer ceramic capacitor array 564. The capacitor units can be surface-mounted on a printed circuit board using the electrodes for connection to the exterior 552 by bump junction or the like.

Figure 88:
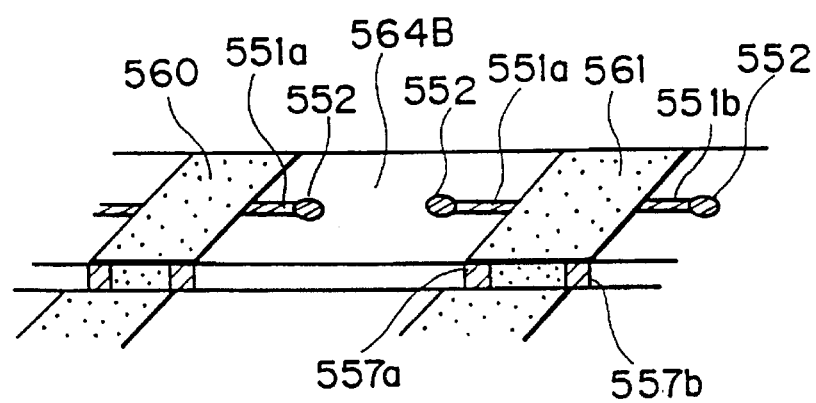
FIG. 88 is an enlarged perspective view showing the vicinity of electrodes for connection to the exterior in the eleventh embodiment of the present invention.

Referring to FIG. 88, in the multilayer capacitor array, the insulating layer 561 is formed so as to cover upper end surfaces of the connecting electrodes 557a and 557b. An electrical leak between the lead-out electrodes 551a and 551b can be prevented by thus forming the insulating layer 561.

Figure 89:
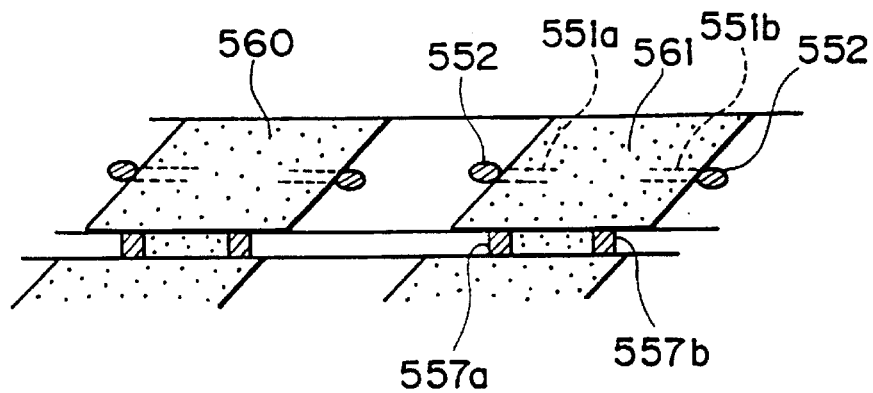
FIG. 89 is an enlarged perspective view showing the vicinity of the electrodes for connection to the exterior in a case where insulating layers are formed so as to cover lead-out electrodes in the eleventh embodiment of the present invention.

Furthermore, the coating area of the insulating layer 561 may be increased to also coat portions of the lead-out electrodes 551a and 551b with the insulating layer 561, as shown in FIG. 89, as required.

Description is now made of the results of specific experiments.

As the ceramic green sheets 501, 502, 519 and 550, a ceramic green sheet obtained by forming a slurry mainly composed of barium titanate series dielectric ceramic powder to a thickness of 10 μm is used. The inner electrodes, the lead-out electrodes and the electrodes for connection to the exterior are formed by applying a conductive paste mainly composed of silver and baking the same. The ceramic green sheets are laminated, and a laminated body obtained is pressed, followed by sintering at a temperature of 1350° C., thereby to obtain the sintered body.

The grooves 554 and 555 having a width of 150 μm (see FIG. 82) are formed using a diamond cutter. The grooves 554 and 555 are filled with a silver paste containing ceramic powder as a conductive paste for forming the connecting electrodes, after which the silver paste is baked at a temperature of 850° C. The grooves 558 and 559 having a width of 100 μm (see FIG. 83C) are then formed. The grooves 558 and 559 are filled with Pb—Al—Si series glass, after which the glass is baked at a temperature of 800° C. The grooves 562 and 563 having a width of 300 (see FIG. 85) are then formed, thereby to finally obtain the capacitor array 564 in a matrix of 3 rows and 3 columns having a plane shape measuring 2.0 mm by 3.0 mm.

A multilayer capacitor for comparison in which electrodes are led out in its outer edges (comparative example 3) and a capacitor array in which a plurality of such capacitor functions that inner electrodes are led out by through holes provided in its inner portion are continuously formed in a matrix (comparative example 4), which are equal in material and are equal in conditions such as the number of laminations to the capacitor array 564 according to the present embodiment, are respectively mounted on a circuit board for testing measuring 10 mm by 10 mm so as to achieve highest density mounting. The capacitance densities on mounting in the present embodiment and the comparative examples 3 and 4 are compared. As a result, the capacitance density on mounting is 7.3 μF/cm$^2$ in the present embodiment, while being 6.5 μF/cm$^2$ in the comparative example 3 and 5.0 μF/cm$^2$ in the comparative example 4.

Furthermore, the temperature cycle test and the vibration test are carried out with respect to the capacitor arrays in the embodiment and the comparative examples 3 and 4. In the temperature cycle test, samples are respectively subjected to temperature changes between −25° C. and 125° C. for 100 cycles, and then the insulation resistance values of the samples are measured. A sample in which the insulation resistance value is changed by not less than 10% is considered as a failure. In the vibration test, samples are respectively subjected to vibration of 10→2000→10 Hz (1.55 mm) for one hour, and then the insulation resistance values of the samples are measured. A sample in which the insulation resistance value is changed by not less than 10% is considered as a failure. As a result, the failure rate is 0% with respect to the capacitor arrays in the embodiment and the comparative examples 3 and 4.

As can be seen from the results, the capacitor array according to the embodiment of the present invention has the same reliability as that of the conventional capacitor element and allows high density mounting.

Although in the above described tenth and eleventh embodiments, the grooves 531 and 532 (see FIG. 73) and the grooves 562 and 563 (see FIG. 85) for forming a space between the adjacent capacitor units are formed, formation of such grooves is not necessarily required in the present invention, which is preferable in terms of reduction in stray capacitance. In addition, formation of a dielectric layer composed of a material having a low dielectric constant such as glass in such grooves has the effect of reduction in stray capacitance. Although in the above described tenth and eleventh embodiments, the ceramic green sheets as illustrated are used and are directly laminated, thereby to obtain the capacitor array in a matrix of 3 rows and 3 columns by passing through the above described processes, larger ceramic green sheets may be used to fabricate a capacitor array in a matrix of m≧4 and n≧4 and then, cutting the capacitor array in the thickness direction, to obtain a capacitor array in a matrix of predetermined rows and columns.

In the above described embodiments, the grooves, the lead-out electrodes, and the electrodes for connection to the exterior may be formed before sintering the laminated body.

It should be noted that a method of fabricating a capacitor array according to the present invention is not limited to the order of processes and the methods in the above described embodiments.

What is claimed is:

1. A capacitor array comprising:

a ceramic sintered body; and a plurality of adjacent capacitor units provided in said ceramic sintered body, each of the adjacent capacitor units having a plurality of inner electrodes laminated so as to be overlapped with each other while being separated by a ceramic layer, and the adjacent capacitor units being separated from each other by a layer having a lower dielectric constant than that of ceramics composing the ceramic sintered body, said layer comprising a cavity enclosed within said ceramic sintered body and extending along locations of each of the inner electrodes of the adjacent capacitor units.

2. The capacitor array according to claim 1, wherein the sintered body has a pair of upper and lower major surfaces and a plurality of side surfaces connecting the upper and lower surfaces, the plurality of inner electrodes are disposed so as to be overlapped with each other in a thickness direction of the sintered body which extends along the side surfaces of the sintered body.

3. The capacitor array according to claim 1, wherein the sintered body has a pair of upper and lower major surfaces and a plurality of side surfaces connecting the upper and lower surfaces, the plurality of inner electrodes are overlapped with each other in a direction that is substantially orthogonal to a thickness direction of the sintered body, the thickness direction of the sintered body extending along the side surfaces of the sintered body.

4. The capacitor array according to claim 1, wherein the adjacent capacitor units are separated from each other by the cavity, and said layer having a lower dielectric constant further comprising a layer of air in the cavity.

5. The capacitor array according to claim 4, wherein the sintered body has a pair of upper and lower major surfaces and a plurality of side surfaces connecting the upper and lower surfaces, the plurality of inner electrodes are overlapped with each other while being separated by the ceramic layer in a direction that is substantially orthogonal to a thickness direction of the sintered body, the thickness direction of the sintered body extending along the side surfaces of the sintered body.

6. The capacitor array according to claim 1, wherein said cavity is filled with an insulating material having a lower dielectric constant than that of said ceramics of said sintered body, and thereby said layer of a lower dielectric constant separating said adjacent capacitor units from each other is a layer of insulating material.

7. The capacitor array according to claim 6, wherein the plurality of inner electrodes are disposed in an overlapping arrangement with each other between the surface from which the cavity extends into the sintered body to an opposite surface.

8. The capacitor array according to claim 1, wherein said layer of lower dielectric constant being in direct contact with said inner electrodes of adjacent capacitor units.

9. The capacitor array according to claim 1, wherein said sintered ceramic body includes first, second and third surfaces, said second and third surfaces being disposed opposite to each other and connected by said first surface, said layer of lower dielectric constant extends in a direction substantially parallel to said first surface of said sintered body, and said capacitor array further comprises a plurality of external electrodes in contact with said inner electrodes, said external electrodes disposed on said second and third surfaces of said sintered body.

* * * * *